United States Patent
Ishida et al.

(10) Patent No.: US 6,678,640 B2
(45) Date of Patent: Jan. 13, 2004

(54) METHOD AND APPARATUS FOR PARAMETER ESTIMATION, PARAMETER ESTIMATION CONTROL AND LEARNING CONTROL

(75) Inventors: Akira Ishida, Sakai (JP); Masuo Takigawa, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/329,196

(22) Filed: Jun. 10, 1999

(65) Prior Publication Data

US 2003/0158709 A1 Aug. 21, 2003

(30) Foreign Application Priority Data

Jun. 10, 1998 (JP) ............................................. 10-162101
May 19, 1999 (JP) ............................................. 11-139136

(51) Int. Cl.[7] ............................................. G06F 15/18
(52) U.S. Cl. .................... 702/189; 702/181; 702/183; 706/25
(58) Field of Search ................................ 702/189, 111, 702/181–183, 188, 190, 191, 193, 195, 197, FOR 103, FOR 104, FOR 134, FOR 135, FOR 169, FOR 166, FOR 170, FOR 171; 706/15, 16, 20–23, 25, 34, 2–4, 900, 903–907; 700/28–31, 48, 50, 52, 55; 123/674, 675

(56) References Cited

U.S. PATENT DOCUMENTS

| | | | | |
|---|---|---|---|---|
| 5,402,519 A | * | 3/1995 | Inoue et al. | 706/16 |
| 5,657,737 A | * | 8/1997 | Ishida et al. | 123/674 |
| 5,755,212 A | * | 5/1998 | Ajima | 123/674 |
| 5,915,368 A | * | 6/1999 | Ishida et al. | 123/675 |
| 5,956,702 A | * | 9/1999 | Matsuoka et al. | 706/22 |
| 6,029,133 A | * | 2/2000 | Wei | 704/265 |
| 6,208,981 B1 | * | 3/2001 | Graf et al. | 706/2 |
| 6,330,553 B1 | * | 12/2001 | Uchikawa et al. | 706/2 |
| 6,397,100 B2 | * | 5/2002 | Stadler et al. | 600/509 |

FOREIGN PATENT DOCUMENTS

| | | |
|---|---|---|
| JP | 3-235723 | 10/1991 |
| JP | 8-74636 | 3/1996 |
| JP | 11-85719 | 3/1999 |

OTHER PUBLICATIONS

Amoozegar et al; "Target Tracking by Neural Network Maneuver Detection and Input Estimation", Radar Conference, 1995, IEEE, pp. 143–148.*

"An Approach to Stability Criteria of Neural–Network Control Systems"; Kazuo Tanaka; IEEE Transactions on Neural Networks, vol. 7, No. 3; May 1996; pp. 629–642.

* cited by examiner

Primary Examiner—Hal Wachsman
(74) Attorney, Agent, or Firm—Parkhurst & Wendel, L.L.P.

(57) ABSTRACT

A parameter estimation device for estimating parameters relating to input and output of a control object by using a neural network, including control domain division means for selecting at least one parameter having strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives a parameter indicating the operation state of each of the small domain into which the control domain is divided, so that the output from the neural network can be checked in advance.

25 Claims, 37 Drawing Sheets

Fig.11 (a) Fig.11(b)
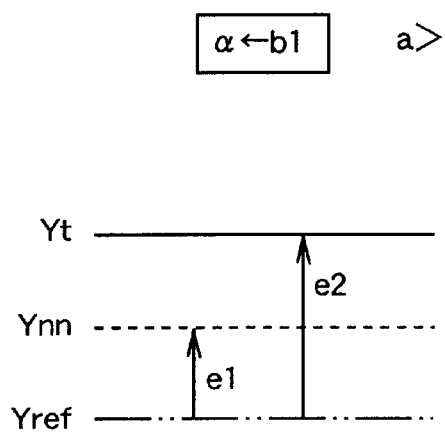
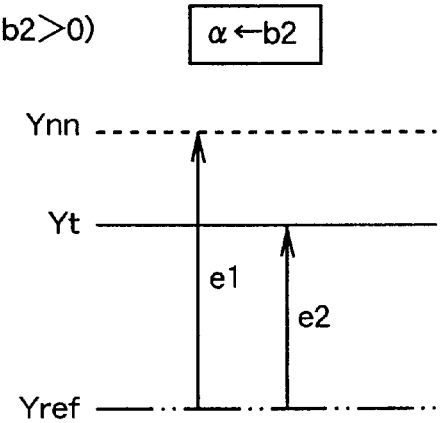
Fig.12
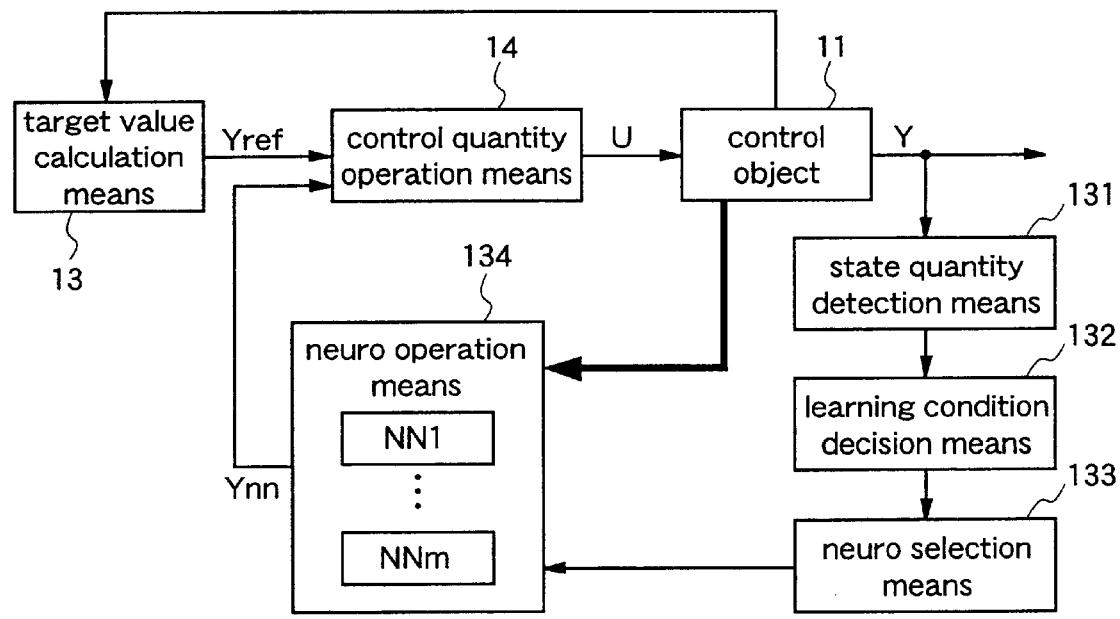

Fig.21
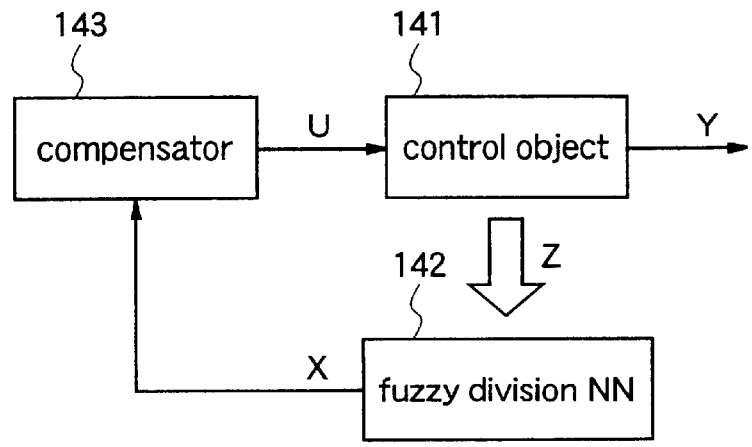
Fig.22
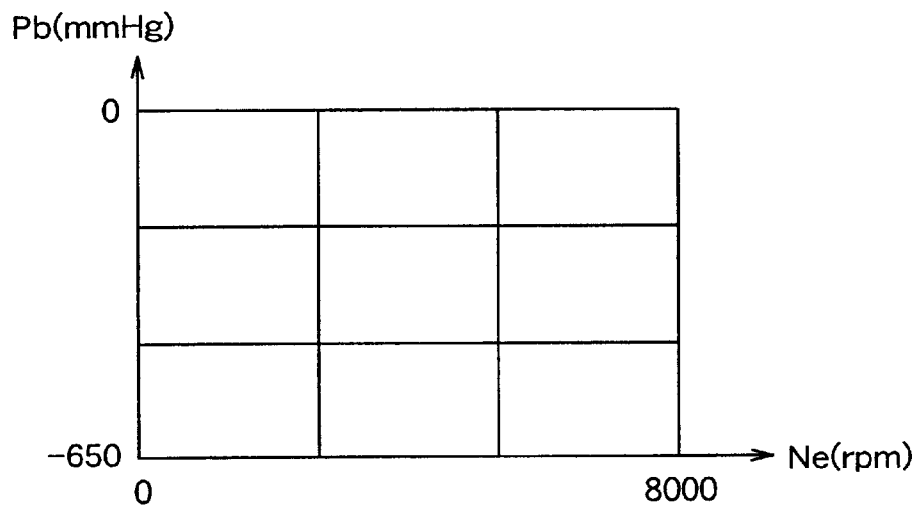
Fig.23
| Pb \ Ne | S | M | B |
|---|---|---|---|
| S | $D_1$ | $D_2$ | $D_3$ |
| M | $D_4$ | $D_5$ | $D_6$ |
| B | $D_7$ | $D_8$ | $D_9$ |

Fig.26 (a)
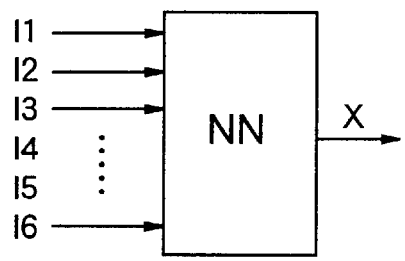
Fig.26 (b)
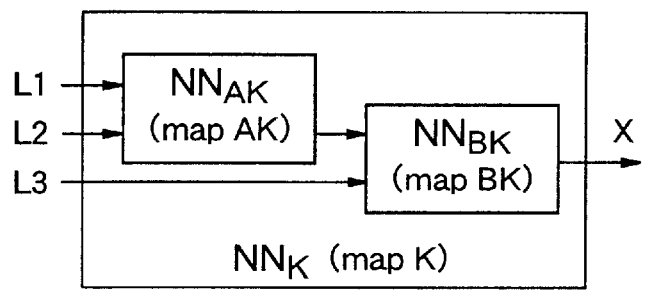
Fig.27
| L2 \ L1 | L1min | L1min +ΔL1 | ...... | L1MAX |
|---|---|---|---|---|
| L2min | X00 | X01 | ...... | X0m |
| L2min +ΔL2 | X10 | | | |
| ⋮ | ⋮ | | | ⋮ |
| L2MAX | Xn0 | ...... | ...... | Xnm |

$Y' = [Y(k), Y(k-1), \cdots, Y(K-m+1)]$
$U' = [U(k), U(k-1), \cdots, U(K-n+1)]$ $Yob' = [Yob(k), Yob(k-1), \cdots, Yob(K-m+1)]$
$U' = [U(k), U(k-1), \cdots, U(K-n+1)]$

METHOD AND APPARATUS FOR PARAMETER ESTIMATION, PARAMETER ESTIMATION CONTROL AND LEARNING CONTROL

FIELD OF THE INVENTION

The present invention relates to a parameter estimation apparatus and a parameter estimation method and, more particularly, to improvement of stability when estimating parameters by using a neural network which stores information and operates adaptively to an object or environment.

The invention also relates to a parameter estimation control device and a parameter estimation control method and, more particularly, to those estimating parameters relating to control of a control object by using a neural network, and controlling the object in accordance with the estimated parameters.

Furthermore, the invention relates to a learning control device and a learning control method and, more particularly, to learning control which enables highly precise follow-up control to a target value when calculating a learning control quantity by using an output from a neural network.

BACKGROUND OF THE INVENTION

Current digital computers used for calculation or control are stored program computers and consecutive sequence computers which are called "von Neumann architecture". On the other hand, there have been many studies on "neural networks" based on models of connected neurons which manage the function of human brain. Applications of neural networks for estimation or control have been proposed in various fields, for example, the field where pattern processing, which is von Neumann computer's week subject, is required, or the field where an object has strong non-linearity and so is hard to be analyzed. In some fields, neural networks have been put to practical use.

That is, even when it is difficult to theoretically derive a causal relation between an input and an output in a physical or chemical system, a neural network enables estimation of an output value from an input value according to its learning function. Taking this advantage, in recent years, neural networks have been applied to control devices for controlling complicated control systems, especially, control devices for controlling objects of strong non-linearity.

A neural network has a plurality of multi-input and multi-output elements called "units" which are neurons simplified as model systems, and generates or changes the interconnections of the units by learning. These units form a feed-forward type hierarchical network or a feed-back type interconnection network.

FIG. 52 is a diagram for explaining a hierarchical network in which units form a multi-layer structure. In such neural network, a plurality of intermediate layers reside between an input layer to which an object to be processed by the neural network is input and an output layer from which the processing result is output. The units included in each layer form connections with the units in the adjacent layer, and these connections are represented by connection weights or connection coefficients. The construction of these connections is formed by learning to output a desired signal with respect to a specific input. As a learning method useful for a hierarchical neural network as shown in FIG. 52, there is a back propagation method. This method attracts attention as it is able to provide a neural network which can be constructed with technologically realizable number of units. Furthermore, there are two learning methods, "supervised learning" and "unsupervised learning". In the former, an output (signal) is given from the user, and in the latter, the neural network forms its own construction according to the statistical characteristics of an input signal. One of these methods is selected according to the application of the neural network.

Generally, in the hierarchical neural network shown in FIG. 52, control using the neural network is performed as follows. A region where control is to be executed is defined as a learning domain. Parameters required for control are estimated by using the neural network which has learned within the learning domain, and control is performed using the estimated parameters.

FIG. 53 is a diagram for explaining a method of calculating an estimate value (parameter) in the conventional neural network. With reference to FIG. 53, 1501 is an object to be controlled (hereinafter referred to as a control object), and 1502 denotes a neural network (NN) operation unit. An input and an output to/from the control object 1501 are U and Y, respectively. An operation parameter Z including time series data of these input and output is input to the NN operation unit 1502, and the processing result is obtained as an output (estimate value) X. By using the estimate value X so obtained, the input control quantity U to the control object 1501 can be calculated so that the output Y from the control object 1501 becomes a target value. The neural network (NN) of the NN operation unit 1502 has a three-layer structure which has one intermediate layer in the hierarchical network shown in FIG. 52, and inter-layer outputs are obtained by function operation such as a sigmoid function.

As an example of a control system using a neural network, there is an air-to-fuel ratio controller for an internal combustion engine of a motorcar. "Air-to-fuel ratio" is the ratio of air to fuel in the intake gas of the engine. Examples of air-to-fuel ratio controllers are as follows: a motorcar control device disclosed in Japanese Published Patent Application No. Hei. 3-235723, an air-to-fuel ratio controller disclosed in Japanese Published Patent Application No. Hei. 8-74636, and a parameter estimation device disclosed in Japanese Published Patent Application No. Hei. 11-85719 (Application No. Hei. 9-238017)

The advantage of using a neural network in an air-to-fuel controller for an internal combustion engine of a motorcar is as follows.

With respect to NOx, CO, and HC which are noxious gases included in an exhaust gas from a motorcar, regulations in various countries must be cleared. So, there is adopted a method of reducing the noxious gases by using a catalyst. As a typical catalyst, a ternary catalyst is used.

FIG. 54 illustrates the outline of an air-to-fuel ratio controller. An air flowing into an engine according to the opening degree of a throttle (TL) is mixed with a fuel injected from a fuel injection unit (INJ), and the mixture flows through a valve V1 into a combustion chamber, wherein explosion occurs. Thereby, a downward pressure is applied to a piston (P), and an exhaust gas is discharged through a valve V2 and an exhaust pipe. At this time, the air-to-fuel ratio is detected by an air-to-fuel ratio sensor AFS, and the exhaust gas is purified by a ternary catalyst (TC). To make the catalyst effectively purify the noxious gases, it is necessary to keep the air-to-fuel ratio constant, i.e., at 14.7, so that the catalyst can work effectively. For this purpose, an air-to-fuel ratio controller which can keep the air-to-fuel ratio constant regardless of the motorcar's operating state is required.

In the air-to-fuel ratio controller constructed as described above, usually, feed-forward control is carried out, that is, increase or decrease in the quantity of fuel to be injected is corrected according to change of the throttle's opening degree or the like and, further, feed-back control is carried out as well. These controls secure successful results in the steady operation state such as idling or constant-speed driving. However, in the transient state such as acceleration or deceleration, it is very difficult to keep the air-to-fuel ratio constant by only the simple feed-forward/feed-back operation because of factors which are difficult to analyze, for example, a delay in response of the air-to-fuel ratio sensor, and successive change in the quantity of fuel actually flowing into the cylinder according to the driving state or external environment.

So, in order to improve the precision of air-to-fuel ratio control, a neural network learns non-linear factors such as the above-described fuel injection, and correction of the fuel injection quantity is controlled by using this neural network to improve the response characteristics in the transient state.

Such air-to-fuel ratio controller has already been known and, as an example, an air-to-fuel ratio controller disclosed in Japanese Published Patent Application No. Hei. 8-74636 will be described hereinafter.

FIG. 56 illustrates the structure of the air-to-fuel ratio controller which is somewhat simplified. In FIG. 56, E denotes an engine, 210 denotes a state detection unit for detecting the state of the engine E, 220 denotes a neural network (NN) operation unit for estimating the air-to-fuel ratio according to the state detected by the state detection unit 210, and 230 denotes a fuel injection quantity calculation unit for calculating the fuel injection quantity according to the result of the operation of the NN operation unit 220.

A description is given of the operation. In the air-to-fuel ratio controller, the state detection unit 210 detects a plurality of physical quantities indicating the state of the engine E, i.e., the engine speed (Ne), the intake air pressure (Pb), the throttle opening degree (THL), the fuel injection quantity (Gf), the intake air temperature (Ta), the cooling water temperature (Tw), and the detected air-to-fuel ratio ($A/F_k$). The NN operation unit 220 receives these parameters detected by the state detection unit 210, and estimates the behavior of the real air-to-fuel ratio ($A/F_r$) by the neural network, which behavior cannot be followed by an air-to-fuel ratio sensor in the state detection unit 210 in the transient state. Then, the fuel injection quantity calculation unit 230 performs feed-back control so as to minimize an error between the estimated air-to-fuel ratio ($A/F_{nn}$) and the target air-to-fuel ratio ($A/F_{ref}$), and calculates a fuel injection quantity (Gb) which realizes the target air-to-fuel ratio. In this way, the air-to-fuel ratio ($A/F_r$) in the transient state, which cannot be obtained by the ordinary sensor because of the sensor's response delay or the like, can be obtained by using the neural network, whereby appropriate control of the air-to-fuel ratio is realized.

FIG. 57 illustrates an example of a neural network used in the NN operation unit 220. As shown in FIG. 57, this neural network is composed of three layers: a first layer L1 as an input layer, a second layer L2 as an intermediate layer, and a third layer L3 as an output layer.

The following parameters are input to the first layer L1 from the state detection unit 210 shown in FIG. 56: the engine speed (Ne), the intake air pressure (Pb), the throttle opening degree (THL), the fuel injection quantity (Gf), the intake air temperature (Ta), the cooling water temperature (Tw), and the detected air-to-fuel ratio ($A/F_k$). This air-to-fuel ratio ($A/F_k$) is the latest air-to-fuel ratio detected by the air-to-fuel ratio sensor in the control cycle. However, this air-to-fuel ratio ($A/F_k$) is not the real air-to-fuel ratio ($A/F_k$) because of response delay of the sensor. Each of the parameters input to the first layer L1 is multiplied by a weight based on the learning result, according to its synapse SY. In the second layer L2, the sum is calculated at each neuron NR and then a threshold is given to the sum and, thereafter, it is converted to an output value according to a non-linear transfer function. Each of the output values from the second layer L2 is multiplied by another weight W, and the sum is calculated at a neuron NR in the third layer L3. Then, another threshold is added to this sum at the neuron NR in the third layer L3, and the result is converted according to another transfer function, whereby an estimated air-to-fuel ratio ($A/F_{NN}$) is obtained.

In the conventional air-to-fuel ratio controller so constructed, satisfactory air-to-fuel ratio control is achieved by the estimation process using the neural network, even in the transient state of the engine operation where a correct air-to-fuel ratio cannot be obtained from only the output of the ordinary sensor. However, in a control system using a neural network as described above, the stability of the control system cannot be always assured. That is, a general neural network (hereinafter referred to as NN) is a black box and so its internal structure is not clear. Therefore, it is impossible to theoretically assure the stability for all the inputs. To be specific, even when each input parameter is within the learning domain, if an input pattern different from the input parameter used for learning is input to the NN, it cannot be theoretically assured that the NN output always calculates a correct value (within an allowable estimate error). This will be described in more detail by using FIG. 58. In FIG. 58, NN1 is a neural network having generalization ability, which has correctly learned according to obtained data. On the other hand, NN2 is a neural network having no generalization ability, which has not correctly learned, and so its output varies significantly if the input pattern differs even a little. As is evident from FIG. 58, it is impossible to assure the stability of the NN-based control system. Therefore, in development of NN-based control devices which can be put to practical use, a great number of verification tests must be repeated, resulting in increased number of processes, cost, and time for development.

Furthermore, Although the NN output values corresponding to all the input patterns can be checked by calculation, the calculation time becomes considerable when the number of inputs to the NN is large, and so it is practically impossible to check the NN output values by calculation. Therefore, there is no method for assuring the stability of an object which shows complicated behaviors under various conditions, i.e., an object which actually needs to be controlled by the NN.

In order to assure the stability of NN control, there is proposed a method of using an NN offline as a tool for setting parameters such as control gains, instead of directly using NN outputs. In this method, however, the robust ability (the ability to constantly obtain stable outputs against variations) against parameter variations of the control object is reduced.

Meanwhile, in order to avoid the worst, there is proposed a method of providing the NN output with a limiter to nullify the output data. In this method, however, depending on the control object, it is sometimes necessary to design a control system which can clear the control target value even in the state where the NN output is limited. In this case, the advantage of using the NN is lost.

In the above-described examples, neural networks are employed to compensate the limitations of sensors. Hereinafter, a description is given of application of a neural network as a so-called software sensor. A software sensor functions as a substitute of a hardware sensor, by performing arithmetic processing.

FIG. 59 is a block diagram illustrating an ordinary control system using a sensor. In this system, when performing control to bring an output from a control object close to a target value, initially, the output value or a relating state quantity which becomes an index of the output value is detected, and an error between the detected state quantity and the target value is obtained. Then, by using a controller which is designed to bring the error to 0 (ZERO), feed-back control based on the detected value (output value or the index value) is performed to decide an input (control quantity) to the control object.

Turning to FIG. 59, the control system comprises a control object 1701, a sensor 1702 (sensor 1), and a control quantity operation means 1703. The control object 1701 outputs a state quantity to be brought close to a target value. The sensor 1702 is a high-performance sensor having sufficient precision for appropriate control. The sensor 1702 detects the state quantity output from the control object 1701 to output a detected value Y1. The control quantity operation means 1703 performs arithmetic operation to obtain an input value (control quantity) to be input to the control object 1701 in accordance with the detected value Y1.

In this control system, the control precision greatly depends on the precision of the sensor 1702 which detects the state. So, in order to appropriately perform feed-back control, the precision of the sensor 1702 must be sufficiently high. However, high performance sensors are generally expensive, and it is difficult to provide mass-produced models with such expensive sensors. Hence, neural networks are used as software sensors in place of high performance sensors. That is, a behavior equivalent to a high performance sensor is realized in a neural network by subjecting the neural network to learning using an output from the high performance sensor as a teaching signal.

FIG. 60 is a block diagram illustrating a learning system, for realizing a neural network which can serve as a substitution of the sensor 1702 shown in FIG. 59. As shown in FIG. 60, this learning system comprises a control quantity generator 1800, a control object 1801, a neural network 1802 (NN1), and a sensor 1804 (sensor 1).

The control quantity generator 1800 generates a control quantity to be input to the control object 1801. In this learning system, an assumed input region (operation domain) is defined as a learning domain, and the control quantity generator 1800 is set to generate a control quantity within the operation domain. The control object 1801 is an object to be subjected to control which uses a neural network as a substitution of the sensor 1804. The neural network 1802 is subjected to learning so that it becomes a software sensor to be used as a substitution of the sensor 1804. The sensor 1804 is a high performance sensor having a sufficient precision for appropriate control.

A description is now given of the operation of the neural network learning system so constructed. Initially, the control quantity generator 1800 generates a control quantity U and outputs it to the control object 1801 and the neural network 1802. The control object 1801 performs a predetermined operation to generate an output according to the control quantity U. The sensor 1804 detects the output of the control object 1801 and outputs a signal Y1 indicating the result of the detection, as a teaching signal, to the neural network 1802.

The neural network 1802 receives the control quantity U and a state quantity (usually, plural quantities) z indicating the state of the control object 1801, and outputs an estimate value Ynn according to these inputs. The estimate value Ynn is compared with the teaching signal Y1. Based on the result of the comparison, the connection coefficients of the neural network are learned so that the estimate value Ynn of the neural network 1802 becomes the teaching signal Y1 by, for example, the back propagation method.

In the learning system so constructed, the neural network 1802 can learn the behavior characteristics of the sensor 1804. Then, a control system is constituted by using the neural network 1802 as a software sensor, whereby a control quantity can be calculated so that the output of the control object becomes the target value by using the estimate value from the neural network 1802 instead of the detected value from the sensor 1804.

FIG. 61 is a block diagram illustrating a control system using a neural network which has learned as described above. As shown in FIG. 61, this control system comprises a control object 1901, a neural network 1902 (NN1), and a control quantity operation means 1903.

The control object 1901 is identical to the control object 1701 shown in FIG. 59, and this is an object to be controlled by the control system. The neural network 1902 is identical to the neural network 1802 which has learned in the learning system shown in FIG. 60. The control quantity operation means 1903 generates a control quantity to be input to the control object 1901 in accordance with an estimate value output from the neural network 1902.

The control system so constructed can perform control identical to that of the control system shown in FIG. 59, by using the estimate value Ynn output from the neural network 1902 instead of the quantity Y1 detected by the high performance sensor 1702 shown in FIG. 59.

For example, a calculator of von Neumann type architecture performs processing according to a calculation algorithm which has already been known, and an inevitable causal relation resides between an input and an output. Accordingly, as long as it is known that an output can be obtained from an input by using an algorithm, it is theoretically possible to estimate an output which can be obtained from another input. However, the situation differs when using a neural network.

The intermediate layer in the neural network constituting the hierarchical network shown in FIG. 52 is called "a hidden layer", and the connection structure inside the neural network cannot be known, that is, it is in the black box state. Accordingly, only an input to the neural network and an output corresponding to the input can be known from the outside. So, even in a domain where learning has been performed, it is impossible to theoretically assure that stable outputs are obtained with respect to all inputs.

To be specific, in the case where a plurality of parameters are input to the neural network to obtain their estimate values, if patterns different from the input patterns used for learning are input even though each input parameter is within the learning domain, it is impossible to theoretically assure that the estimate values are appropriate (i.e., within an allowable estimation error). In this case, theoretically assured are only the estimate values of the input patterns used for learning.

Accordingly, in order to develop a control device using a neural network which has sufficiently high stability for practical use, it is necessary to repeat a great number of verification tests, resulting in increased number of processes for development.

On the other hand, to check the estimate values (outputs from the neural network) for all the input patterns by calculation is practically possible if the neural network is small in scale. However, in a neural network having a large number of inputs, such calculation takes a lot of time. Therefore, when a neural network is used for a control object showing complicated behaviors (i.e., a control object which actually needs to be controlled by the neural network), such calculation is impossible in fact and, consequently, the stability cannot be assured.

Hereinafter, a learning process of a conventional neural network will be described with reference to FIG. 62. FIG. 62 is a schematic diagram illustrating a learning process of a neural network which receives input parameters such as the engine speed (Ne) and outputs an estimated air-to-fuel ratio ($A/F_{NN}$).

Initially, an engine E of a motorcar is provided with a state detection unit 210 which is identical to that shown in FIG. 56, and the state detection unit 210 collects data for learning when the motorcar is driven. The data so collected is input to a learning data generation unit 240a, wherein the data is converted to learning data in which the sensor's response delay and the like are adjusted. The learning data is composed of an air-to-fuel ratio as teaching data ($A/F_t$) and input parameters (e.g., the engine speed (Ne)) corresponding to the air-to-fuel ratio. The air-to-fuel ratio as the teaching data ($A/F_t$) can be obtained from an air-to-fuel ratio ($A/F_k$) detected by the air-to-fuel ratio sensor, considering the detection delay. Although it is desirable that past data of the respective parameters are included, the past parameters are not included to simplify the description.

The learning data generated by the learning data generation unit 240a is stored in the learning data storage unit 240b. The learning execution unit 240c performs learning of the neural network (NN) by using the stored learning data.

To be specific, the learning execution unit 240c inputs the parameters such as the engine speed (Ne) to the neural network NN. In response to the input, the neural network NN outputs an estimated air-to-fuel ratio ($A/FN_{NN}$). Then, the differentiator 240d detects an error e between the estimated air-to-fuel ratio $A/F_{NN}$ and the teaching air-to-fuel ratio $A/F_t$. The construction of the neural network NN (i.e., the weights of the synapses SY, the transfer functions, etc) is varied so that the error e becomes smaller than an allowable value, for example, 0.1 (average) when calculated in A/F ratio equivalent. When the error e becomes smaller than the allowable value or when the learning operation reaches a specified number of times, the learning process is completed.

Thereby, the construction of the neural network NN is defined with the weights of the synapses SY, the transfer functions, and the like at the time when the learning has been completed when an input is given to the neural network which has completed the learning, the neural network can output an air-to-fuel ratio (estimate value) having an error smaller than the allowable value, i.e., 0.1 (average) when calculated in A/F ratio equivalent.

The conventional neuro learning will be described by using a flowchart shown in FIG. 63. Initially, a learning data set (a set of a neuro input data sequence INP and the corresponding teaching signal Yt) is formed by using real data (step 201). Then, a neuro estimate value Ynn(i) is calculated by using the neuro input data sequence INP (step 202), and a performance function E ($=\Sigma e^2/2$) based on an error e(i) between the teaching signal Yt(i) and the neuro estimate value Ynn(i) is calculated (step 203). Then, the neuro connection coefficients are updated so as to decrease the performance function E (step 204). Thereafter, a performance function Enew is calculated using the updated connection coefficients, and it is decided whether the error goal is achieved or not (step 205). When it is not achieved, the control returns to step 202 to advance the learning. The learning is ended when the error goal is achieved.

In the conventional learning control device so constructed, it is possible to make the neural network perform learning so that the error between the output of the neural network and the value of the teaching signal becomes smaller than a predetermined value. As the result of the learning, the construction of the neural network is changed from that before the learning.

However, in a control system using a neural network as described above, in order to improve the control precision, high-precision learning of the neural network is indispensable.

For example, when performing control to follow a target value by using an estimate value, the estimate value sometimes deviates from the actual value. When the estimate value deviates to the side where the actual value exists with respect to the target value, it shows a correct value in regard to the direction of correction, and control is performed in approaching the target value, resulting in favorable result. However, when the estimate value deviates to the opposite side from the actual value with respect to the target value, the direction of correction is inverted, whereby control is performed in getting away from the target value, resulting in degraded control precision.

That is, in the conventional learning flow shown in FIG. 63, since learning control is performed based on that the absolute value of a difference between the neuro estimate value and the target value is reduced. So, depending on the positional relationship between the neuro estimate value and the target value, the neural network after learning advances control in getting away from the target value, resulting in degraded control precision.

This will be explained taking the air-to-fuel ratio as an example. If the estimated air-to-fuel ratio deviates in the opposite direction from the target air-to-fuel ratio, there occurs a problem that the fuel becomes "lean" and the engine stops although the fuel must be "rich" to accelerate the engine.

Furthermore, the above-described learning to improve the estimation precision is carried out such that learning data is not limited within a specific range, or learning data within the behavior range of the control object is prepared in advance. However, whether sufficient learning has been performed with the learning data or not is known only from the result of the control. So, usually, the following development routine must be repeated. That is, learning is performed and then evaluation for the learning is performed. Then, learning data in a domain having unsatisfactory evaluation result is collected to re-form the data, followed by re-learning. Here, "domain" is a conception indicating the operating state of the engine, which is determined according to combination of regions of at least one input parameter.

Furthermore, based on the result of evaluation using evaluation data, when part of the learning data has a large error, usually the learning data in the domain having the large error is increased for re-learning to minimize the error. At this time, it is necessary to select additional data, considering the valance of distribution of the whole learning data, i.e., the balance of number of learning data in each domain.

However, the re-learning with the selected additional data sometimes results in the following drawbacks. That is, in a domain where a satisfactory result was obtained in the previous learning, no satisfactory result is obtained in the re-learning. Further, the learning result degrades as a whole.

In this case, selection of learning data must be performed again. Because of the repetitions of data collection and re-learning, the whole learning process takes a lot of time until a satisfactory result is obtained.

As described above, it is very difficult to improve the estimation precision of a neural network over a broad estimation domain, and at present, trial and error is the only measure to solve this problem.

SUMMARY OF THE INVENTION

It is an object of the present invention to provide a parameter estimation control device which can express a control object, which has conventionally been expressed by a large-scale neural network, by using a plurality of small NN constructions with high precision, and which can perform analysis of stability.

It is another object of the present invention to provide a parameter estimation control device which can estimate parameters by using a neural network to perform stable control, without increasing cost and processes for development.

It is still another object of the present invention to provide a parameter estimation control method which can estimate parameters by using a neural network to perform stable control, without increasing cost and processes for development.

It is a further object of the present invention to provide a learning control device and a learning control method for calculating control quantities which follow target values, by using output values from a neural network and, more particularly, to those capable of realizing high-precision learning in which estimate values enabling high-precision follow-up control are obtained, improving, by re-learning, only the estimation precision in a domain of poor estimation precision without affecting other domains, and performing precise and efficient learning.

Other objects and advantages of the invention will become apparent from the detailed description that follows. The detailed description and specific embodiments described are provided only for illustration since various additions and modifications within the scope of the invention will be apparent to those of skill in the art from the detailed description.

SUMMARY OF THE INVENTION

According to a first aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives a parameter indicating the operation state of each of the small domains into which the control domain is divided. Therefore, the NN (neural network) construction serving as an estimator in the consequent part of the operation is reduced in size, and so the NN output can be checked in advance, whereby an operation state X whose estimate error in the entire operation domain is within an allowable range can be obtained. Hence, the stability of the control system can be assured without providing a limiter or the like.

According to a second aspect of the present invention, there is provided a parameter estimation method for estimating parameters relating to input and output of a control object by using a neural network, and this method comprises the steps of: selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimating dynamic behavior of the control object by using, as a consequent part of the fuzzy operation, a neural network which receives a parameter indicating the operation state of each of the small domains into which the control domain is divided. Therefore, the same effects as described for the first aspect can be obtained.

According to a third aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means comprising a map formation unit and a map composition unit, and estimating dynamic behavior of the control object by using map values output from the map combination unit. The map formation unit performs as follows: dividing plural parameters indicating the operation states of the respective small control domains into a predetermined number of parameter groups to be input to each of plural neural networks; dividing output parameters from each of the plural neural networks into a predetermined number of parameter groups; constructing, as a consequent part of the fuzzy operation, neural networks receiving these parameter groups; performing learning of a neural network construction obtained by combining plural neural networks which are obtained by repeating the above operation until the output from each neural network becomes single; and forming maps by using the outputs from the respective neural networks corresponding to the respective input parameter groups. The map combination unit combines the maps so formed in the same manner as combining the neural networks. Therefore, the same effects as described for the first aspect can be obtained.

According to a fourth aspect of the present invention, in the parameter estimation device of the third aspect, the neural network construction has a structure in which a plurality of three-layer networks, each having two inputs and one output, are combined. Therefore, the NN (neural network) construction serving as an estimator in the consequent part of the operation is reduced to a three-layer NN construction having two inputs and one output, whereby the same effects as described above are obtained.

According to a fifth aspect of the present invention, in the parameter estimation device of the third aspect, when determining dots of the maps when mapping the neural network construction used for the operation in the consequent part, these dots are determined by calculating the dot pitch in accordance with the maximum differential coefficients of the neural network and an allowable estimate error. Therefore, it is possible to form maps that can assure the estimate error.

According to a sixth aspect of the present invention, there is provided a parameter estimation device for estimating parameters relating to input and output of a control object by using a neural network, wherein a sudden change in an output from a neural network which has learned is decided as noise, and a signal obtained by filtering the output of the neural network is used as an estimate value. Therefore, only a sudden change can be effectively removed without delaying the propagation timing such as the phase of the estimate value, thereby avoiding considerable degradation of control precision.

According to a seventh aspect of the present invention, in the parameter estimation device of the sixth aspect, a teaching signal used for learning of the neural network is given after adjusting its phase and gain, with regard to the filter characteristics. Therefore, the same effects as described for the sixth aspect can be obtained.

According to an eighth aspect of the present invention, in the parameter estimation device of the seventh aspect, to adjust the phase and gain of the teaching signal is to filter the teaching signal by an inverse model of a filter used for output to make a new teaching signal. Therefore, the same effects as described for the seventh aspect can be obtained.

According to a ninth aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives time series data of the input and output of the control object for each of the small domains into which the control domain is divided. Therefore, analysis of stability is realized as in the case where the output can be observed. So, even when the NN (neural network) input term cannot be given by only input and output data of the control object, analysis of stability is possible by considering the NN input term as a disturbance term. Hence, stable NN estimate feed-back gains, which have conventionally been decided by trial and error, can be decided by calculation using weight coefficients of the NN.

According to a tenth aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives time series data of the input of the control object and time series data of a neural network output for each of the small domains into which the control domain is divided. Therefore, the same effects as described for the ninth aspect can be obtained.

According to an eleventh aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives time series data of the input of the control object and time series data of an estimate value of the output of the control object, which is obtained by an estimator, for each of the small domains into which the control domain is divided. Therefore, the same effects as described for the ninth aspect can be obtained.

According to a twelfth aspect of the present invention, there is provided a parameter estimation device for estimating parameters relating to input and output of a control object by using a neural network, and this device comprises: control domain division means for selecting at least one parameter which has strong correlation with non-linearity amongst input-output characteristics of the control object, as a parameter of a premise part of fuzzy operation, and dividing a control domain of the control object into a plurality of small domains by fuzzy estimation based on the parameter of the premise part; and estimation means for estimating dynamic behavior of the control object by using, as a consequent part of the fuzzy operation, a neural network which receives operation state parameters including at least one of time series data of the input and output of the control object and time series data of an estimate value of the output, for each of the small domains into which the control domain is divided. Therefore, the same effects as described for the ninth aspect can be obtained.

According to a thirteenth aspect of the present invention, in the parameter estimation device of the ninth aspect, a non-linear function f(x) used for a middle layer and an output layer of the neural network is represented by two linear functions, whereby the dynamic behavior of the neural network is given by a model which is represented by parameter of the linear functions and coefficients obtained by product-sum operation of connection coefficients of the neural network, and a control system is designed by using this model. Therefore, the NN (neural network) model can be converted to a model which can be stably analyzed, and stable NN estimate feed-back gains can be theoretically decided by using weight coefficients of the NN. Further, since a set value is provided for each control domain so that a value input to the non-linear function becomes lower than the set value, the width of the two linear functions can be reduced, whereby the result of the decision is prevented from being conservative.

According to a fourteenth aspect of the present invention, in the parameter estimation device of the thirteenth aspect, one of the two linear functions is given by a straight line which passes an origin and has a gradient of maximum differential coefficients $\alpha$ of the non-linear function, while the other is given by a straight line which passes the origin and has a gradient of $\beta$. Therefore, the same effects as described for the thirteenth aspect can be obtained.

According to a fifteenth aspect of the present invention, in the parameter estimation device of the thirteenth aspect, the gradient $\beta$ of the straight line which passes the origin satisfies $0 \leq \beta \leq \alpha$ and is given by $\beta = (f(x1))/x1$. Therefore, the same effects as described for the thirteenth aspect can be obtained.

According to a sixteenth aspect of the present invention, there is provided a parameter estimation control device for estimating parameters relating to control of a control object by using a neural network, and controlling the control object according to the estimated parameters, and this device comprises: parameter estimation means for receiving a state quantity indicating the state of the control object, and generating an estimate value of the output of the control object according to the input state quantities, by using a neural network which has learned by using the result of detection from a predetermined sensor means as a teaching signal; and control quantity operation means for receiving the estimate value generated by the parameter estimation means, and generating a control quantity used for control of the control object, based on the estimate value, according to a variation adaptive operation process which is adaptive to a variation of the estimate value. Therefore, stable control can be performed based on the estimate value generated by the parameter estimation means.

According to a seventeenth aspect of the present invention, in the parameter estimation control device of the sixteenth aspect, the variation adaptive operation process performed by the control quantity operation means is a control object model adaptive operation process in which a controller adaptive to a control object model is designed by using the control object model. Therefore, stable control can be performed by designing a virtual controller adaptive to the variation by using the control object model, and performing processing based on the controller.

According to an eighteenth aspect of the present invention, in the parameter estimation control device of the seventeenth aspect, the controller is designed so that it performs stable control according to, as the variation, the maximum error detected with respect to the neural network which has learned. Therefore, the same effects as described for the seventeenth aspect can be obtained.

According to a nineteenth aspect of the present invention, the parameter estimation control device of the sixteenth aspect further comprises: a hardware sensor means for detecting the output of the control object; and the parameter estimation means generating an estimate value in accordance with the result of detection from the hardware sensor as well as the input state quantity. Therefore, stable control can be performed by using an inexpensive sensor having relatively low precision, whereby the number of processes required for learning of the neural network can be reduced.

According to a twentieth aspect of the present invention, in the parameter estimation control device of the sixteenth aspect, the variation adaptive operation process performed by the control quantity estimation means is based on an estimate value generated by a neural network which has learned by using the result of detection by a predetermined sensor means as a teaching signal. Therefore, even when an existing control object model cannot be used, stable control is realized by using a control object model substitute neural network.

According to a twenty-first aspect of the present invention, there is provided a parameter estimation control method for estimating parameters relating to control of a control object by using a neural network, and controlling the control object according to the estimated parameters, and this method comprises the steps of: making a neural network learn by using the result of detection from a predetermined sensor means as a teaching signal; generating an estimate value of the output of the control object in accordance with a state quantity indicating the state of the control object, by the neural network which has learned; and generating a control quantity used for control of the control object, based on the generated estimate value, according to a variation adaptive operation process which is adaptive to a variation of the estimate value. In this method, since a control quantity used for controlling the control object is generated by processing adaptive to variations of the estimate value generated, stable control is realized based on the estimate value.

According to a twenty-second aspect of the present invention, in the parameter estimation control method of the twenty-first aspect, the variation adaptive operation process performed by the control quantity operation means is a control object model adaptive operation process in which a controller adaptive to a control object model is designed by using the control object model. Therefore, the same effects as described for the seventeenth aspect can be obtained.

According to a twenty-third aspect of the present invention, in the parameter estimation control method of the twenty-second aspect, the controller is designed so that it performs stable control according to, as the variation, the maximum error detected with respect to the neural network which has learned the result from the sensor means. Therefore, the same effects are described for the twenty-second aspect can be obtained.

According to a twenty-fourth aspect of the present invention, the parameter estimation control method of the twenty-first aspect further comprises: detecting the output of the control object by using a hardware sensor means; and generating an estimate value in accordance with the result of detection from the hardware sensor means as well as the input state quantity. Therefore, the same effects as described for the nineteenth aspect can be obtained.

According to a twenty-fifth aspect of the present invention, in the parameter estimation control method of the twenty-first aspect, the variation adaptive operation process performed by the control quantity estimation means is based on an estimate value generated by a neural network which has learned the result of detection by a predetermined sensor means as a teaching signal. Therefore, the same effects as described for the twentieth aspect can be obtained.

According to a twenty-sixth aspect of the present invention, there is provided a learning control device comprises: a neural network for receiving a plurality of input parameter values relating to a parameter as an object of estimation, and estimating estimation object parameter values used for target follow-up control quantity operation from these input parameter values; error coefficient change means for changing values of weight coefficients by which a square error between a neuro estimate value output from the neural network and a teaching signal is to be multiplied, according to relationships among the neuro estimate values the teaching signal, and a target value; and performance function operation means for operating a performance function for learning by using the weight coefficients; wherein learning of the neural network is performed based on the performance function. Therefore, learning with regard to a target value can be performed, whereby precision of target follow-up control by using a neuro estimate value can be improved as compared with that of the conventional learning control.

Especially, it is possible to prevent the control precision from degrading in the transient state where the control object changes suddenly.

According to a twenty-seventh aspect of the present invention, there is provided a learning control method receiving a plurality of input parameter values relating to a parameter as an object of estimation, and performing learning control of a neural network which estimates estimation object parameter values used for target follow-up control quantity operation from those input parameter values, and this method comprises the steps of: changing values of weight coefficients by which a square error between a neuro estimate value output from the neural network and a teaching signal is to be multiplied, according to relationships among the neuro estimate value, the teaching signal, and a target value; operating a performance function for learning by using the weight coefficients; and performing learning of the neural network based on the performance function. Therefore, the same effects as described for the twenty-sixth aspect can be obtained.

According to a twenty-eighth aspect of the present invention, there is provided a learning control device comprises: a neural network for receiving a plurality of input parameter values relating to a parameter as an object of estimation, and estimating estimation object parameter values used for target follow-up control quantity operation from these input parameter values; estimation error sign decision means for deciding the kind of a sign of an error between a neuro estimate value output from the neural network and a target value; teaching error sign decision means for deciding the kind of a sign of an error between a teaching signal and the target value; sign comparison means for comparing the kinds of the respective signs decided by the estimation error sign decision means and the teaching error sign decision means; square error coefficient change means for increasing values of weight coefficients by which a square error between the neuro estimate value and the teaching signal is to be multiplied, when the sign comparison means decides that the signs are different from each other; and performance function operation means for operating a performance function for learning by using the weight coefficients; wherein learning of the neural network is performed based on the performance function. Therefore, calculation of correction quantity in the inverse direction, which occurs in a neuro control system obtained by conventional learning, is suppressed, whereby the control precision can be improved.

According to a twenty-ninth aspect of the present invention, there is provided a learning control device comprises: a neural network for receiving a plurality of input parameter values relating to a parameter as an object of estimation, and estimating estimation object parameter values used for target follow-up control quantity operation from these input parameter values; estimation error sign decision means for deciding the kind of a sign of an error between a neuro estimate value output from the neural network and a target value; estimation error absolute value calculation means for calculating an absolute value of the error between the neuro estimate value and the target value; teaching error sign decision means for deciding the kind of a sign of an error between a teaching signal and the target value; teaching signal error absolute value calculation means for calculating an absolute value of the error between the teaching signal and the target value; sign comparison means for comparing the kinds of the respective signs decided by the estimation error sign decision means and the teaching error sign decision means; absolute value comparison means for comparing the absolute values calculated by the estimation error absolute value calculation means and the teaching signal error absolute value calculation means; square error coefficient change means for increasing values of weight coefficients by which a square error between the neuro estimate value and the teaching signal is to be multiplied, when the sign comparison means decides that the kinds of the signs are identical, and the absolute value comparison means decides that the absolute value of the error between the neuro estimate value and the target value is smaller than the absolute value of the error between the teaching signal and the target value; and performance function operation means for operating a performance function for learning by using the weight coefficients; wherein learning of the neural network is performed based on the performance function. Therefore, the same effects as described for the twenty-eighth aspect can be obtained.

According to a thirtieth aspect of the present invention, there is provided a learning control device comprises: a neural network having a plurality of neuro constructions having their respective learning conditions, which receive a plurality of input parameter values relating to a parameter as an object of estimation, and estimate estimation object parameter values used for target follow-up control quantity operation from these input parameter values; state quantity detection means for detecting a state quantity relating to dynamic behavior of a control object; learning condition decision means for deciding the learning condition of the neural network in accordance with the detected value; and neuro selection means for selecting only a neuro output value corresponding to the present condition amongst the neuro constructions of the neural network in accordance with the detected value. Therefore, a construction performing divided learning is realized. Even when the dynamic behavior under the initial condition changes (e.g., change of the behavior of the control object with time), degradation of precision can be avoided by re-learning of a neuro construction adaptive to the condition where the behavior has changed.

According to a thirty-first aspect of the present invention, in the learning control device of the thirtieth aspect, when the present state quantity satisfies a specific learning condition, the neuro selection means multiplies a neuro output corresponding to the condition by a step function "1", and multiplies other neuro outputs by a step function "0", thereby selecting the neuro output. Therefore, the same effects as described for the thirtieth aspect can be obtained.

According to a thirty-second aspect of the present invention, there is provided a learning control device comprises a neural network having a plurality of neuro constructions having their respective learning conditions, which receive a plurality of input parameter values relating to a parameter as an object of estimation, and estimate estimation object parameter values used for target follow-up control quantity operation from these input parameter values. This device comprises: state quantity detection means for detecting a state quantity relating to dynamic behavior of a control object; learning condition decision means for deciding the learning condition of the neural network in accordance with the detected value; learning data storage means for storing learning data sets which have learned connection coefficients of the respective neuro constructions; learning data formation means for forming learning data for each of the learning conditions in accordance with the state quantities; learning means for performing learning of neuro connection coefficients, by using the learning data set corresponding to the condition stored in the learning data storage means, and the learning data newly formed by the learning data formation means; and coefficient updation/neuro selecting means for selecting a neuro construction corresponding to the condition and updating the neuro construction to the connection coefficients which are the learning result. Throughout this disclosure, the word "updation" means the same as "update." Therefore, even when the behavior changes and thereby the neuro estimation precision deteriorates, learning of only a neuro construction under the corresponding condition can be performed online, whereby learning is performed so that satisfactory control is achieved.

According to a thirty-third aspect of the present invention, in the learning control device of the thirty-second aspect, the learning data sets used for actual learning by the learning means are obtained by deleting old learning data sets as many as latest learning data sets, whereby the number of the learning data sets is constant. Therefore, unwanted increase in the learning time is avoided, and influence of the past data can be minimized to learn the latest condition.

According to a thirty-fourth aspect of the present invention, in the learning control device of the thirty-second aspect, the learning data sets stored in the learning data storage means are learning data sets which are always updated in the online state where the neural network itself performing neuro operation is an object of learning. Therefore, the same effects as described for the thirty-third aspect can be obtained.

According to a thirty-fifth aspect of the present invention, there is provided a learning control device comprises: a neural network having a plurality of neuro constructions having their respective learning conditions, which receive a plurality of input parameter values relating to a parameter as an object of estimation, and estimate estimation object parameter values used for target follow-up control quantity operation from these input parameter values; state quantity detection means for detecting a state quantity relating to dynamic behavior of a control object; learning condition decision means for deciding the learning condition of the neural network in accordance with the detected value; learning data storage means for storing learning data sets which have learned connection coefficients of the respective neuro constructions; learning data formation means for forming new learning data for each of the learning conditions in accordance with the state quantity; learning data set formation means for forming learning data sets for the respective neuro constructions, by using the learning data sets of all the neuro constructions corresponding to the learning condition stored in the learning data storage means, and the learning data newly formed by the learning data formation means; learning data updation means for updating the corresponding data in the learning data storage means to the newly formed learning data sets; learning means for performing learning of all the neuro connection coefficients corresponding to the learning condition by using the newly formed learning data sets; coefficient updation/neuro selection means for selecting all the neuro constructions and updating them to the connection coefficients which are the learning result; neuro construction selection means for selecting all the neuro constructions corresponding to the learning condition; and estimate calculation means for calculating a neuro estimate value to be used for control, from all the corresponding neuro outputs; wherein the estimate value is used for control quantity operation. Therefore, even when the dynamic behavior changes over plural conditions, the neuro control quantity is smooth, whereby satisfactory control is achieved.

According to a thirty-sixth aspect of the present invention, in the learning control device of the thirty-fifth aspect, in the neural network, neuro constructions under adjacent conditions have a common part of representation of control object dynamic behavior. Therefore, the same effects as described for the thirty-fifth aspect can be obtained.

According to a thirty-seventh aspect of the present invention, in the learning control device of the thirty-fifth aspect, the estimate calculation means calculates the average of all the corresponding neuro output values, as the neuro estimate value to be used for control. Therefore, the same effects as described for the thirty-fifth aspect can be obtained.

BRIEF DESCRIPTION OF THE DRAWINGS

FIGS. 11(a) and 11(b) are schematic diagrams illustrating the relationships among a target value, a teaching signal, and an estimate value in the learning control device of the first embodiment.

FIG. 12 is a functional block diagram illustrating a learning control device according to a second embodiment of the invention.

FIG. 21 is a block diagram illustrating a control system by using the parameter estimation device of the fifth embodiment.

FIG. 22 is a diagram illustrating an example of division of a control domain when the parameter estimation device of the fifth embodiment is applied to an air-to-fuel ratio controller.

FIG. 23 is a diagram illustrating an example of division of a control domain when the parameter estimation device of the fifth embodiment is applied to an air-to-fuel ratio controller, and the engine speed (Ne) and the intake air pressure (Pb) are used as parameters to explain fuzzy estimation rules.

FIGS. 26(*a*) and 26(*b*) are diagrams for explaining an NN mapping method by the parameter estimation device of the sixth embodiment.

FIG. 27 is a diagram illustrating an example of mapping by the parameter estimation device of the sixth embodiment.

DETAILED DESCRIPTION OF THE PREFERRED EMBODIMENTS

Embodiment 1

When performing target follow-up control by using neuro output values (output values from a neuro system), whether satisfactory control is achieved or not depends on errors between neuro estimate values (estimate values from the neuro system) and parameter values to be estimated. In this first embodiment of the invention, in order to improve control precision by using neuro estimate values, highly-precise learning control with regard to target values is carried out during neuro learning.

To be specific, if only reduction in the absolute values of the errors between the neuro estimate values and the parameter values to be estimated is considered, the control precision is sometimes degraded on the contrary. This first embodiment pays attention to the direction of deviation (error) of each estimate value from the corresponding target value, and learning is performed so that the direction of control agrees with the direction of deviation.

Figure 1:
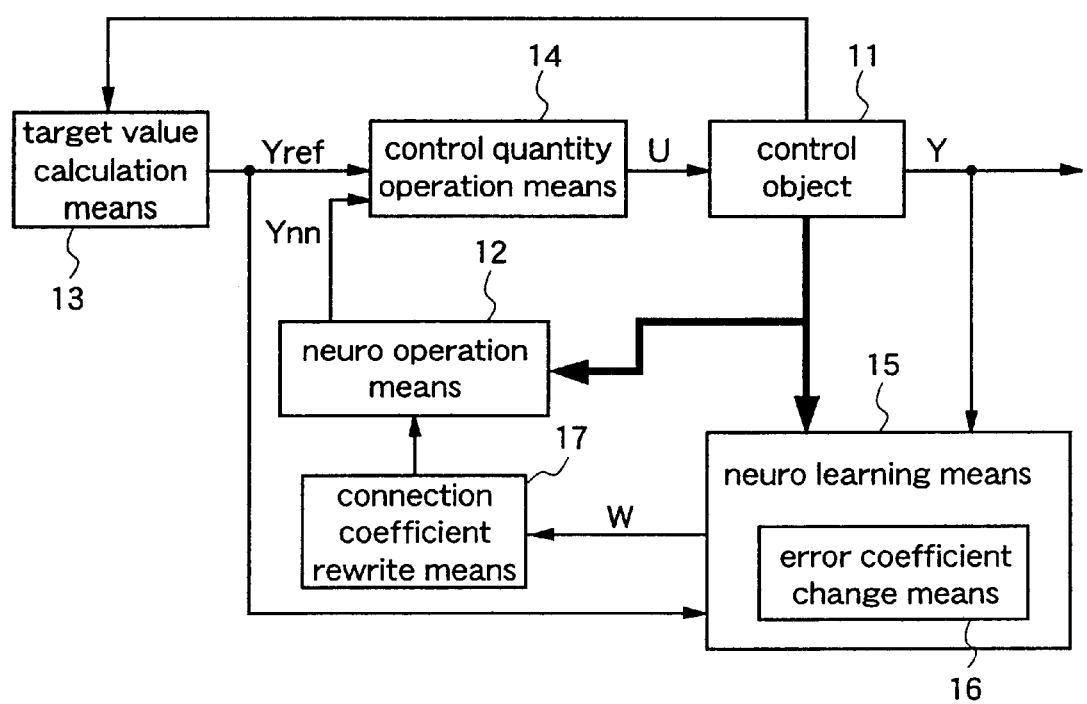
FIG. 1 is a functional block diagram illustrating a learning control device according to a first embodiment of the invention.

FIG. 1 is a block diagram illustrating a learning control device according to the first embodiment of the present invention. With reference to FIG. 1, the learning control device comprises an object 11 to be controlled (hereinafter, referred to as a control object) such as an engine; a neuro operation means 12 which performs neuro operation on a parameter Y obtained from the control object 11 to output an estimate value Ynn; a target value calculation means 13 which calculates a target value Yref of the control object 11; a control quantity operation means which generates a control quantity U of the control object 11 in accordance with the results from the neuro operation means 12 and the target value calculation means 13; a neuro learning means 15 which makes the neuro operation means 12 learn in accordance with the parameters obtained from the control object 11 and the target value calculation means 13; an error coefficient change means 16 which is included in the neuro learning means 15 and changes error coefficients; and a connection coefficient rewrite means 17 which rewrites connection coefficients W of the neuro operation means 12. Throughout this disclosure, the phrase "learning of the neuro operation means" means the same as "training of the neuro operation means" and "learning a neural network construction" means the same as "training a neural network construction."

Next, the operation of the learning control device will be described. The neuro operation means 12 receives a plurality of input parameter values relating to the estimation target parameter Y from the control object 11, and estimates estimation target parameter values from the input parameter values. Then, the target value calculation means 13 calculates the control target value Yref according to the state of the control target 11, and the control quantity operation means 14 generates the control quantity U for follow-up control of the estimate value Ynn to the target value Yref.

The error coefficient change means 16 included in the neuro learning means 15 calculates the neuro connection coefficients W of the neuro operation means 12 by learning with regard to the target value Yref. The connection coefficient rewrite means 17 rewrites the neuro connection coefficients W. The error coefficient change means 16 changes weight coefficients $\alpha$ of a performance function for an error between the neuro estimate value used for learning and a teaching signal, in accordance with the positional relationships amongst the neuro estimate value, the teaching signal, and the target value. The neuro learning means 15 learns connection coefficients based on the performance function using the weight coefficients $\alpha$.

Figure 2:
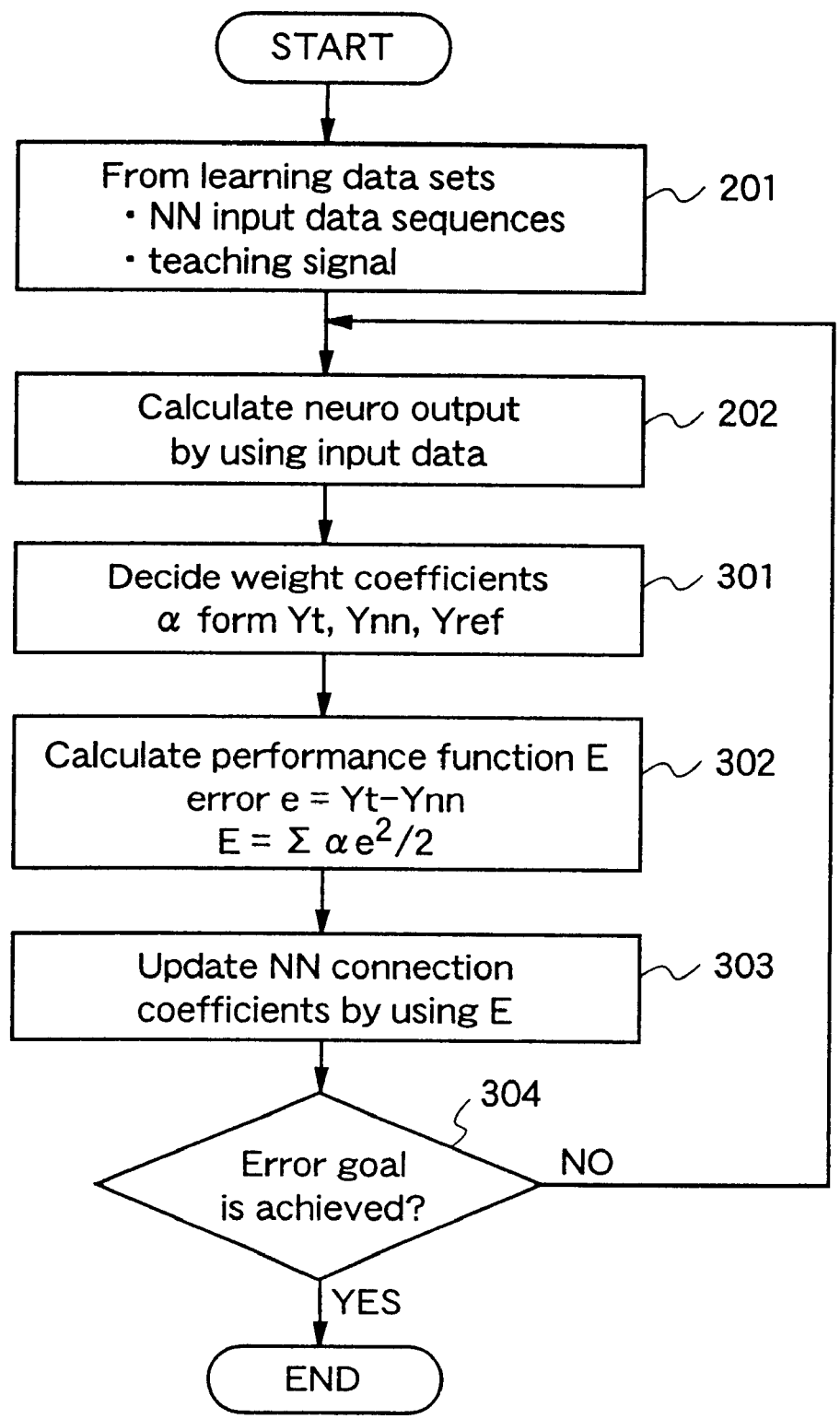
FIG. 2 is a flowchart for explaining learning by the learning control device of the first embodiment.

FIG. 2 is a flowchart for explaining the neuro learning process according to the first embodiment.

With reference to FIG. 2, a learning data set is formed in step 201. In step 202, the neuro estimate value Ynn(i) is calculated. In step 301, the weight coefficients $\alpha(i)$ of the error performance function are determined according to the teaching signal Yt(i), the estimate value Ynn(i), and the control target value Yref(i). In step 302, a performance function E is calculated by using the error e(i) between Yt(i) and Ynn(i), and the weight coefficients $\alpha(i)$. In step 303, the neuro connection coefficients are updated so as to reduce the performance function E. In step 304, a performance function Enew is calculated by using the updated connection coefficients, and then it is decided whether the error goal is achieved or not. When it is not achieved yet, the control returns to step 202 to advance the learning. The learning is ended when the error goal is achieved.

Figure 18:
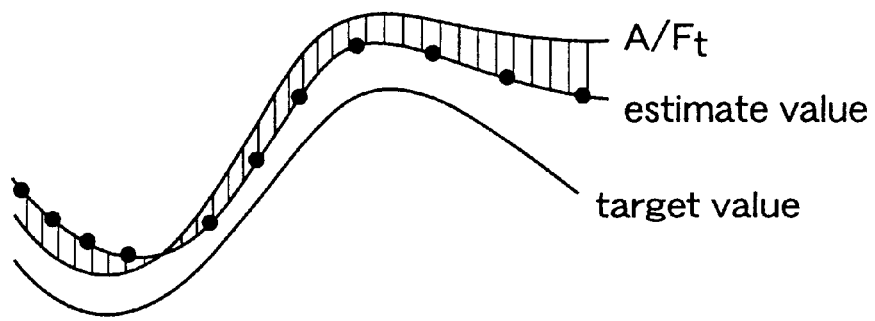
FIG. 18 is a diagram illustrating the relationships amongst estimate value, target value, air-to-fuel ratio, and control direction, in learning control of the invention.
Figure 64:
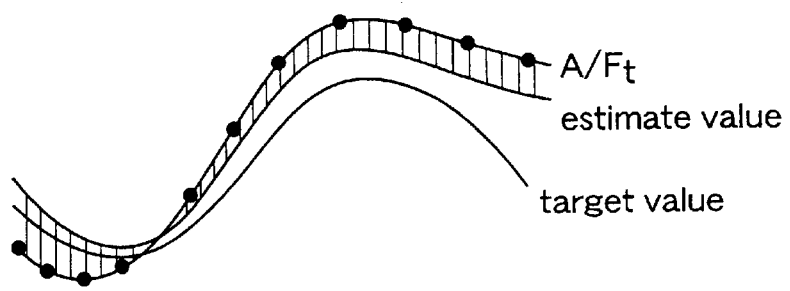
FIG. 64 is a diagram illustrating the relationships amongst estimate value, target value, air-to-fuel ratio, and control direction in conventional learning control.

In the learning flow of this first embodiment, as shown in FIG. 64, the weight coefficients $\alpha$ of the error performance function are increased with respect to data for which an estimate value is calculated in the direction along which control is advanced in getting away from the target, even if the absolute value of the error is small. On the other hand, the weight coefficients $\alpha$ are decreased with respect to the direction along which control is performed in approaching the target. In either case, learning is performed so that it is controlled in approaching the target as shown in FIG. 18. Therefore, learning can be performed so that failsafe control is performed, whereby learning can be controlled always in the safe direction even when learning is performed online.

Figure 3:
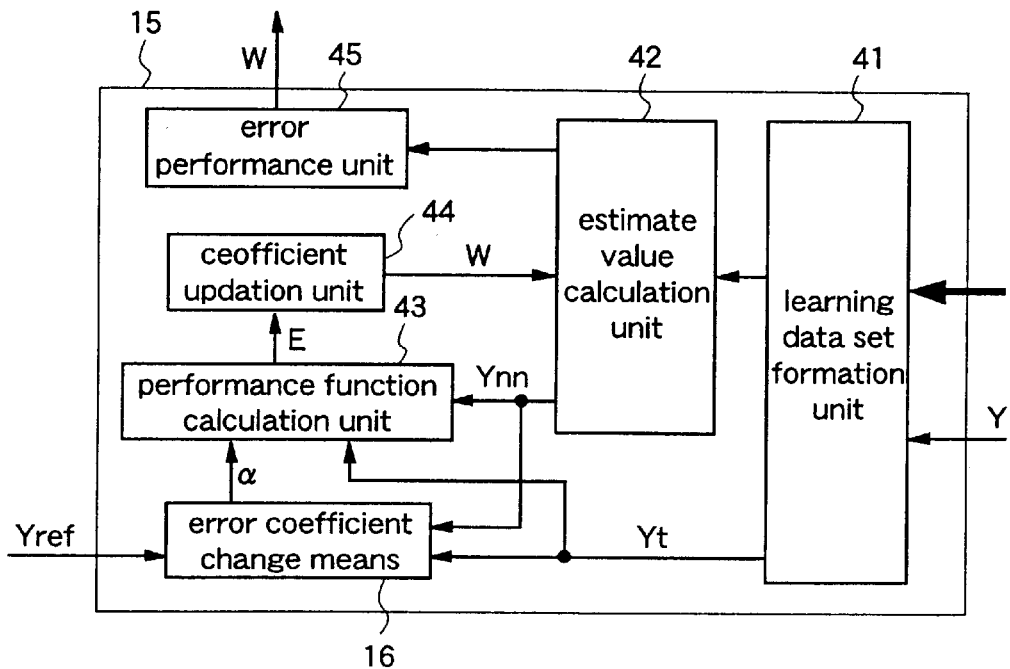
FIG. 3 is a block diagram illustrating a neuro learning function of the learning control device of the first embodiment.

FIG. 3 is a functional block diagram illustrating the neuro learning means 15 shown in FIG. 1. With reference to FIG. 3, the neuro learning means 15 comprises a learning data set formation unit 41 which forms a neuro input data sequence and teaching data Yt for this data sequence, i.e., a learning data set; an estimate calculation unit 42 which calculates an estimate value in accordance with the neuro input data in the learning data set; a performance function calculation unit 43 which calculates a performance function in accordance with an error between this estimate value and the teaching data Yt; a coefficient updation unit 44 which updates coefficients in accordance with the performance function; an error evaluation unit 45 which performs error evaluation in accordance with the estimate value; and an error coefficient change means 16 which changes error coefficients in accordance with the teaching data Yt in the learning data set, the estimate value, and the target value.

A description is given of the operation of the neuro learning means 15. The learning data set formation unit 41 forms a neuro input data sequence and a teaching data sequence Yt for this data sequence in accordance with a plurality of parameters from the control object and the output Y of the control object. The estimate calculation unit 42 calculates the estimate value Ynn in accordance with the learning data set and weight coefficients w from the coefficient updation unit 44. The error coefficient change means 16 changes the error coefficients $\alpha$ in accordance with the teaching data Yt from the learning data set formation unit 41, the estimate value Ynn from the estimate calculation unit 42, and the target value Yref from the target calculation means 13 shown in FIG. 1. The performance function calculation unit 43 calculates an error performance function E in accordance with the error coefficients α from the error coefficient change unit 16, the teaching data Yt from the learning data set formation unit 41, and the estimate value Ynn from the estimate calculation unit 42. The coefficient updation unit 44 updates the weight coefficients W in accordance with the error performance function E from the performance function calculation unit 43. The estimate calculation unit 42 calculates the estimate value Ynn in accordance with the neuro input data sequence from the learning data set formation unit 41 and the weight coefficients W from the coefficient updation unit 44. The error evaluation unit 45 performs error evaluation on the weight coefficients W in accordance with the estimate value Ynn from the estimate calculation unit 42, and outputs the result to the connection coefficient rewrite means 17.

The learning control device of this first embodiment can perform learning with regard to the direction of deviation (error) between the target value and the estimate value, whereby the precision of the target follow-up control using the neuro estimate value can be increased as compared with the conventional learning methods.

Figure 4:
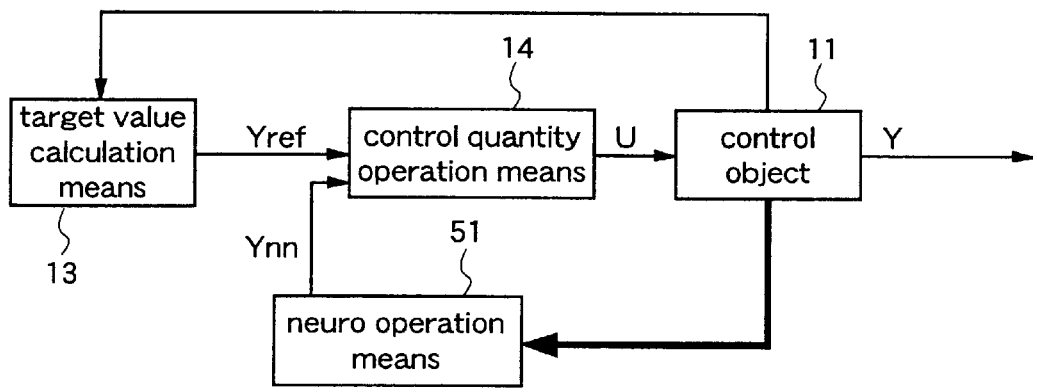
FIG. 4 is a diagram illustrating an example of a neuro control structure in offline learning of the learning control device of the first embodiment.

Although the above-mentioned control device performs online learning, it may perform offline learning. In this case, neuro connection coefficients are previously calculated offline according to the above-described learning flow with regard to the target value, and the calculated coefficients are written in a ROM as connection coefficients in the neuro operation means 51 shown in FIG. 4. Also in this case, the same effects as mentioned above are achieved.

Figure 5:
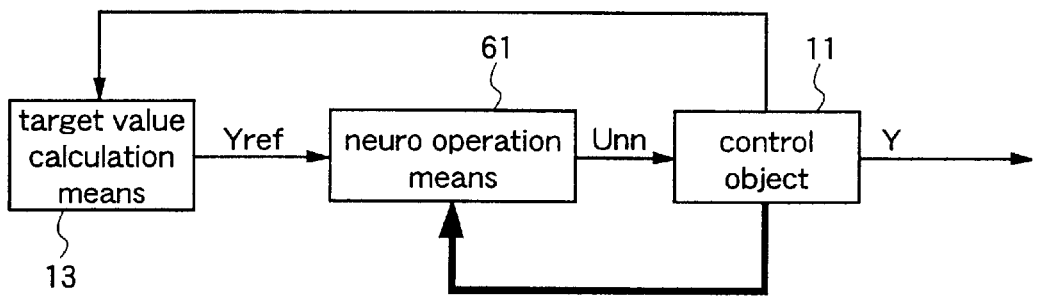
FIG. 5 is a diagram illustrating another example of a neuro control structure in offline learning of the learning control device of the first embodiment.

Further, in this first embodiment, emphasis has been placed on so-called "forward neuro construction" in which the output from the neuro construction is the output from the control object, and the parameter to be subjected to neuro estimation is a parameter which is controlled to be the target value. However, as shown in FIG. 5, so-called "backward neuro construction" is also within the scope of the invention, in which the output from the neuro construction is the input to the control object, i.e., the inverse system of the control object is learned. Also in the backward neuro construction, learning is performed according to the output performance function with regard to the target value Yref, whereby the precision of the target follow-up control can be improved as compared with the conventional learning methods.

Hereinafter, a description is given of an example of a neuro learning method when performing target follow-up control by using a neuro estimate value.

Figure 6:
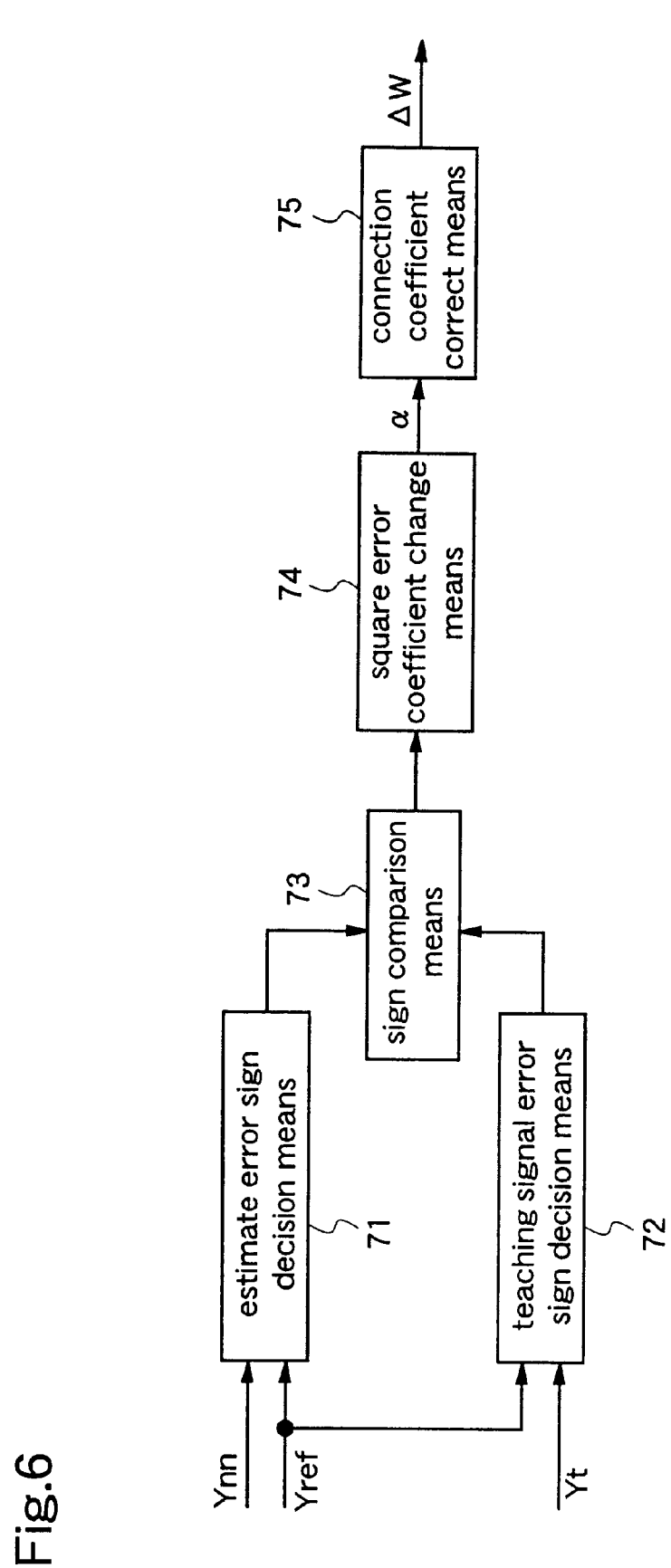
FIG. 6 is a functional block diagram relating to a learning method of the learning control device of the first embodiment.

FIG. 6 is a functional block diagram illustrating the error coefficient change means as a component of the learning control device according to the first embodiment.

In FIG. 6, 71 denotes an estimation error sign decision means which decides a sign of an error e1 between a neuro estimate value Ynn and a target value Yref; 72 denotes a teaching error sign decision means which decides a sign of an error e2 between a teaching signal Yt and the target value Yref; 73 denotes a sign comparison means which compares these signs; 74 denotes a square error coefficient change means which increases weight coefficients α by which a square error $e^2$ between the neuro estimate value Ynn and the teaching signal Yt is multiplied, when the sign comparison means 73 decides that the sign of the error e1 is different from the sign of the error e2; and 75 denotes a connection coefficient correction means which operates a performance function E for learning by using the weight coefficients α and corrects neuro connection coefficients according to the performance function E. The learning control device shown in FIG. 6 comprises the estimation error sign decision means 71, the teaching error sign decision means 72, the sign comparison means 73, the square error coefficient change means 74, and the connection coefficient correction means 75.

Figure 8:
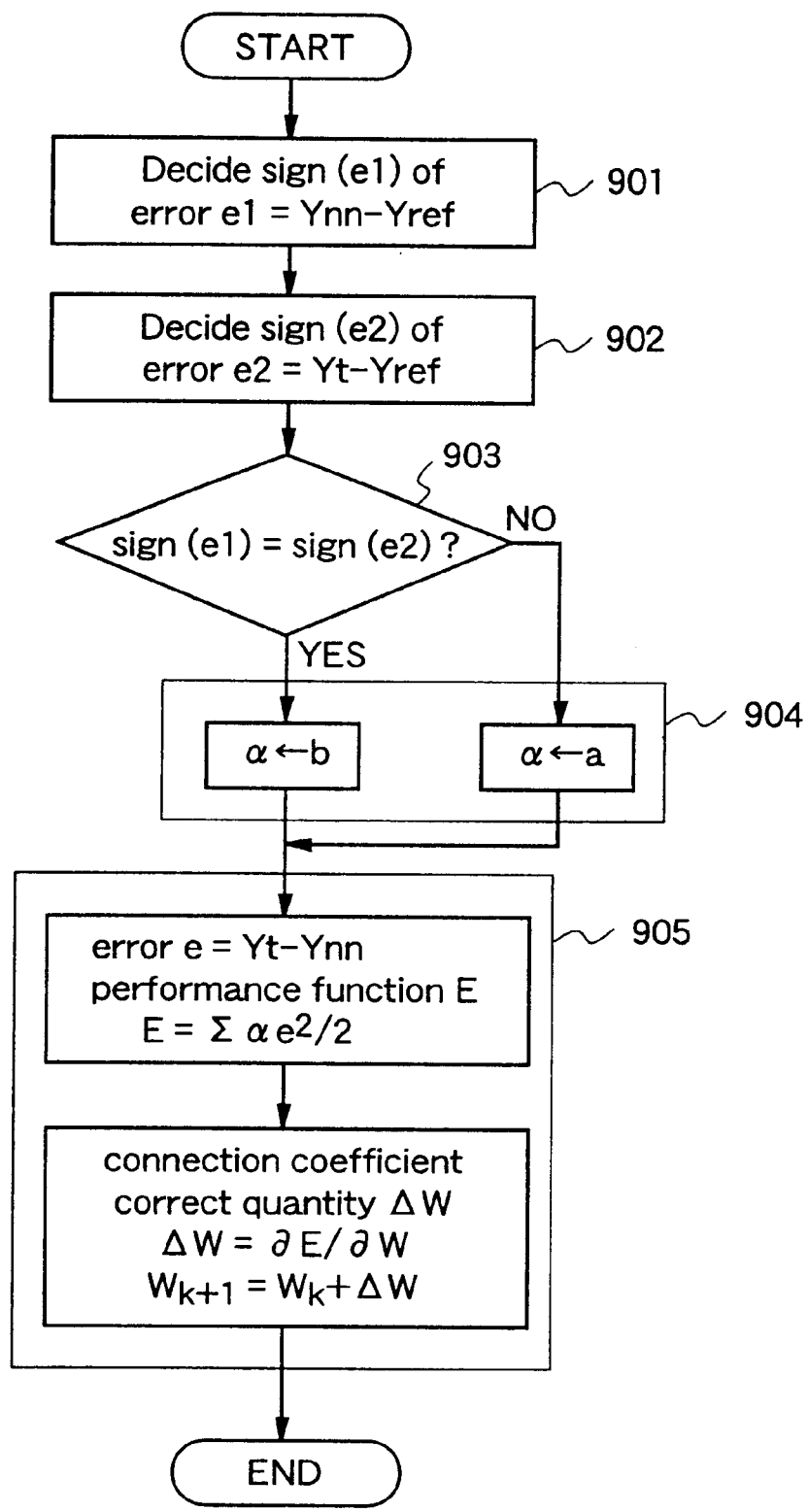
FIG. 8 is a flow chart for explaining the processing by the learning control device of the first embodiment.

FIG. 8 shows a process flow of the learning control device shown in FIG. 6. Initially, in step 901, the sign sign(e1) of the error e1 between the Ynn and the Yref is decided. In step 902, the sign sign(e2) of the error e2 between the Yt and the Yref is decided. In step 903, it is decided whether the sign(e1) and the sign(e2) are identical or not. In step 904, when these signs are different from each other, a is given to the weight coefficients α, and when these signs are identical, b is given to the weight coefficients α (a>b>0). In step 905, a performance function E is calculated by using the weight coefficients α and an estimate error e between the Yt and the Ynn and, thereafter, a correction quantity ΔW of the neuro connection coefficients W is obtained by using this E, according to the back propagation method or the like.

Figure 9:
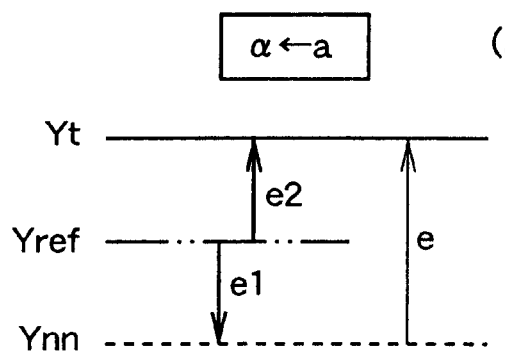
FIGS. 9(a) and 9(b) are schematic diagrams illustrating relationships amongst target value, teaching signal, and estimate value, in the learning control device of the first embodiment.
Figure 9:
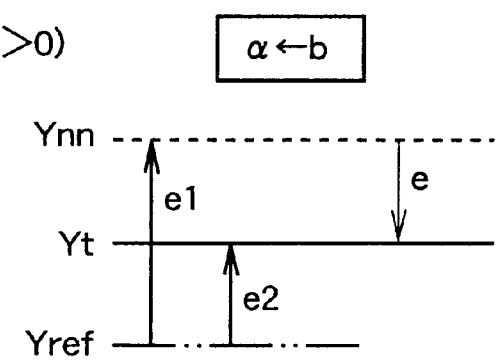

FIGS. 9(a) and 9(b) are schematic diagrams illustrating the positional relations amongst the teaching signal Yt in the learning data, the target value Yref, and the neuro estimate value Ynn. According to the flow of FIG. 8, as shown in FIG. 9(a), when the Yt and the Ynn are positioned on opposite sides of the target Yref, the weight coefficients α are increased. As shown in FIG. 9(b), when the Yt and the Ynn are positioned on the same side of the target Yref, the weight coefficients α are set smaller than in the state of FIG. 9(a).

By performing learning with the above-described construction, when the estimate value and the teaching signal are positioned on opposite sides of the target value, correction of connection coefficients used for calculating this estimate value advances, whereby learning advances so that the estimate value comes to the same side as the teaching signal with respect to the target signal. When calculating a control quantity to be a target value by using the neuro construction which has so learned, undesired operation of a correction value in the opposite direction is suppressed, resulting in increased control precision. Thereby, it is possible to perform learning such that the control result becomes failsafe. Accordingly, even when learning is performed online, it is possible to calculate an estimate value which is positioned on the same side as the teaching signal with respect to the target value when control is performed using the learning result.

Hereinafter, a description is given of another example of a neuro learning method when performing target follow-up control by using neuro estimate values.

Figure 7:
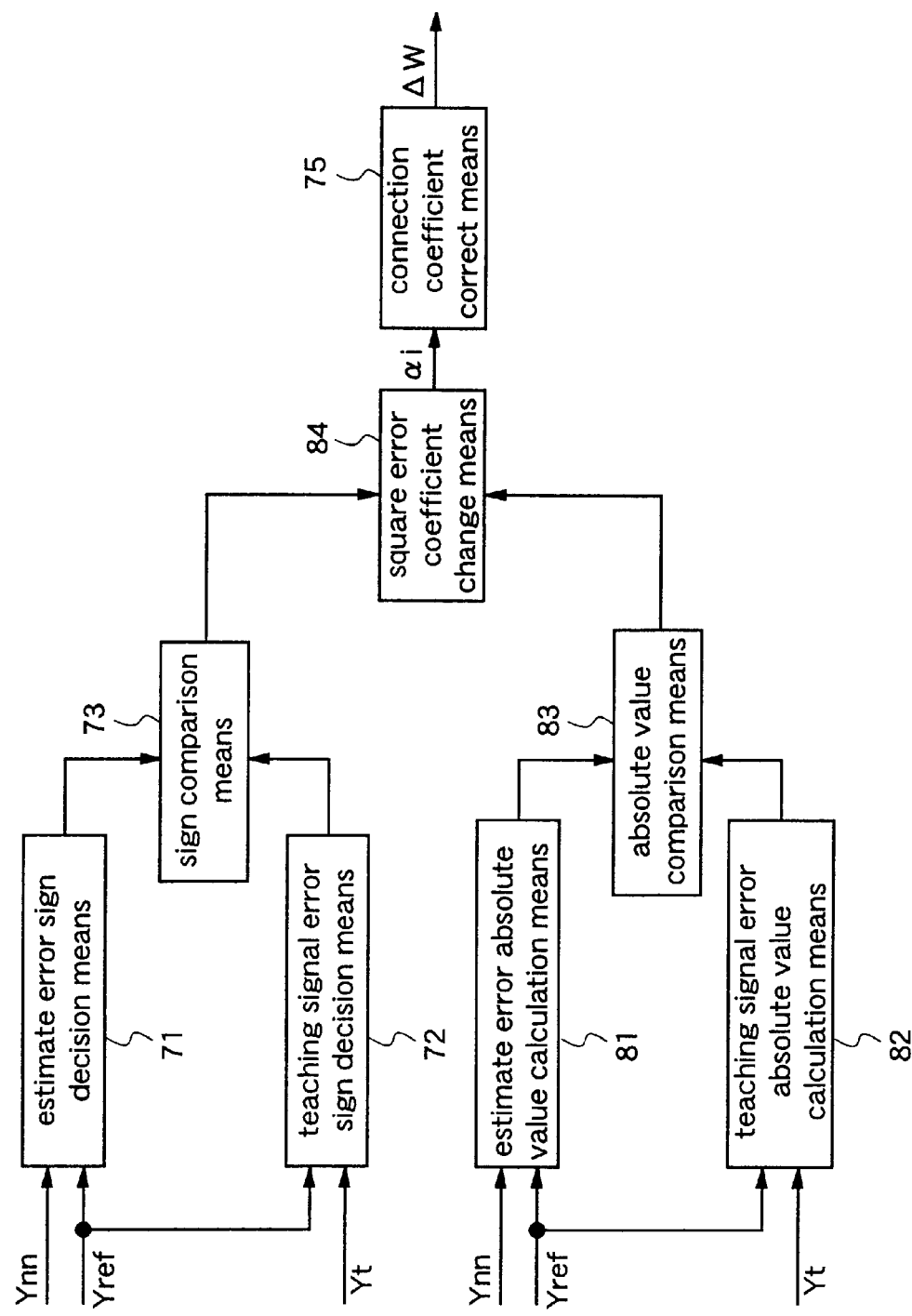
FIG. 7 is a functional block diagram relating to another learning method of the learning control device of the first embodiment.

FIG. 7 is a functional block diagram illustrating an error coefficient change means included in the learning control device according to the first embodiment.

In FIG. 7, 71 denotes an estimation error sign decision means which decides a sign of an error e1 between a neuro estimate value Ynn and a target value Yref; 72 denotes a teaching error sign decision means which decides a sign of an error e2 between a teaching signal Yt and the target value Yref; 73 denotes a sign comparison means which compares these signs; 81 denotes an estimation error absolute value calculation means which calculates an absolute value of the error e1 between the neuro estimate value Ynn and the target value Yref; 82 denotes a teaching signal error absolute value calculation means which calculate an absolute value of the error e2 between the teaching signal Yt and the target value Yref; 83 denotes an absolute value comparison means which compares these absolute values; 84 denotes a square error coefficient change means which increases the weight coefficients α by which a square error $e^2$ between the neuro estimate value Ynn and the teaching signal Yt is multiplied, when the sign comparison means 73 decides that the signs are identical and the absolute value comparison means 83 decides that the absolute value of the error e1 between the neuro estimate value Ynn and the target value Yref is smaller than the absolute value of the error e2 between the teaching signal Yt and the target value Yref; and 75 denotes a connection coefficient correction means which operates a performance function E for learning by using the weight coefficients α and corrects neuro connection coefficients according to the performance function E. The learning control device shown in FIG. 7 comprises the estimation error sign decision means 71, the teaching error sign decision means 72, the sign comparison means 73, the estimation error absolute value calculation means 81, the teaching signal error absolute value calculation means 82, the absolute value comparison means 83, the square error coefficient change means 84, and the connection coefficient correction means 75.

Figure 10:
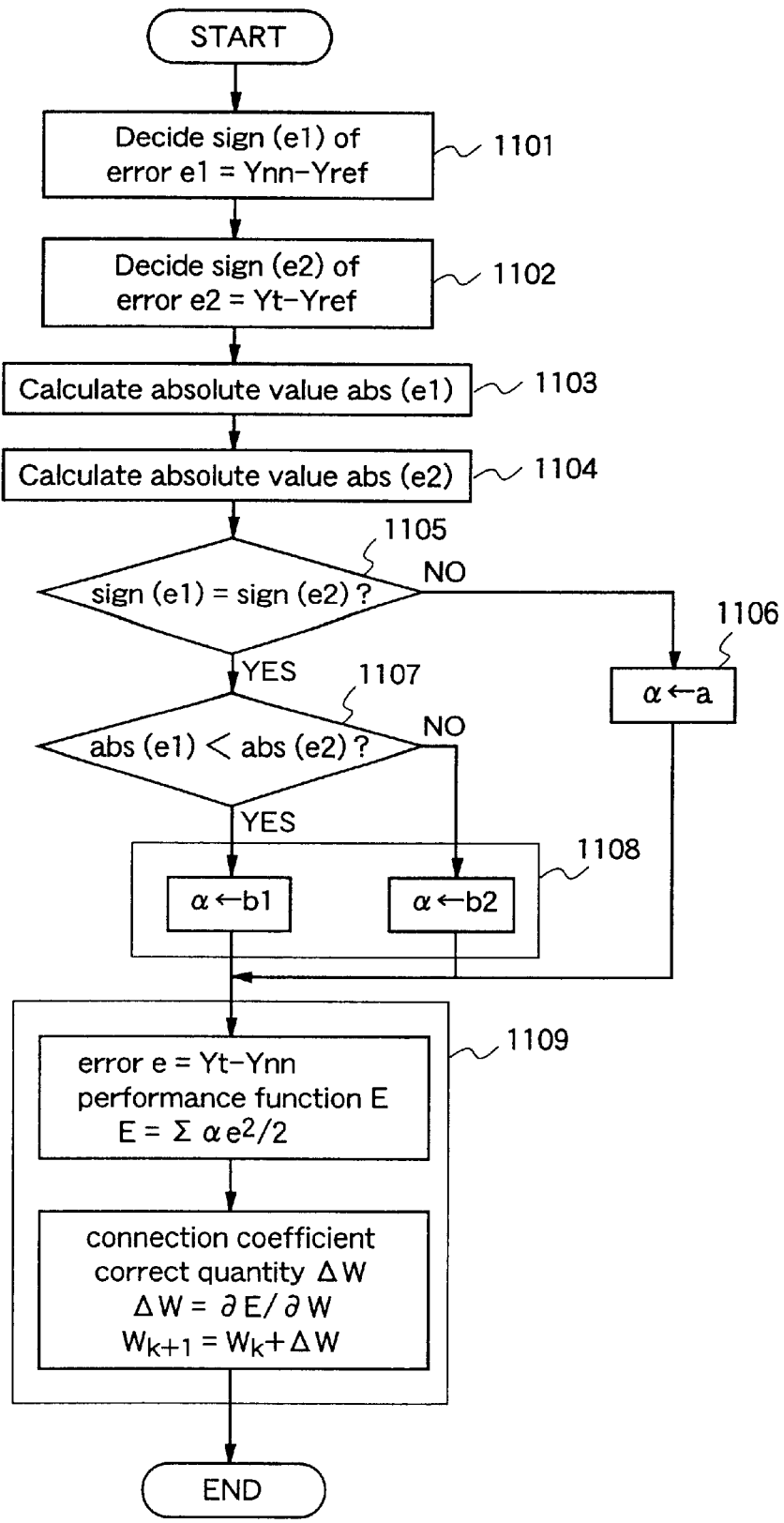
FIG. 10 is a flowchart for explaining the processing by the learning control device of the first embodiment.

FIG. 10 shows a process flow of the learning control device shown in FIG. 7. Initially, in step 1101, the sign sign(e1) of the error e1 between the Ynn and the Yref is decided. In step 1102, the sign sign(e2) of the error e2 between the Yt and the Yref is decided. In step 1103, an absolute value abs(e1) of the error e1 is calculated. In step 1104, an absolute value abs(e2) of the error e2 is calculated. In step 1105, it is decided whether the sign(e1) and the sign(e2) are identical or not. In step 1106, when these signs are different from each other, a is given to the weight coefficients α. When these signs are identical, in step 1107, the absolute value abs(e1) is compared with the absolute value abs(e2). In step 1108, when the abs(e1) is smaller than the abs(e2), b1 is given to the weight coefficients α. When the abs(e1) is equal to or larger than the abs(e2), b2 is given to the weight coefficients α (a>b1(>1>)>b2>0). In step 1109, a performance function E is calculated by using the weight coefficients α and an estimate error e between the Yt and the Ynn and, thereafter, a correction quantity ΔW of the neuro connection coefficients W is obtained by using this E according to the back propagation method or the like.

FIGS. 11(*a*) and 11(*b*) are schematic diagrams illustrating the positional relations amongst the teaching signal Yt in the learning data, the target value Yref, and the neuro estimate value Ynn. As shown in FIG. 11(*a*), when the Yt and the Ynn are positioned on the same side of the target Yref and the abs(e1) is smaller than abs(e2) (abs(e1)<abs(e2)), the weight coefficients are increased. As shown in FIG. 11(*b*), when the Yt and the Ynn are positioned on the same side of the target Yref and the abs(e1) is equal to or larger than abs(e2) (abs(e1)≧abs(e2), the weight coefficients α are set smaller than in the state of FIG. 9(*a*).

By performing learning with the above-described construction, when the estimate value and the teaching signal are positioned on opposite sides of the target value, correction of connection coefficients used for calculating this estimate value advances. Further, in the case where the estimate value and the teaching signal are positioned on the same side of the target value, when the estimate value is closer to the target value than the teaching signal, the result obtained by using the corrected coefficients is prevented from migrating in the opposite direction from the target value, thereby increasing the speed of learning convergence so that the estimate value is always positioned on the same side of the target value. When calculating a control quantity to be a target value by using the neuro construction which has so learned, undesired operation of a correction value in the opposite direction from the original direction is suppressed, resulting in increased control precision.

Hence, failsafe learning is realized. Accordingly, even when learning is performed online, it is possible to calculate estimate values positioned on the same side of target values when performing control by using the learning result.

The value given to the weight coefficients α may be varied according to the abs(e1), for example, b may be brought closer to a as the abs(e1) gets closer to zero. In this case, desired estimation result can be obtained quickly.

Embodiment 2

By the way, when control is performed by using an output from a neuro construction (neuro output) which has learned based on data collected under a specific condition, the behavior sometimes varies from the behavior under the initial conduction, for example, the dynamic behavior of the control object sometimes changes with time. In this case, desired control precision cannot be secured. In order to solve this problem, the second embodiment of the present invention provides a relatively simple neuro construction which can perform divided learning.

FIG. 12 is a functional block diagram illustrating a learning control device according to the second embodiment.

In FIG. 12, 131 denotes a state quantity detection means which detects a state quantity Y relating to the dynamic behavior of a control object 11; 132 denotes a learning condition decision means which decides the learning condition in accordance with the detected value; 134 denotes a neuro operation means which has a neuro construction comprising a plurality of neural networks NN1–NNm having their respective learning conditions; 133 denotes a neuro selection means which selects only a neuro output corresponding to the present condition based on the state quantity; 13 denotes a target value calculation means which calculates a control target value Yref according to the state of the control object 11; and 14 denotes a control quantity calculation means which receives the control target value Yref and a neuro estimate value Ynn obtained in the neuro construction selected by the neuro selection means 133 and then calculates a control quantity U used for follow-up control of the estimate value Ynn to the corresponding target value Yref. The learning control device shown in FIG. 12 comprises the state quantity detection means 131, the learning condition decision means 132, the neuro operation means 134, the neuro selection means 133, the target value calculation means 13, and the control quantity calculation means 14.

In the neuro selection means 133, when the present state quantity satisfies a specific learning condition, a neuro output corresponding to this condition is multiplied by "1" (step function) while other neuro outputs are multiplied by "0". Thereby, the structure of the system can be simplified.

Figure 13:
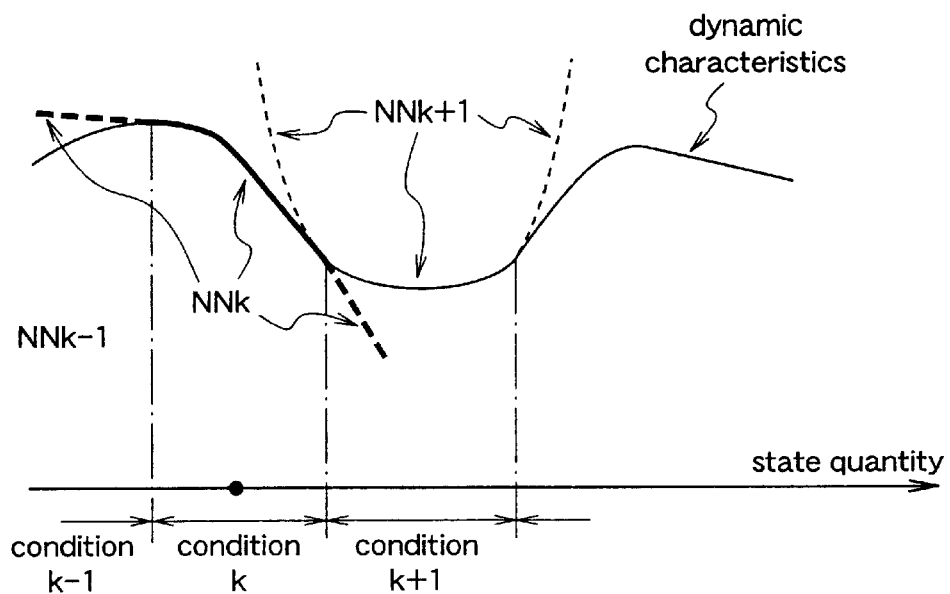
FIG. 13 is a schematic diagram illustrating a neuro learning domain in the learning control device of the second embodiment.

FIG. 13 is a diagram illustrating the conception of a neuro learning domain in the case where a learning condition is set according to one detected value. When representing the dynamic behavior of the control object by a neuro construction, the entire learning condition is divided into plural learning conditions in accordance with the value detected by the state quantity detection means 131, and each of the neural networks NN1–NNk–NNm is made to learn by using learning data within each condition.

Figure 14:
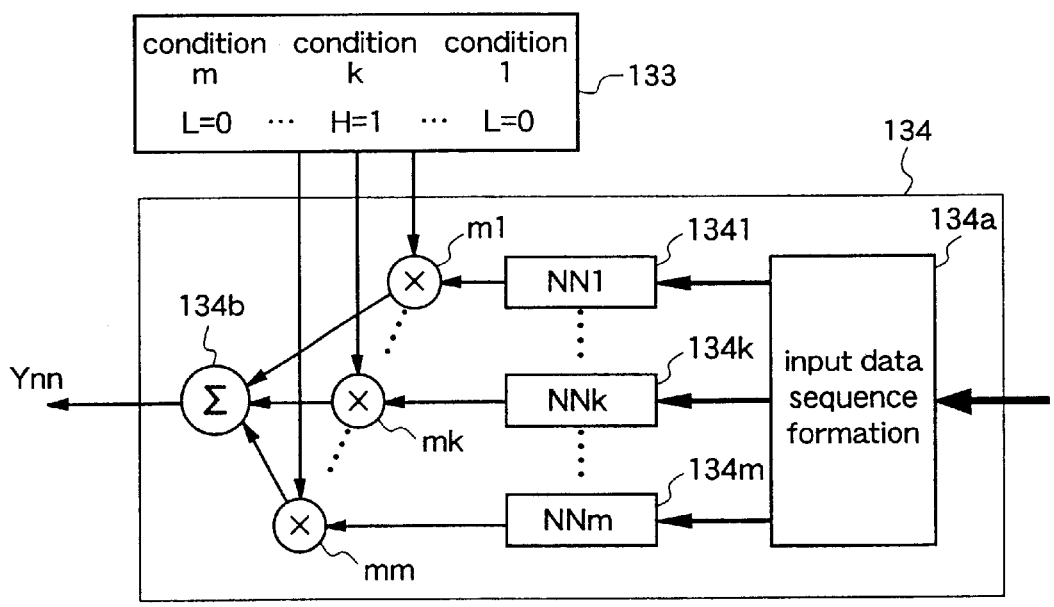
FIG. 14 is a diagram illustrating an example of a neuro selection method in the learning control device of the second embodiment.

FIG. 14 shows examples of the neuro selection means 133 and the neuro operation means 134.

As shown in FIG. 14, the neuro selection means 133 has plural output ports corresponding to the conditions 1–m. The neuro selection means 133 outputs High (="1") for the condition k corresponding to the detected value from the state quantity detection means 131, and Low (="0") for the other conditions. In the neuro operation means 134, an input data sequence formation unit 134a forms input data sequences 134l–134m, and these data sequences are operated in the respective neural networks NN1–NNm. The outputs from the neural networks NN1–NNm are multiplied by the corresponding outputs from the neuro selection means 133 by multipliers m1–mm, respectively, and the sum is obtained by an adder 134b. Thereby, only a neural network under the corresponding condition can be selected.

While in this second embodiment all the neural networks are subjected to the operation, only the neural network selected by the neuro selection means 133 may be subjected to the operation to reduce the processing load.

As described above, according to the second embodiment of the invention, only the neuro construction (neural network) corresponding to the condition under which the dynamic behavior changes is subjected to re-learning, whereby degradation of precision can be avoided. Therefore, it is possible to solve the problem that the control precision decreases when performing re-learning of the neural network for all the conditions.

Embodiment 3

This third embodiment of the present invention provides a learning control device which can perform the divided learning of the second embodiment online.

Figure 15:
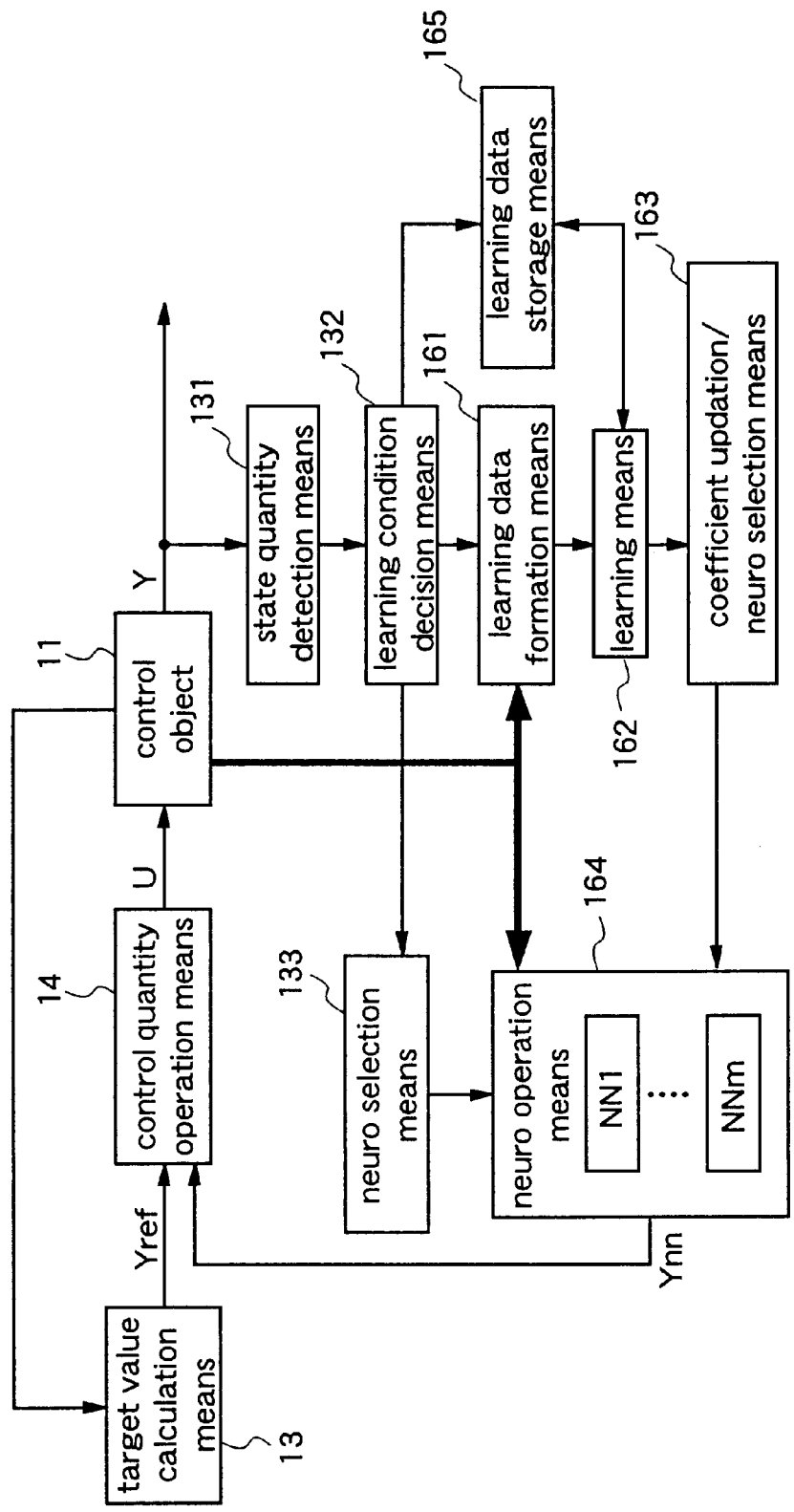
FIG. 15 is a functional block diagram illustrating a learning control device according to a third embodiment of the present invention.

FIG. 15 is a functional block diagram illustrating a learning control device according to the third embodiment.

In FIG. 15, 131 denotes a state quantity detection means which detects a state quantity Y relating to the dynamic behavior of a control object 11; 132 denotes a learning condition decision means which decides a learning condition in accordance with the detected value; 133 denotes a neuro selection means which selects only a neuro output corresponding to the present condition based on the state quantity; 164 denotes a neuro operation means comprising plural neural networks (neuro constructions) NN1–NNm having their respective learning conditions; 165 denotes a leading data storage means which stores learning data sets which have learned connection coefficients of the respective neuro constructions; 161 denotes a learning data formation means which forms new learning data for each of the learning conditions in accordance with the state quantity; 162 denotes a learning means which performs learning of neuro connection coefficients by using the learning data set corresponding to the condition stored in the learning data storage means 165 and the new learning data formed by the learning data formation means 161; and 163 denotes a coefficient updation/neuro selection means which updates the connection coefficients of the corresponding neuro construction to the connection coefficients of the learning result. The learning control device of this third embodiment comprises the state quantity detection means 131, the learning condition decision means 132, the learning data formation means 161, the learning means 162, the coefficient updation/neuro selection means 163, the neuro operation means 164, and the learning data storage means 165.

As shown in FIG. 14, the neuro selection means 133 has plural output ports corresponding to the conditions 1–m. The neuro selection means 133 outputs High (="1") for the condition k corresponding to the detected value from the state quantity detection means 131, and Low (="0") for the other conditions. In the neuro operation means 134, an input data sequence formation unit 134a forms input data sequences 134l–134m, and these data sequences are operated in the respective neuro constructions NN1–NNm. The outputs from the neuro constructions NN1–NNm are multiplied by the corresponding outputs from the neuro selection means 133 by multipliers m1–mm, respectively, and the sum is obtained by an adder 134b. Thereby, only a neuro construction under the corresponding condition can be selected.

A description is given of the operation. In the neuro selection means 133, when the present state quantity satisfies a specific learning condition, the neuro output corresponding to the condition is multiplied by "1", (step function) while the other neuro outputs are multiplied by "0", whereby a target neural network is selected from the neuro operation means 164.

Then, the learning data formation means 161 forms learning data for the target neural network so selected. That is, as in the first embodiment, the neuro operation means 164 receives a plurality of input parameter values relating to the estimation target parameter Y from the control object 11, and estimates estimation target parameter values from the input parameter values. Then, the target value calculation means 13 calculates a control target value Yref according to the state of the control target 11, and the control quantity operation means 14 generates a control quantity U for follow-up control of the estimate value Ynn to the target value Yref.

The neuro connection coefficient W of the neuro operation means 164 are calculated by the learning means 162, whereby a neural network corresponding to the target condition is selected and its weight coefficients are updated by the coefficient updation/neuro selection means 163.

The coefficient updation/neuro selection means 163 may be provided with an error coefficient change means, as in the first embodiment of the invention. In this case, the error coefficient change means changes the weight coefficients α of the error performance function between the neuro estimate value used for learning and the teaching signal in accordance with the relative positional relations amongst the neuro estimate value, the teaching signal, and the target value. Thereafter, the learning means 162 performs learning of connection coefficients based on the performance function using the weight coefficients α. Thereby, the neural network corresponding to the target condition can be made to learn so that it performs failsafe control.

The learning data sets used for actual learning in the learning means 162 are obtained by deleting the old learning data sets as many as the updated learning data sets and, therefore, the total number of the learning data sets is constant. The updated learning data sets are again stored in the learning data storage means 165.

According to the third embodiment of the present invention, even when the dynamic behavior of the control object changes and thereby the precision of neuro estimation degrades, divided learning, in which only a neural network under the corresponding condition performs learning, can be performed online, resulting in satisfactory control.

Embodiment 4

A fourth embodiment of the present invention provides a learning control device in which neuro control is made smooth when the dynamic behavior changes over plural conditions.

Figure 16:
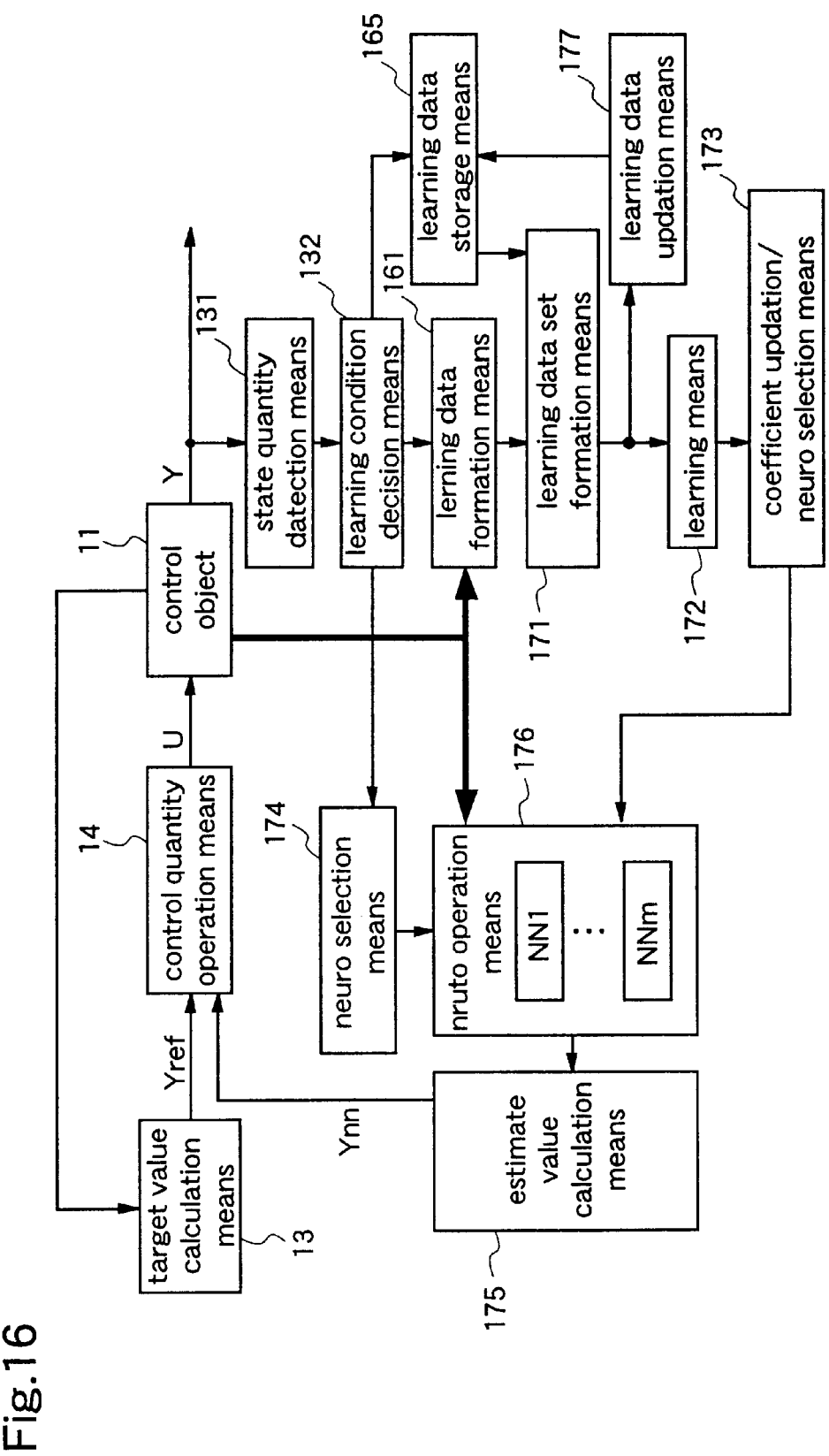
FIG. 16 is a function block diagram illustrating a learning control device according to a fourth embodiment of the present invention.

FIG. 16 is a functional block diagram illustrating a learning control device according to the fourth embodiment.

In FIG. 16, 131 denotes a state quantity detection means which detects a state quantity Y relating to the dynamic behavior of a control object 11; 132 denotes a learning condition decision means which decides a learning condition in accordance with the detected value; 176 denotes a neuro operation means which comprises plural neural networks (neuro constructions) NN1–NNm having their respective learning conditions; 165 denotes a leading data storage means which stores learning data sets which have learned connection coefficients of the respective neuro constructions; 161 denotes a learning data formation means which forms new learning data for each of the learning conditions in accordance with the state quantity; 171 denotes a learning data set formation means which forms learning data sets for the respective neuro constructions by using the learning date sets of all the neuro constructions corresponding to the learning conditions stored in the learning data storage means 165 and the learning data newly formed by the learning data formation means 161; 177 denotes a learning data updation means which updates the learning data stored in the learning data storage means 165 to the corresponding newly-formed learning data sets; 172 denotes a learning means which performs learning of all the neuro connection coefficients corresponding to the learning conditions by using the newly-formed learning data sets; 173 denotes a coefficient updation/neuro selection means which selects all the corresponding neuro constructions and updates the connection coefficients of the neuro constructions to the connection coefficients of the learning results; 174 denotes a neuro construction selection means which selects all the neuro constructions corresponding to the learning conditions; and 175 denotes an estimate calculation means which calculates a neuro estimate value used for control from all the corresponding neuro outputs.

The learning control device of this fourth embodiment comprises the state quantity detection means 131, the learning condition decision means 132, the neuro operation means 176, the learning data storage means 165, the learning data formation means 161, the learning data set formation means 171, the learning data updation means 177, the learning means 172, the coefficient updation/neuro selection means 173, the neuro construction selection means 174, and the estimate calculation means 175. The estimate value obtained by the estimate calculation means 175 is used for control quantity operation.

A description is given of the operation. The fundamental operation of the learning control device of this fourth embodiment is identical to that of the third embodiment. Based on the learning condition decided by the learning condition decision means 132, the neuro selection means 174 selects a neural network. In this fourth embodiment, based on the estimate value output from the selected neural network, the estimate calculation means 175 calculates an estimate value as follows. That is, with respect to a portion (common portion) at the boundary between adjacent conditions (e.g., k and k+1 in FIG. 17), which portion is included in both of these conditions, the estimate calculation means 175 forms an estimate value based on the estimate values of these conditions (e.g., the average). With reference to this new estimate value as well as the estimate value output from the selected neural network, the control quantity operation means 14 outputs a control quantity to the control object 11 so that these estimate values approach the target value.

The state quantity detection means 131 detects the state quantity of the control object 11. The learning condition decision means 132 decides the learning condition in accordance with the state quantity and stores the learning condition in the learning data storage means 165. The learning data formation means 161 forms learning data in accordance with the learning condition decided by the learning condition decision means 132. In this fourth embodiment, based on the learning data, the learning data set formation means 171 forms a learning data set according to each condition. The learning means 172 advances the learning of the neuro operation means 17 in accordance with the learning data set.

The coefficient updation/neuro selection means 173 receives the weight coefficients calculated by the learning means 172, selects all the neural networks corresponding to the learning condition, and updates the weight coefficients of these neural networks.

On the other hand, the learning data updation means 177 detects newly-formed ones from the learning data sets formed by the learning data set formation means 171, and updates the learning data stored in the learning data storage means 165 by using the detected learning data sets. The learning data updation means 177 performs the updation such that old learning data sets as many as the new learning data sets are deleted. Therefore, the number of learning data sets stored in the storage means 165 is constant.

The learning data set formation means 171 forms learning data sets for the respective neural networks corresponding to the condition. The learning means 172 advances learning of the neuro operation means 176 in accordance with the learning data set. The coefficient updation/neuro selection means 173 selects the corresponding neural networks and updates their weight coefficients.

Figure 17:
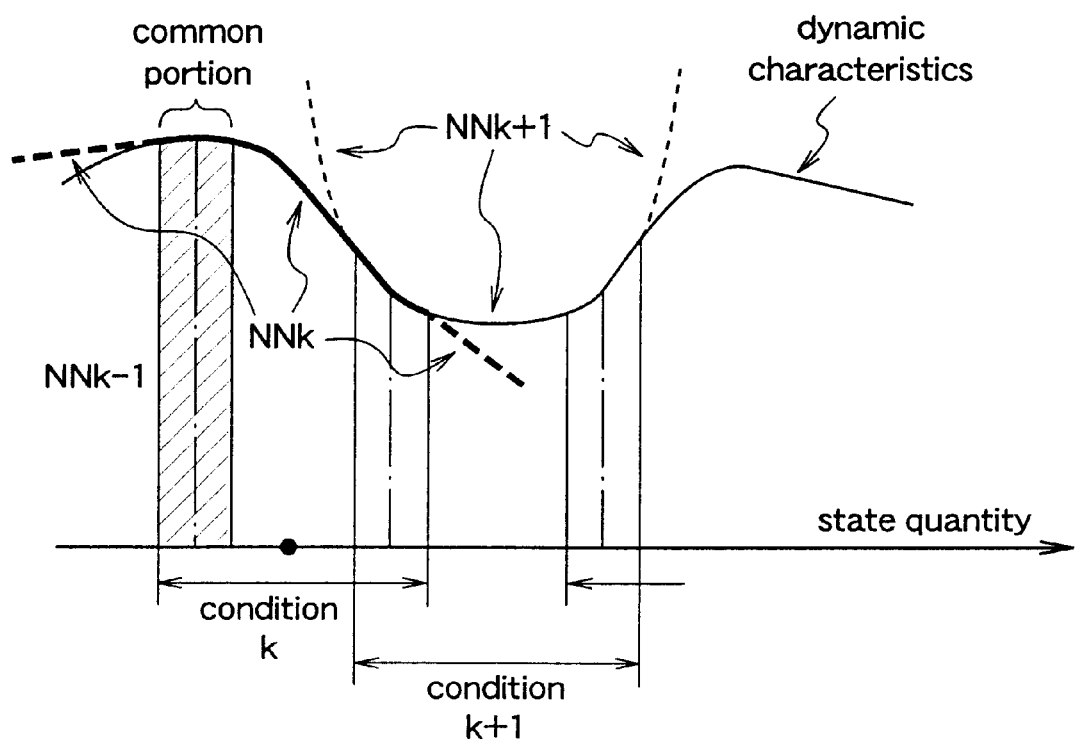
FIG. 17 is a schematic diagram illustrating a neuro learning domain having a common portion, in the learning control device of the fourth embodiment.

FIG. 17 is a diagram illustrating the conception of a neuro learning domain wherein learning conditions are set by one state detected value. The neuro constructions of adjacent conditions (e.g., NNk-1 and NNk) represent a common portion of dynamic behavior by a neuro construction.

In the estimate calculation means 175, the average of all the corresponding neuro output values is used as a neuro estimate value used for control. Alternatively, weighted averaging may be performed according to the distance from the center of the common portion to use the result as an estimate value used for control.

According to the fourth embodiment of the invention, even when the dynamic behavior changes over plural conditions, the neuro control quantity is smoothed, resulting in satisfactory control.

Embodiment 5

Figure 19:
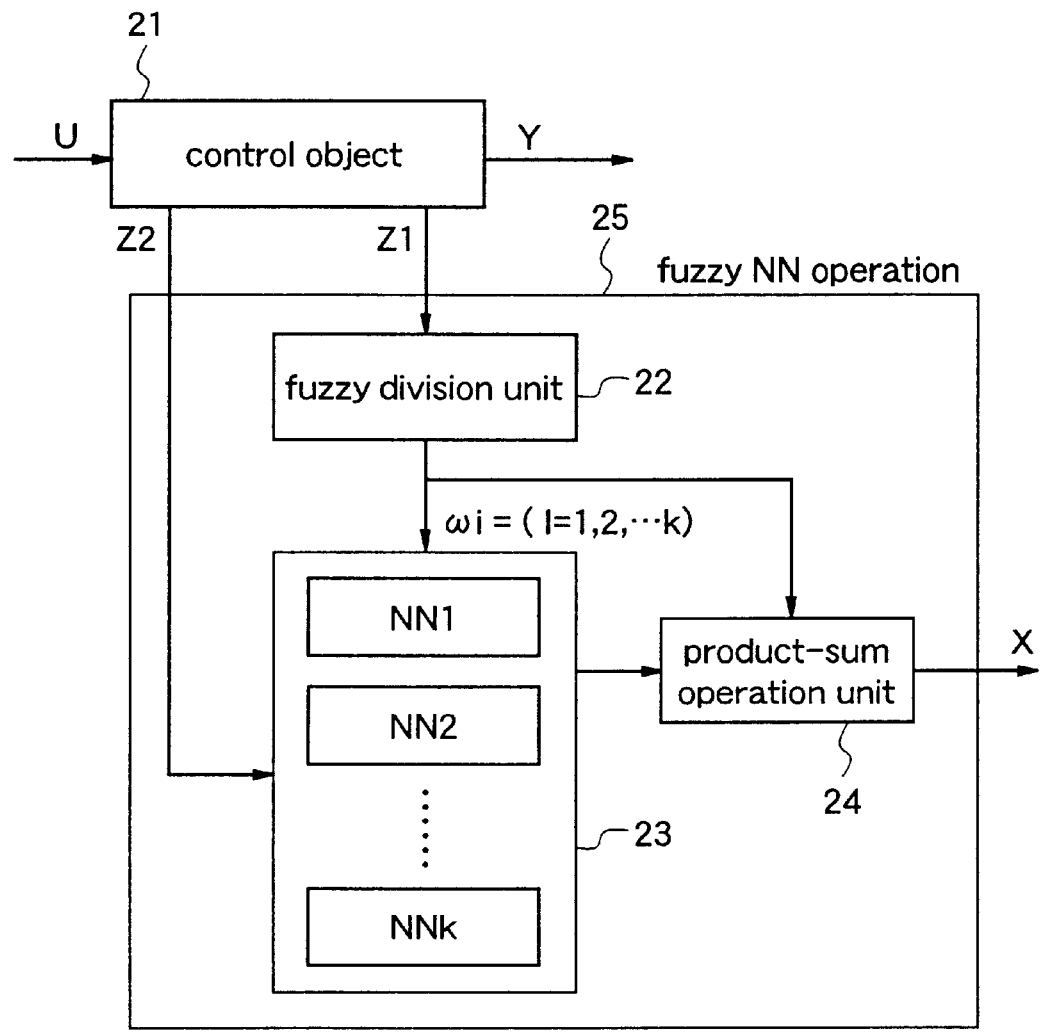
FIG. 19 is a functional block diagram illustrating a parameter estimation device according to a fifth embodiment of the present invention.

FIG. 19 is a schematic diagram illustrating a parameter estimation device according to a fifth embodiment of the present invention. In FIG. 19, 21 denotes a control object which receives an input U to generate an output Y, and 25 denotes a fuzzy NN (neural network) operation unit. The fuzzy NN operation unit 25 includes a fuzzy division unit 22 and a neural network unit 23. The fuzzy division unit 22 receives parameters (Z1) taken from the control object 21, and divides the control domain of the object into plural control domains by using fuzzy theory (hereinafter referred to as fuzzy division). The neural network unit 23 comprises a plurality of neural networks NN1–NNk. The fuzzy NN operation unit 25 further includes a product-sum operation unit 24 which receives NN output values calculated for the respective control domains in the neural network unit 23, and division data values (conformances) of the fuzzy division unit 22. The product-sum operation unit 24 multiplies each NN output value by the corresponding division data value and then sums up the respective multiplication results.

A description is given of the operation. At least one parameter Z1 having a strong correlation with the non-linearity of the control object 21 is selected as a parameter of a premise part of the fuzzy NN operation unit 25. The fuzzy division unit 22 performs domain division based on this premise parameter Z1 to divide the control object 21 into plural domains according to the fuzzy theory. As a consequent part, the fuzzy NN operation unit employs the neural network unit 23 (the neural networks NN1, NN2, . . . , NNk) which receives parameters Z2 representing the operating states of the control object 21 for the respective domains into which the control domain is divided. The product-sum operation unit 24 performs product-sum operation on the domain conformances and the respective NN outputs to estimate the dynamic behavior of the control object 21. The parameters Z1 and Z2 may include the same parameters.

Figure 20:
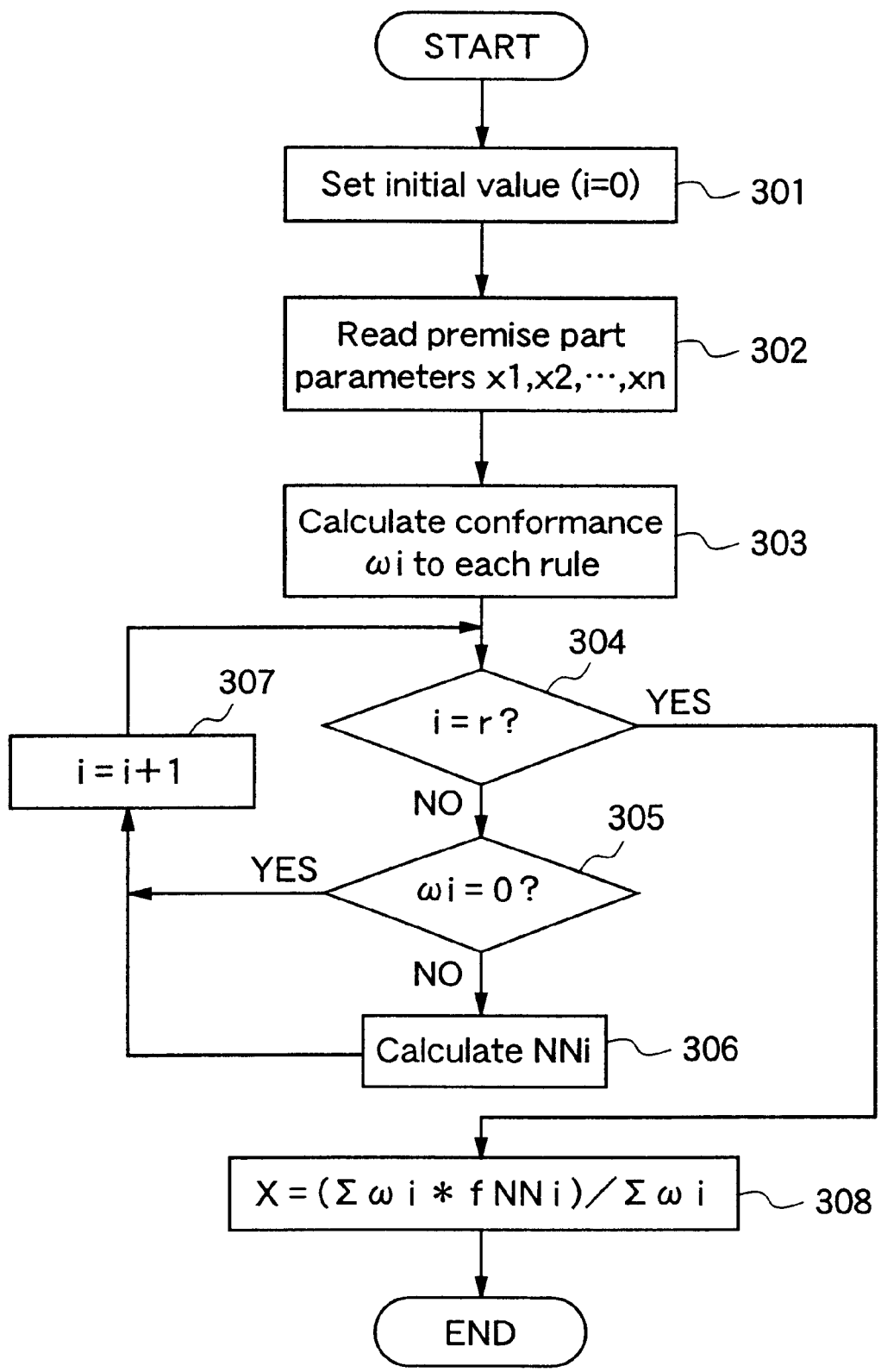
FIG. 20 is a flowchart for explaining calculation of an estimate value by a fuzzy(division)-NN operation unit as a component of the parameter estimation device of the fifth embodiment.

FIG. 20 is a flowchart for explaining, in more detail, the operation of the fuzzy (division) NN operation unit 25 to calculate an estimate value. In step 301, initial values of the respective parameters at i=1 are set. In step 302, premise parameters x1, x2, . . . xn used for fuzzy division of the operation domain are read. In step 303, the conformance wi (i=1, 2, . . . r) of each parameter to the rule i is calculated. In steps 304 through 307, NNi (the consequent part of the rule i) is calculated.

That is, the conformation wi to the rule of the following formula 1 is obtained, and the NNi is calculated from the consequent part of the rule.

Rule $i$: If $x1(k)$ is Mi1 and . . . and $xn(k)$ is Min

Then $Xnni=NNi=fNNi$ ($i=1, 2, \ldots r$)  (1)

where r is the number of rules, M is the fuzzy set, x1–xn are the premise parameters.

In step 308, the estimate value X is calculated by the following formula 2.

$$X(k) = \sum_{i=1}^{r} \{\omega i(k) * fNNi(k)\} / \sum_{i=1}^{r} \omega i(k) \quad (2)$$

FIG. 21 is a block diagram illustrating a control system. As shown in the figure, state parameters Z are detected from a control object 141, and a state X is estimated by a fuzzy-divided NN 142. This state X is fed back to a compensator 143, thereby calculating an input U by which an output Y from the control object 141 becomes a target value. In this control system, since each NN construction (estimator) in the fuzzy-divided NN 142 is relatively small, the output from each NN can be checked in advance. Therefore, it is possible to obtain an estimate value of state X whose estimate error over the entire operation domain is within an allowable range, whereby the stability of the control system can be assured without providing a limiter or the like.

In the conventional large-scale NN construction, desk check of the NN output is impossible timewise. However, in the above-described structure in which an NN construction is divided into small-sized NNs by fuzzy division, it is possible to perform desk check of NN outputs within a time which causes no problem in practical use, without degrading estimation precision.

Hereinafter, a description will be given of the case where the parameter control device of this fifth embodiment is applied to an air-to-fuel ratio controller.

Initially, by fuzzy division, plural domains are defined according to ranges of some parameters selected from operation parameters of an engine, and a domain to which the operating state of the engine belongs and the degree of conformance are decided. To be specific, in this first embodiment, as parameters to define the domains, the engine speed (Ne), the intake air pressure (Pb), the intake air temperature (Ta), and the cooling water temperature (Tw) are adopted. A four-dimensional space constituted by these four parameters is divided into plural domains in advance, and a domain to which the operating state of the engine belongs to and the degree of conformance are calculated. The selected parameters are those having relatively strong non-linearity in relation with the air-to-fuel ratio.

Since "domains" in a four-dimensional space are used here, it is impossible to illustrate them. Assuming that a domain is divided according to two of the above-mentioned parameters, i.e., the engine speed (Ne) and the intake air pressure (Pb), it is divided as shown in FIG. 22. In FIG. 22, the ranges of the engine speed Ne and the intake air pressure Pb are respectively divided into three, whereby the domain is divided into nine.

That is, "domains" in the four-dimensional space are spaces surrounded by intersections of plural ranges into which each parameter is divided in the four-dimensional space. The dimension of space depends on the number of parameters. When only one parameter is used, ranges on a straight line are defined. However, these are also called domains in this first embodiment.

For simplification, only two parameters, i.e., the engine speed (Ne) and the intake air pressure (Pb), are used as parameters to define the domains. As shown in FIG. 23, each of the Ne and the Pb is divided into three, i.e., "small" (S), "medium" (M), and "big" (B), resulting in fuzzy nine domains having rough boundaries D1–D9.

The respective domains D1–D9 are represented as follows according to fuzzy rules.

Rule 1: If Ne=S and Pb=S Then NN1=fNN1
Rule 2: If Ne=M and Pb=S Then NN2=fNN2
Rule 3: If Ne=B and Pb=S Then NN3=fNN3
Rule 4: If Ne=S and Pb=M Then NN4=fNN4 . . . ($\alpha$)
Rule 5: If Ne=M and Pb=M Then NN5=fNN5 . . . ($\beta$)
Rule 6: If Ne=B and Pb=M Then NN6=fNN6
Rule 7: If Ne=S and Pb=B Then NN7=fNN7
Rule 8: If Ne=M and Pb=B Then NN8=fNN8
Rule 9: If Ne=B and Pb=B Then NN9=fNN9

Figure 24:
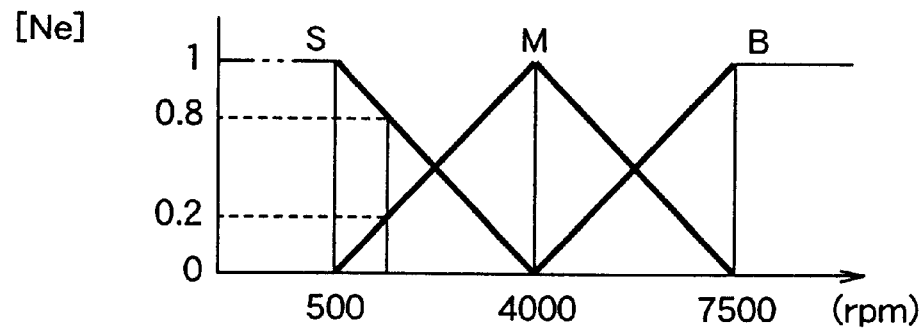
FIG. 24(*a*) is a diagram illustrating a membership function of the engine speed (Ne), and FIG. 24(*b*) is a diagram illustrating a membership function of the intake air pressure (Pb).
Figure 24:
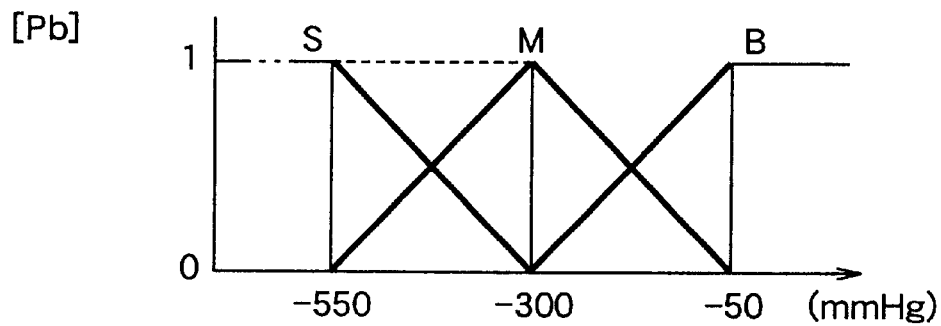

Further, membership functions of these variables Ne and Pb are rectangle as shown in FIGS. 24($a$) and 24($b$), respectively. Alternatively, bell-shaped or trapezoidal membership functions may be adopted.

It is now assumed that the engine speed (Ne) is 1000 rpm and the intake air pressure (Pb) is −300 mmHg. According to these values, the conformances to the respective rules are obtained by fuzzy division as follows.

According to the membership functions shown in FIGS. 24($a$) and 24($b$), the conformances of the engine speed (Ne) and the intake air pressure (Pb) are as follows.

Ne: S=0.8 M=0.2 B=$\phi$

Pb: S=$\phi$ M=1 B=$\phi$

According to the conformances, combinations which are considered to be conformable to the above-mentioned fuzzy control rules are those shown by ($\alpha$) and ($\beta$). By MIN operation, the conformance to be ($\alpha$) is w4=0.8 according to S=0.8 (Ne) and M=1(Pb). Further, the conformance to be ($\beta$) is w5=0.2 according to M=0.2(Ne) and M=1(Pb). The conformances to other rules are zero.

Since the conformances to the respective rules are obtained, an estimated air-to-fuel ratio A/Fnn (output from the estimator) can be calculated by the following formula (3).

$A/Fnn=(w4*fNN4+w5*fNN5)/(w4+w5)$  (3)

Since the neuro fNNi for each domain is small in construction, desk check is possible. Further, by performing feed-back control using the estimated air-to-fuel ratio, control to the target air-to-fuel ratio can be stably and precisely performed.

As described above, according to the fifth embodiment of the invention, at least one parameter having strong correlation with non-linearity of the control object is selected, and this is divided into plural control domains each having relatively small non-linearity by using the fuzzy theory. Estimation is performed by using plural NN constructions each receiving a parameter showing the operating state for each of these plural control domains. Therefore, the consequent part can be represented by small NN constructions, whereby desk check can be performed, resulting in improved stability of the control system.

Embodiment 6

Hereinafter, a parameter estimation device according to a sixth embodiment of the present invention will be described. In the above-described fifth embodiment, since the control domain is divided according to the fuzzy theory and the consequent part is provided with the small NN constructions, desk check of abnormal NN outputs is practically realized, whereby the estimation precision is increased and the stability of the control system is assured. However, depending on the control object, there is the possibility that the fuzzy division results in NN constructions each requiring calculation time which is not practically available. So, in this sixth embodiment, a multi-input NN construction is constructed by combining a plurality of small-number-input NN constructions, and the respective NN constructions which have already learned are converted to maps, whereby high stability is assured.

Figure 25:
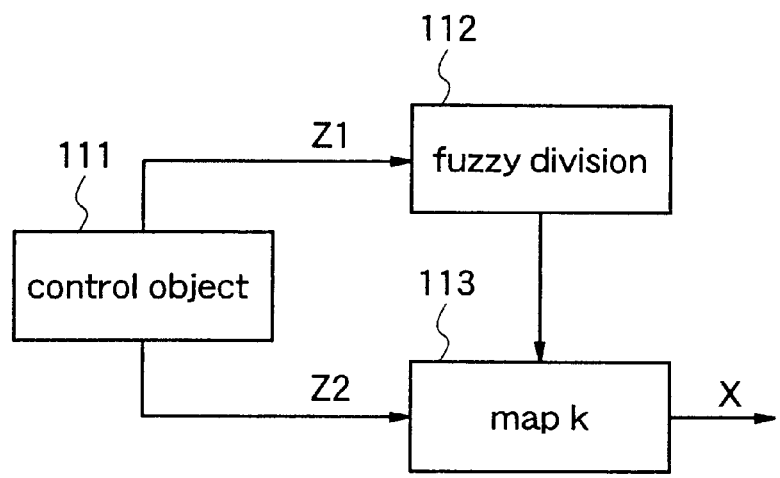
FIG. 25 is a functional block diagram illustrating a parameter estimation device according to a sixth embodiment of the present invention.

FIG. 25 is a functional block diagram illustrating the fundamental structure of the parameter estimation device of this sixth embodiment. As shown in FIG. 25, at least one parameter Z1 having a strong correlation with the non-linearity of the control object 111 is selected as a parameter of a premise part, and the control object 111 is divided into plural domains according to the fuzzy theory by the fuzzy division unit 112. In this sixth embodiment, as a consequent part, a plurality of NN constructions obtained by NN learning using parameters Z2 indicating the operating state are represented by a multi-dimensional map 113.

Thereby, it is possible to realize a parameter estimator or the like which can precisely express the non-linearity of the control object by the fuzzy NN map construction, and which can assure the stability without checking the NN outputs.

A method of converting the NN constructions into a multi-dimensional map will be described using FIGS. 26(a) and 26(b). With reference to FIG. 26(a), it is assumed that input parameters to the conventional large-scale NN construction are I1–I6. Now, let us consider the following fuzzy rule shown in FIG. 26(b).

Rule $k$: If I1=M1$k$, I2=M2$k$, I3=M3$k$

Then $Xnn=NNk$ (4)

where Z1=(I1, I2, I3), and Z2=(L1, L2, L3).

$NN_k$ is represented by combination of two NN constructions $NN_{Ak}$ and $NN_{Bk}$ each having a three-layer structure of two inputs and one output. That is, the NN constructions obtained by learning in the consequent part are represented by combination of plural pieces of three-layer neural networks. Then, the NNk which has learned in the fuzzy divided NN constructions is converted to another map.

The $NN_{Ak}$ and the $NN_{Bk}$ can be converted to a two-dimensional map Ak and a two-dimensional map Bk, respectively, because each NN has two-inputs and one output.

The lattice width of each map is determined by a method using maximum differential coefficients amongst differential coefficients obtained by total differentiation of the output of the neural network with the respective input parameters. Hereinafter, an example will be described by using FIG. 27.

Let us consider the neural network $NN_{Ak}$ which receives two inputs L1 and L2. Assuming that the lattice widths of the inputs L1 and L2 calculated according to the maximum differential coefficients $((\partial fnni/\partial Li)max)$ and the allowable errors ($\epsilon i$) are $\Delta$ L1 and $\Delta$L2 ($\Delta Li=\epsilon i/(\partial fnni/\partial Li)max$), respectively, dots of the map are given by dividing the ranges between the minimum values L1min and L2min and the maximum values L1max and L2max with the widths $\Delta$L1 and $\Delta$L2, respectively. The map value Xij is given by the output value from the $NN_{Ak}$ obtained when the inputs L1 (=L1min+i*$\Delta$L1) and L2 (=L2min+j*$\Delta$L2) are input to the $NN_{Ak}$. That is, the map value is given by Xij=$NN_{Ak}$(L1$i$, L2$j$).

In this way, the NNk can be converted to the map k and, thereafter, an estimate value X is calculated according to the following rule.

Rule $k$: If I1=M1$k$, I2=M2$k$, I3=M3$k$

Then map $k$ (L1, L2, L3) (5)

wherein the map k is represented by combination of two two-dimensional maps Ak and Bk.

There has been no definite index in converting the conventional large-scale NN construction into a map and, therefore, trial and error are needed for map formation which assures precision. However, according to the sixth embodiment of the invention, since an NN construction is obtained by combining small NNs each having two inputs and one output, these NNs can be converted to plural maps. In addition, since the lattice width of each map is calculated according to the maximum differential coefficients and the allowable values of estimation errors, a map capable of assuring the estimation errors can be formed. Further, since the outputs between maps can be obtained by linear compensation, the stability is also assured.

Embodiment 7

Hereinafter, a parameter estimation device according to a seventh embodiment of the invention will be described. Depending on the control object, there is the possibility that the NN output changes suddenly and, in this case, the stability of the NN cannot be assured. So, to check the NN outputs according to combinations of all the inputs is proposed as described above. However, in the conventional large-scale NN construction, it is impossible to check all of the patterns of the input parameters and, even in a relatively small NN construction, such check takes a lot of time if the allowable error of estimate precision is small. In this seventh embodiment, sudden change in the NN output after learning is regarded as noise, and the NN output is filtered by using a filter F(z) to obtain an estimate value, whereby the stability is assured.

Figure 28:
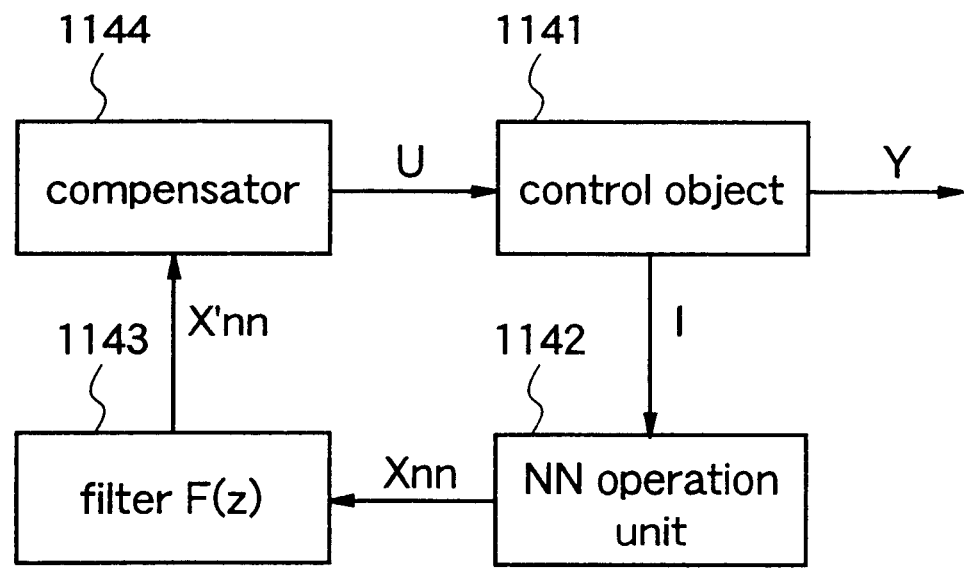
FIG. 28 is a functional block diagram illustrating a parameter estimation device according to a seventh embodiment of the invention.

FIG. 28 is a functional block diagram illustrating the fundamental structure of the parameter estimation device according to the seventh embodiment. As shown in FIG. 28, an NN operation unit 1142 receives an operation state parameter I from a control object 1141 and calculates an estimate value Xnn. This estimate value Xnn is filtered by a filter F(z) to estimate X*nn. Then, a compensator 1144 calculates a control quantity U by which an output Y becomes a target value, according to the estimate value X*nn.

Figure 29:
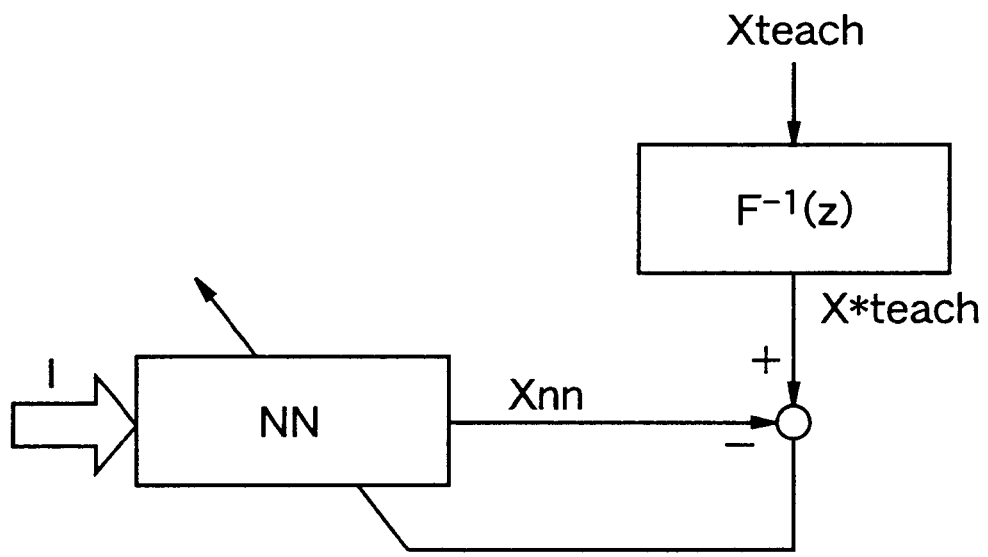
FIG. 29 is a diagram for explaining an NN learning method by the parameter estimation device of the seventh embodiment.

The NN learning method will be described using FIG. 29. As for a teaching signal used for NN learning, its phase and gain are adjusted in advance with regard to the filter characteristics.

To be specific, a method for adjusting phase and gain of the teaching signal is given by the following formula (6) wherein the original teaching signal is filtered by using an inverse model of the filter F(z) 1143 used for output to obtain a new teaching signal.

$$X^*\text{teach} = F^{-1}(z) X\text{teach} \quad (6)$$

(Xteach: conventional teaching signal)

Therefore, NN learning is advanced so that the output estimate value Xnn becomes X*teach. Thereby, even when the NN output value Xnn including noise (sudden change) which is output from the NN operation unit 1142 is filtered by the filter F(z) to remove the noise, the estimate value X*nn having no phase delay can be obtained. So, phase delay of the control system due to filtering can be reduced.

Further, not only the filter characteristics but also delay of the control object may be considered when giving a teaching signal used for NN learning, as represented by the following formula (7), whereby the response precision is improved.

$$X^*\text{teach} = H^{-1}(z) X\text{teach} \quad (7)$$

where H(z) is the transmission function indicating the dynamic behavior from the input to the filter F to the output of the control object, i.e., this is a function with regard to delays of the control object and the filter.

As described above, according to the seventh embodiment of the invention, sudden change in the NN output is regarded as noise, and the NN output is filtered by the filter F(z) 1143 to obtain an estimate value to be used. Therefore, only the sudden change (noise) can be removed effectively without delaying the propagation timing such as the phase of the estimate value, whereby significant degradation of control precision can be avoided.

Embodiment 8

A description is given of a parameter control device according to an eighth embodiment of the present invention. As described in the BACKGROUND OF THE INVENTION section, there has been no method for calculating stable control gains in a system for feed-back controlling an output value from an NN (neural network) which estimate a specific state quantity of a control object, because the NN is a black box. So, in this eighth embodiment, NN input parameters are represented by time series data of only input U and output Y of a control object, and stable NN estimate feed-back gains are theoretically determined by using NN weight coefficients.

Figure 30:
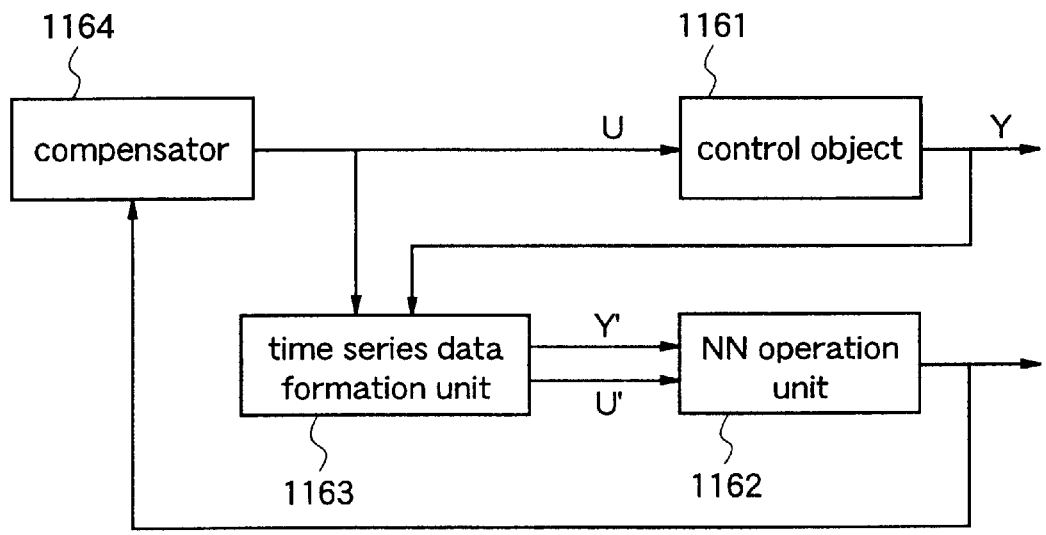
FIG. 30 is a functional block diagram illustrating a parameter estimation device according to an eighth embodiment of the invention.

FIG. 30 is a functional block diagram illustrating the structure of the parameter estimation device according to the eighth embodiment. With reference to FIG. 30, a time series data formation means 1163 stores time series data of input U and output Y of a control object 1161, and forms data sequences U' and Y' to be input to an NN operation unit 1162. The NN operation unit 1162 receives the data sequences U' and Y' of the input and output time series data, and outputs a specific operating state parameter. Here, an estimate value Ynn of the output Y from the control object 1161 is output. In a compensator 1164, by using this estimate value Ynn, a control input U which provides a target value Ytarget is calculated.

The control input U is calculated in the following formula 8.

$$U = K_p^* e + K_i^* \Sigma e + K_d^* \Delta e$$

$$e = (Yt\,arg\,et - Ynn),\ \Delta e = e(k) - e(k-1) \quad (8)$$

A description is now given of a method to obtain stable control gains Kp, Ki, and Kd for the NN estimate feed-back control system.

Figure 32:
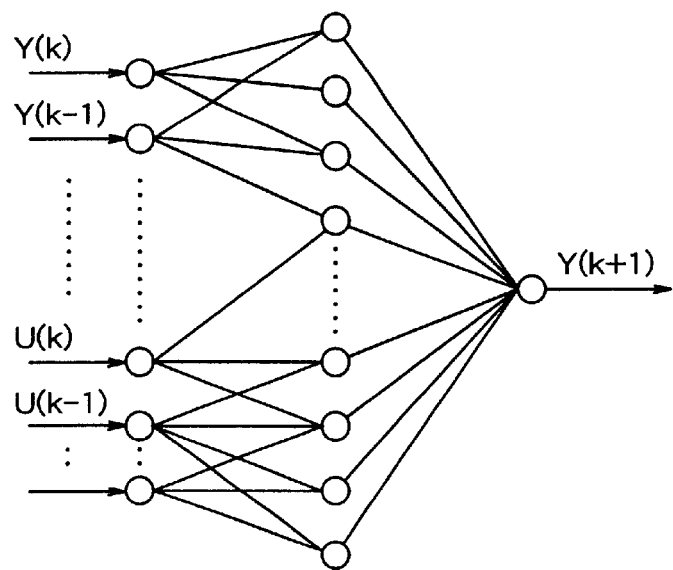
FIG. 32 is a diagram illustrating an NN construction for explaining stable analysis by the parameter estimation device of the eighth embodiment.

Initially, a modeling technique in which stable NN analysis is possible, will be described with respect to an NN construction shown in FIG. 32. Input parameters to this NN are only time series data of input and output of the control object, and an output Ynn(k) at time k is represented by the following formula (9).

$$Ynn(k) = \quad (9)$$
$$Y(k+1) = fnn(Y(k), Y(k-1), \ldots, U(k), U(k-1), \ldots) =$$
$$f\left(\sum_{i=1}^{Ni} Vi * f\left(\sum_{j=1}^{Nj} Wji * Ij\right)\right)$$

In formula (9), the function f(x) is a tangent sigmoid function represented by f(x)=tanh(x). The input Ij is time series data represented by $$Ij = [Y(k), Y(k-1), \ldots, Y(k-m+1), U(k), U(k-1) \ldots, U(k-n+1)]\ \text{where}\ 1 \leq j \leq N\ (Nj = m+n).$$

Further, Wji is connection coefficients from the input to the intermediate layer, and $1 \leq i \leq Ni$ (Ni: number of elements in intermediate layer). Further, Vi is connection coefficients from the intermediate layer to the output.

Figure 33:
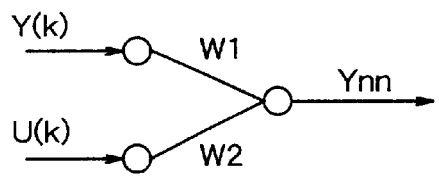
FIG. 33 is a diagram illustrating another NN construction for explaining stable analysis by the parameter estimation device of the eighth embodiment.

For simplification, let us consider an NN construction shown in FIG. 33 wherein m=n=1 and so j=2, and i=0, that is, having two inputs and one output, and no intermediate layer.

$$Ynn = f(w1 * Y(k) + w2 * U(k)) \quad (10)$$

Figure 34:
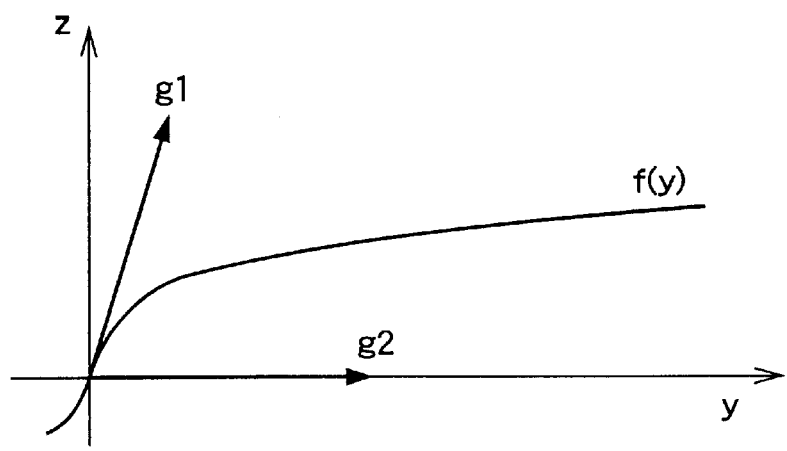
FIG. 34 is a diagram for explaining an NN non-linear function according to the eighth embodiment.

The non-linear function f(y)=f(y)=(2/(1+exp(−y/T))−1 can be put between two straight lines g1 and g2 as shown in FIG. 34. That is, $$g1 * y \leq f(y) \leq g2 * y \quad (11)$$

wherein g1 and g2 are the minimum and maximum differential coefficients of the function f, and these coefficients are given by the following formula (12).

$$g1 = \min df(y)/dy = 0,\ g2 = \max df(y)/dy = 1/(2T) \quad (12)$$

Accordingly, the non-linear function f is represented as follows.

$$f(y) = h1 * g1 * y + h2 * g2 * y \quad (13)$$

However, $$h1 + h2 - 1 \quad (14)$$

Accordingly, $$Y_{nn} \subseteq Y(k+1) = f(w1 * Y(k) + w2 * U(k)) \quad (15)$$
$$= (h1 * g1 + h2 * g2) * (w1 * Y(k) + w2 * U(k))$$
$$= \sum_{i=1}^{2} hi(k) gi(w1 * Y(k) + w2 * U(k))$$
$$= \sum_{i=1}^{2} hi(k)(Ai * Y(k) + Bi * U(k))$$

where A1=g1*w1=0, A2=g2*w1=w1/(2T), B1=g1*w2=0, and B2=g2*w2=w2/(2T).

When considering the regulator problem of Ytarget=0, control input operation is performed as follows.

$$u(k) = -\sum_{i=1}^{2} hi(k)FiY(k) \tag{16}$$

Therefore, to design a neuro control system is to obtain Fi in formula (16).

According to formulae (15) and (16), the model of the while neuro control system is represented as follows.

$$Y(k+1) = \sum_{i=1}^{2}\sum_{j=1}^{2} hi(k)hj(k)\{Ai - BiFj\}Y(k) \tag{17}$$

$$= \sum_{i=1}^{2} hi^2(k)\{Ai - BiFj\}Y(k) +$$

$$2\sum_{i<j}^{2} hi(k)hj(k)\{[(Ai - BiFj) + (Aj - BjFi)]/2\}Y(k)$$

Accordingly, the stability condition of the above formula can be derived from the Liapunov stability theorem.

If there exists a common positive definite matrix P (P>0) which satisfies the following formulae (18) and (19), the neuro system represented by formula (17) is asymptotically stable in the large.

$$(Ai-BiFi)^T P(Ai-BiFi)-P<0 \tag{18}$$

$$[(Ai-BiFj+Aj-BiFi)/2]^T P[(Ai-BiFj+Aj-BjFi)/2]-P<0 \tag{19}$$

For example, it is possible to obtain Fi which satisfies both of the above-described formulae (18) and (19), by a solution based on linear matrix inequalities (LMI).

According to the above-mentioned method, stable analysis of the neuro system is realized.

Figure 35:
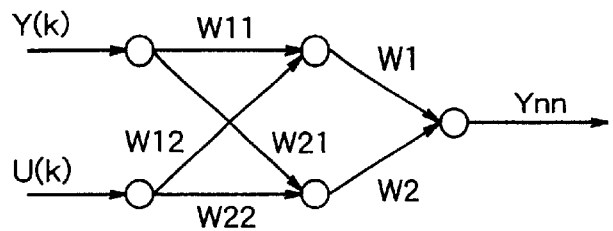
FIG. 35 is a diagram illustrating an NN construction having two inputs, two elements in an intermediate layer, and one output, for explaining the NN non-linear function of the eighth embodiment.

Likewise, a neural network shown in FIG. 35, having two inputs, two elements in an intermediate layer, and one output, can be represented by the following formula (20). It is assumed that all the functions f are different from each other.

$$Y(k+1)=\Sigma\Sigma\Sigma hi(k)hj(k)hs(k)(Aijs*Y(k)+Bijs*U(k)) \tag{20}$$

Likewise, by expanding m and n, dynamics of the NN shown in FIG. 35 can be represented as follows.

$$Ynn \subseteq Y(k+1) = \sum_{i=1}^{m+n} hi(k) \{AiY(k) + BiU(k)\} \tag{21}$$

Since, $$hi(k) \in [0\ 1] \tag{22}$$

this is an unknown parameter. However, this parameter is decided uniquely if the intermediate layer is linear and only the output can be represented by the non-linear function. Accordingly, it can be converted to a formula equivalent to formula (15), and the stability of neuro control can be verified according to formulae (18) and (19).

However, since hi is an unknown parameter and only its upper and lower bounds are known, decision of stability in neuro control comes to a considerably conservative result. That is, the result of decision unfavorably becomes "unstable" although it is stable. The reason is as follows.

Figure 36:
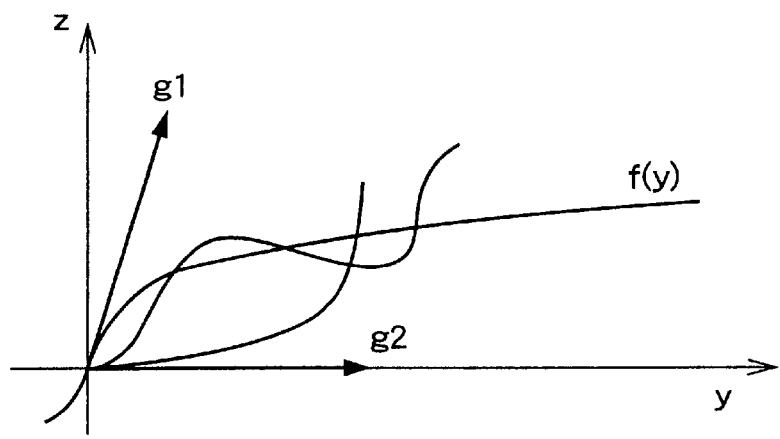
FIG. 36 is a diagram for explaining an NN non-linear function of the parameter estimation device of the eighth embodiment.

When expressing the NN construction by the fuzzy model, the non-linear function f is expressed by the values of two straight lines g1 and g2. As shown in FIG. 36, this method derives a condition under which the neuro control is stable with respect to all the non-linear functions residing between the lines g1 and g2.

Therefore, when the function f is given by the sigmoid function, there is a fear that the actually stable NN might be decided as unstable.

Figure 37:
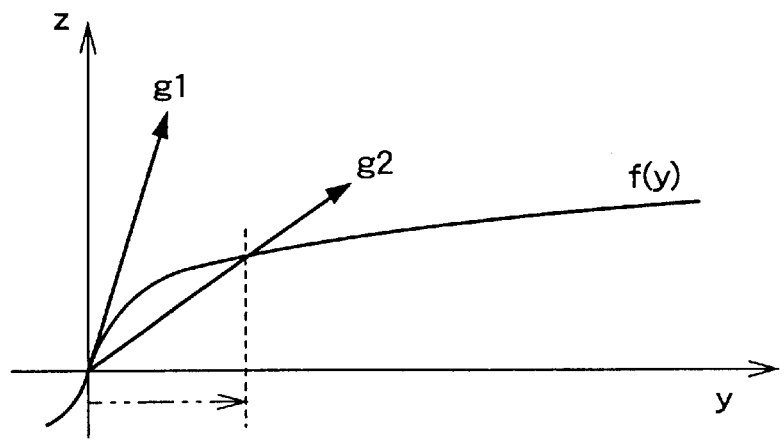
FIG. 37 is a diagram for explaining an NN non-linear function of the parameter estimation device of the eighth embodiment.

In order to improve the precision of stability decision, for example, assuming that the input value to the non-linear function is lower than a predetermined value, the width between the two lines g1 and g2 can be reduced as shown in FIG. 37. When these lines g1 and g2 overlap each other, the function f is given by a linear function. In this case, since the function can be given by linear expression, precise stability decision is possible.

Hereinafter, a description is given of the case where the parameter estimation device of this eighth embodiment is applied to an air-to-fuel controller.

If the non-linear function showing the engine's dynamic behavior which can be neuro-expressed, can be expressed by formula (21), it is possible to examine the stability of loop according to the Liapunov stability theorem.

In order to examine the stability, the NN input term must be expressed in the form including time series data of input and output of the control object. The reason is as follows. If Y(i) cannot be observed and so it is not included in the input term, an NN having dynamics cannot be given, i.e., only a static NN is given. In this case, the stability cannot be discussed. In order to express the NN input term by only time series data of input and output of the control object, the fuzzy NN construction described with respect to the fifth embodiment is employed.

That is, when a control object having strong non-linearly and a large operation domain is represented by one NN (neural network), this NN becomes considerably large in structure, having many inputs, many intermediate layers, and many elements in the intermediate layers. So, parameters showing the operation domain or the operation state are used as parameters of a premise part of the fuzzy model, and the operation domain or state is divided by using the fuzzy theory. As a consequent part, small-sized NN constructions are provided for the respective domains into which the operation domain or state is divided, and estimate values from the respective NN constructions are combined by the fuzzy reasoning to obtain an estimate value to be output.

Plant rule $i$: If $z1(k)$ is $M^i_1$ and . . . and $zp(k)$ is $M^i_p$

Then $Ynn=Y(k+1)=NNi$ ($i=1, 2, \ldots, r$) \hfill (23)

where r is the number of rules, M is the fuzzy set, and z1–zp are the premise parameters.

Now assuming that z1=Ne (engine speed) and z2=Pb (intake air pressure), NNi can be represented by formula (21), and the result of the above-described reasoning can be represented by the following formula (24).

$$Y(k+1) = \sum_{i=1}^{r}\omega i(k)\sum_{j=1}^{m+n}\{AiY(k)+BiU(k)\}/\sum_{i=1}^{r} \tag{24}$$

$$= \sum_{j=1}^{m+n} hj \sum_{i=1}^{r} hi(k)\{AiY(k)+BiU(k)\}$$

-continued $$\omega i(k) = \prod_{j=1}^{P} M_i^1(zj(k))$$

$$hi(k) = \omega i(k) / \sum_{i=1}^{r} \omega i(k)$$

$$\sum_{i=1}^{r} hi = 1$$

Further, according to the characteristics of the membership functions, the following relations are given.

$$\omega i(k) \geq 0, \quad \sum_{i=1}^{r} \omega i(k) > 0 \qquad (25)$$

Now, a compensator for formula (24) is given by the following formula (26).

Control rule $i$: If $z1(k)$ is $M^i_1$ and ... and $zp(k)$ is $M^i_P$

Then $U(k)=-FiY(k)$ $(i=1, 2, \ldots, r)$ (26)

Then, reasoning is performed as follows.

$$U(k) = -\sum_{i=1}^{r} hi(k)Fi(k) \qquad (27)$$

To design a fuzzy NN controller is to obtain Fi in formula (27).

The model of the entire fuzzy NN control system is represented by the following formula (28) according to formulae (24) and (27).

$$Y(k+1) = \sum_{i=1}^{r}\sum_{j=1}^{r} hi(k)hj(k)\{Ai - BiFj\}Y(k) \qquad (28)$$

$$= \sum_{i=1}^{r} hi^2(k)\{Ai - BiFj\}Y(k) +$$

$$2\sum_{i<j}^{r} hi(k)hj(k)\{[(Ai - BiFj) + (Aj - BjFi)]/2\}Y(k)$$

Accordingly, Fi which satisfies the condition of stability in the above formula can be derived from formulae (18) and (19).

As described above, according to the eighth embodiment of the invention, NN input term parameters are expressed by time series data of input U and output Y of the control object, and a control system is designed based on the Liapunov analysis method, whereby stable NN estimate feed-back gains can be theoretically determined by using NN weight coefficients.

Embodiment 9

Next, a parameter control device according to a ninth embodiment of the invention will be described. As described above, depending on the control object, there are cases where a sensor for measuring the control output Y does not exist, and where, even if a sensor exist, its output cannot be obtained (inactive period). In this way, when the output Y(t) from the control object cannot be measured, the time series data of the control object Y cannot be obtained. Therefore, the output from the control object cannot be included in the NN input term, resulting in a static NN having no dynamics. In this case, the stability cannot be discussed.

An object of this ninth embodiment is to perform analysis of stability by making an NN have dynamics even when the output of the control object cannot be measured.

Figure 31:
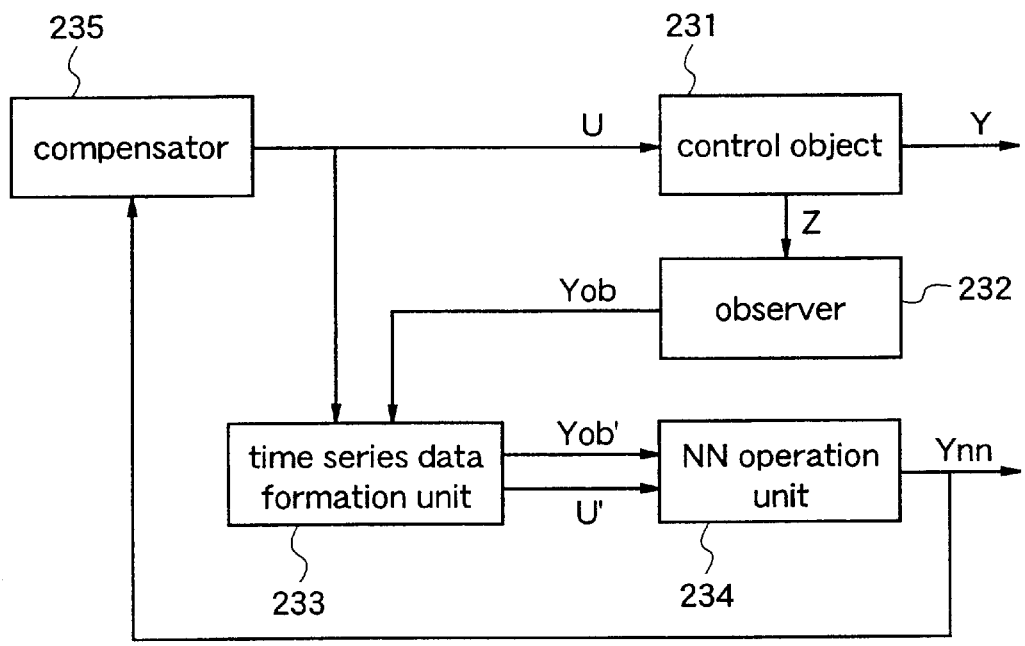
FIG. 31 is a functional block diagram illustrating a parameter estimation device according to a ninth embodiment of the invention.

FIG. 31 is a functional block diagram illustrating a parameter control device according to this ninth embodiment. With reference to FIG. 31, an observer 232 calculates an estimate value Yob of a control output by using operation state parameters Z output from a control object 231. A time series data formation means 233 stores time series data of an input U to the control object 231 and time series data of the output Yob from the observer 232, and forms input data sequences U' and Yob' to be input to an NN operation unit 234. The NN operation unit 234 receives the input data sequences U' and Yob' of the input and output time series data of the control object, and outputs an operation state parameter. In the NN operation unit 234, an estimate value Ynn of the output Y of the control object 231 is calculated. A compensator 235 calculates a control input U which provides a target value Ytarget, by using the estimate value Ynn. The control input U is calculated in the following formula.

$$U = Kp^*e + Ki^*\Sigma e + Kd^*\Delta e \qquad (29)$$

$$e = (Ytarget - Ynn), \Delta e = e(k) - e(k-1)$$

where the control gains Kp, Ki, and Kd which are stable as an NN estimate feed-back control system are obtained by deriving Fi which satisfies the stability condition, according to formulae (18) and (19).

Although the estimate value of the output Y is calculated by the observer 232, the output Ynn from the NN operation unit 234 may be fed back to the time series data formation means 233, i.e., a recurrent type NN structure may be employed.

Further, although the input data to the NN operation unit 234 are the time series data of the input and output U and Y, other operation parameters may be input to the NN operation unit 234 as long as the NN structure receives, as its input, at least time series data of the input and output U and Y of the control object, or time series data of the estimate value Yob, or time series data of the NN output Ynn. In this case, the plant rule represented by formulae (23) and (24) becomes as follows.

Plant rule $i$: If $z1(k)$ is $M^i_1$ and ... and $zp(k)$ is $M^i_P$

Then $Ynn = Y(k+1) = NNi$ $(i=1, 2, \ldots, r)$ (30)

$$Y(k+1) = \sum_{j=1}^{m+n} hj \sum_{i=1}^{r} hi(k)\{AijYob(k) + BijU(k) + d(k)\}$$

Thereby, even when the output Y of the control object 231 cannot be measured, since the NN input term can be given by using the estimate value Yob of the output Y or the NN output value Ynn, analysis of stability can be performed as in the case where the output Y can be measured. Further, even when the NN input term cannot be given by only the input and output data of the control object, since it can be considered as a disturbance term, analysis of stability is possible.

Hereinafter, a description is given of the case where the parameter control device of this ninth embodiment is applied to an air-to-fuel ratio controller.

When an air-to-fuel ratio sensor is not activated, such as when starting the engine, the output Y cannot be used as an NN input. So, the output Y is estimated by using other operation state parameters and the estimated output Y is used as an NN input.

Now, it is known that the intake air weight Gair can be approximated by the following formula.

$$Gair = K \cdot Ne \cdot Pb/Ta \tag{31}$$

where K is a constant which depends on the cubic capacity or the like.

Thereby, the output Y, i.e., air-to-fuel ratio A/F, can be estimated from the fuel injection quantity Gf and the intake air weight Gair.

$$Yob = A/Fob - Gair/Gf = K \cdot Ne \cdot Pb/Gf/AT \tag{32}$$

In this way, the NN estimation precision is obtained by using the estimate value Yob, whereby analysis of stability is realized.

As described above, according to the ninth embodiment of the invention, even when the output Y cannot be observed, since the NN input term is given by using the estimate value Yob of the output Y or the NN output Ynn, analysis of stability can be performed as in the case where the output Y can be observed. Further, when the NN input term cannot be given by the input and output data of the control object, since it is regarded as a disturbance term, analysis of stability is realized. Therefore, the values of stable NN estimate feed-back gains, which have conventionally been determined by trial and error, can be determined by calculation using the NN weight coefficients.

Embodiment 10

A parameter estimation control device according to a tenth embodiment of the present invention realizes stable control by using, not a hard sensor, but a neural network which serves as a software sensor.

Figure 38:
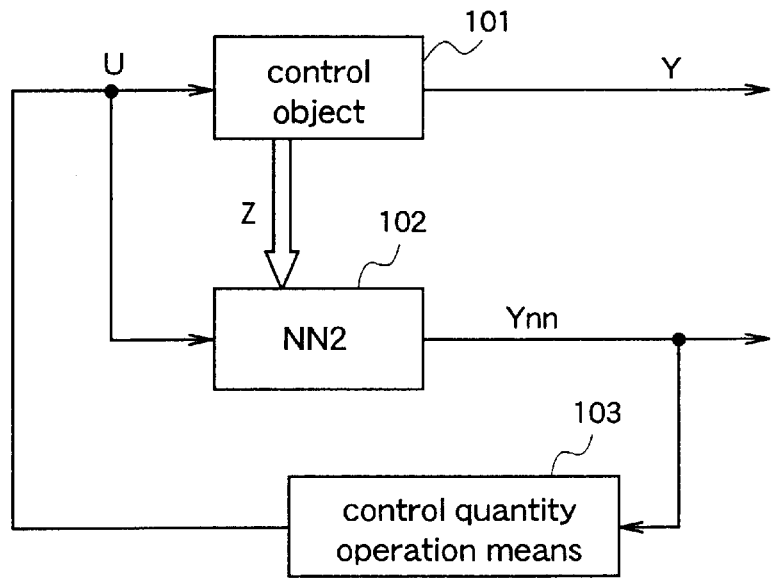
FIG. 38 is a block diagram illustrating a parameter estimation control device according to a tenth embodiment of the invention.

FIG. 38 is a block diagram illustrating the structure of a parameter estimation control device according to the tenth embodiment. As shown in FIG. 38, the parameter estimation control device comprises a control object 101, a neural network 102 (NN2), and a control quantity operation means 103.

The control object 101 is an object to be controlled by the parameter estimation control device. The neural network 102 (NN2) is a neural network which has learned in a learning system which is described later. The control quantity operation means 103 generates a control quantity based on an estimate value output from the NN2, by performing a control object model adaptive operation which is described later.

Figure 39:
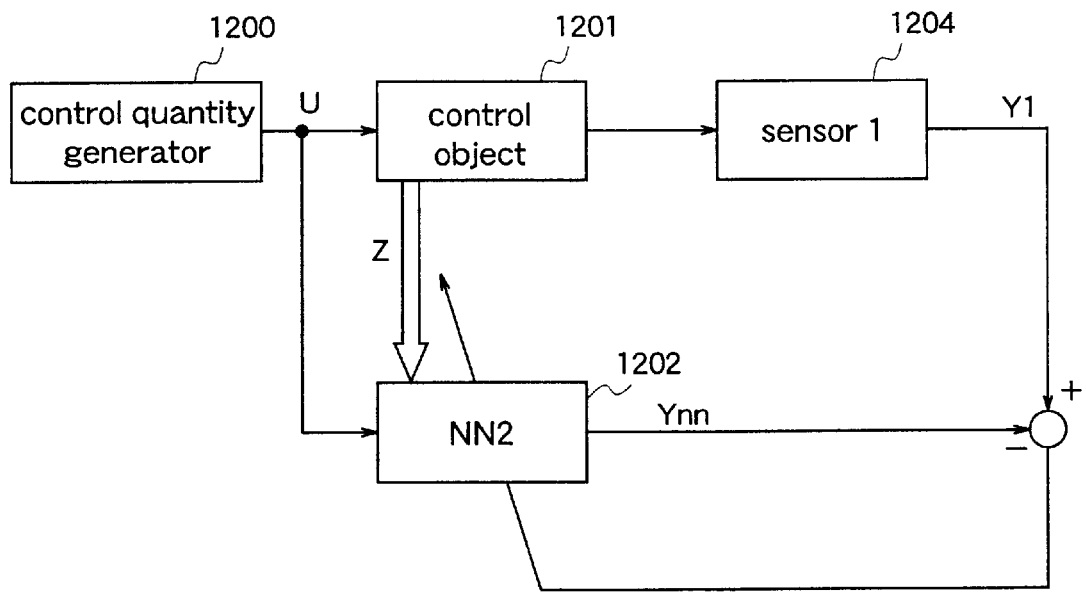
FIG. 39 is a diagram illustrating a learning system for a neural network according to the tenth embodiment.
Figure 40:
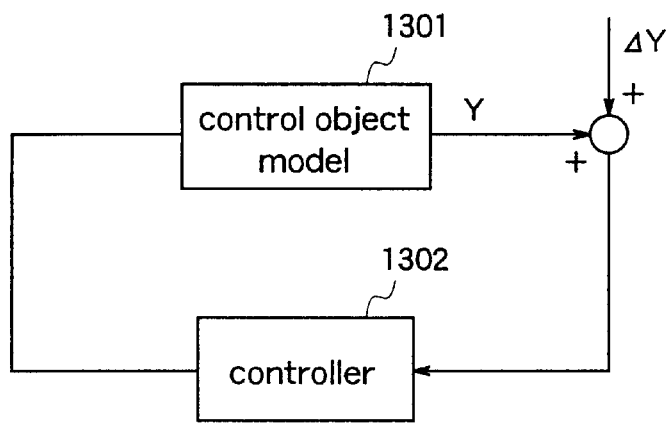
FIG. 40 is a diagram for explaining a model control system for control object model adaptive operation performed by a control quantity operation means of the tenth embodiment.
Figure 41:
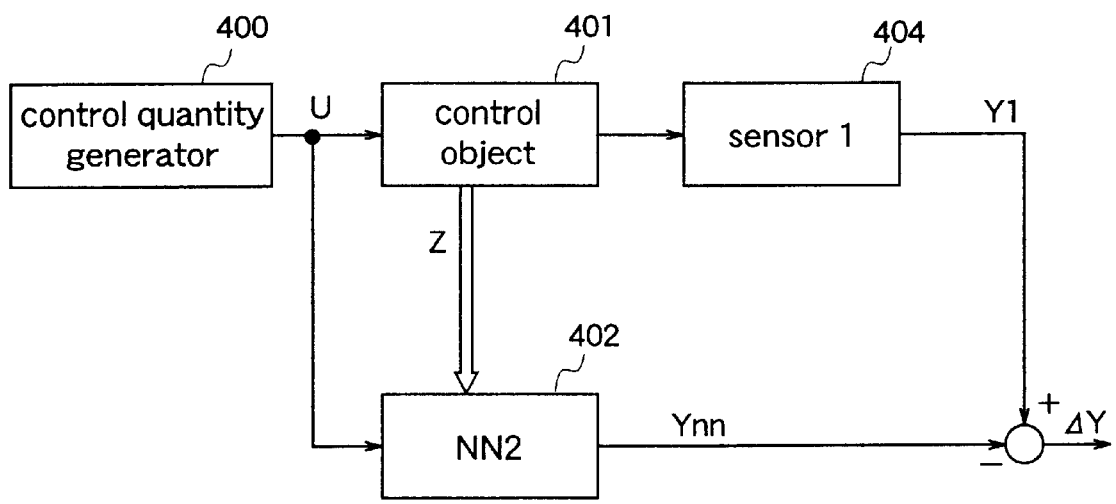
FIG. 41 is a diagram illustrating an error detection system for a neural network according to the tenth embodiment.

FIG. 39 is a diagram illustrating a learning system for the neural network NN2. FIG. 40 is a diagram for explaining a control object model adaptive operation used by the control quantity operation means 103. FIG. 41 is a diagram illustrating an error detection system for the neural network NN2.

Figure 59:
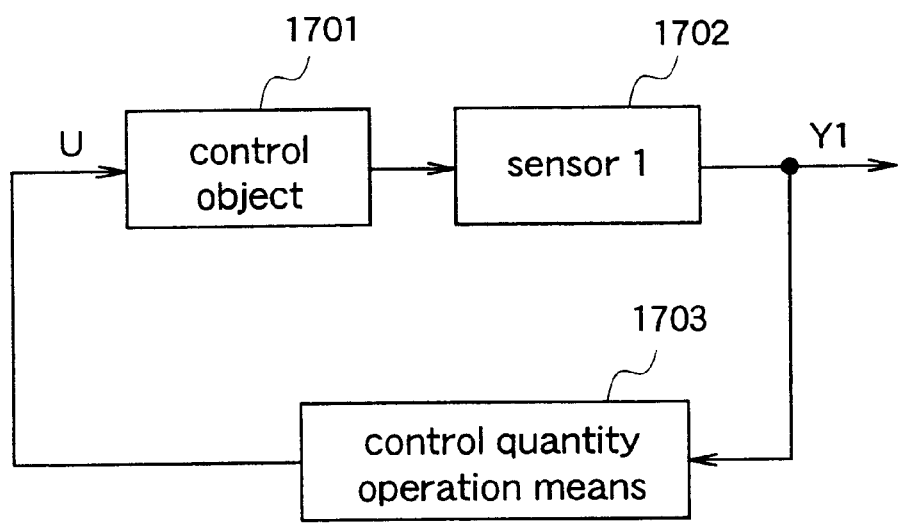
FIG. 59 is a block diagram illustrating a control device using a high precision sensor according to the prior art.
Figure 60:
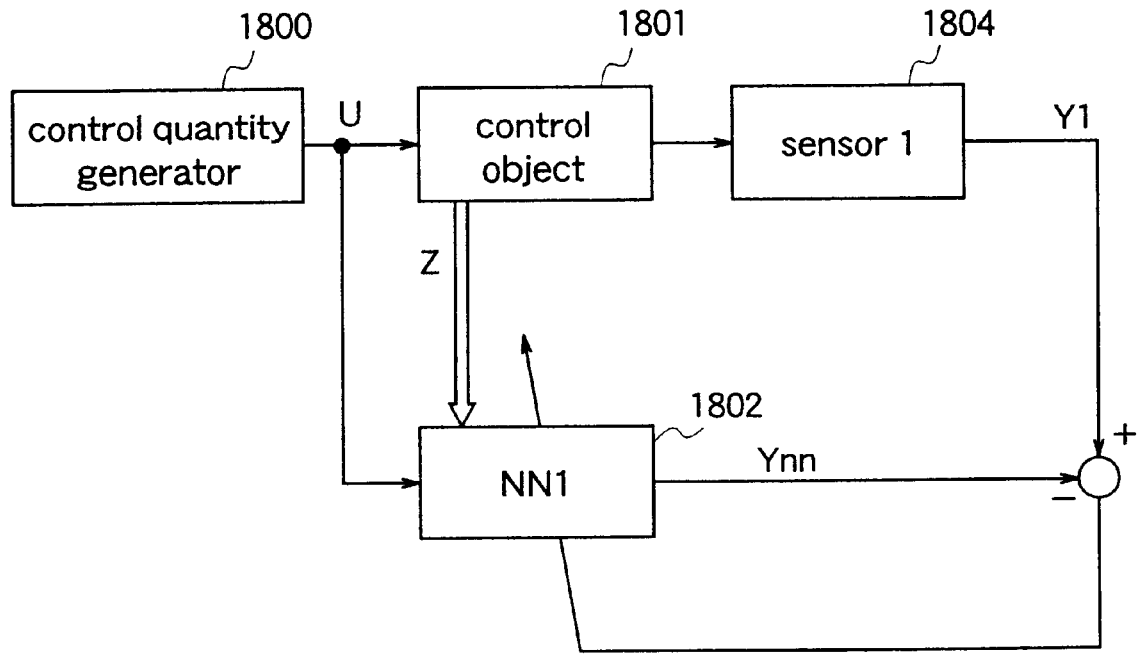
FIG. 60 is a diagram illustrating a learning system for a neural network according to the prior art.
Figure 61:
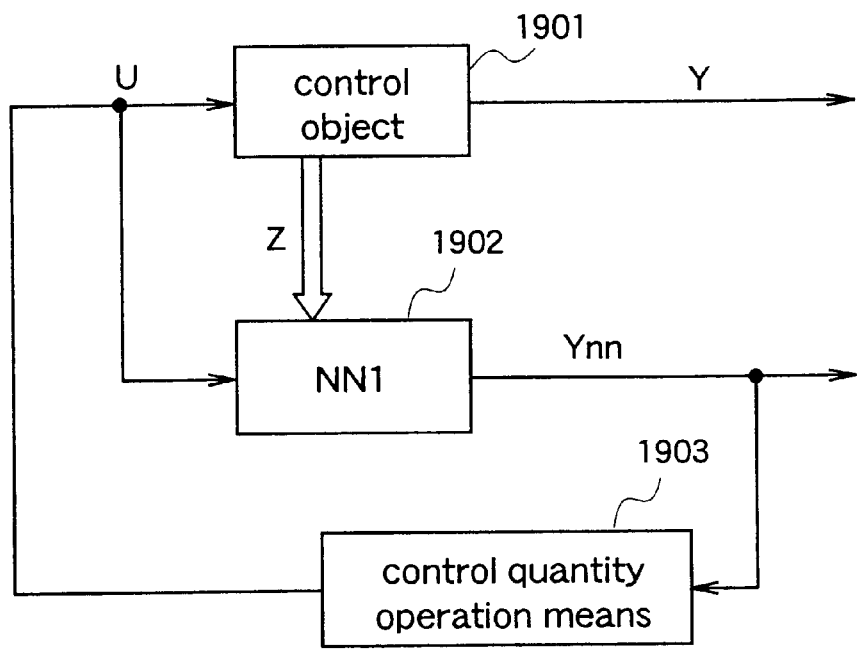
FIG. 61 is a diagram illustrating an error detection system for a neural network according to the prior art.
Figure 62:
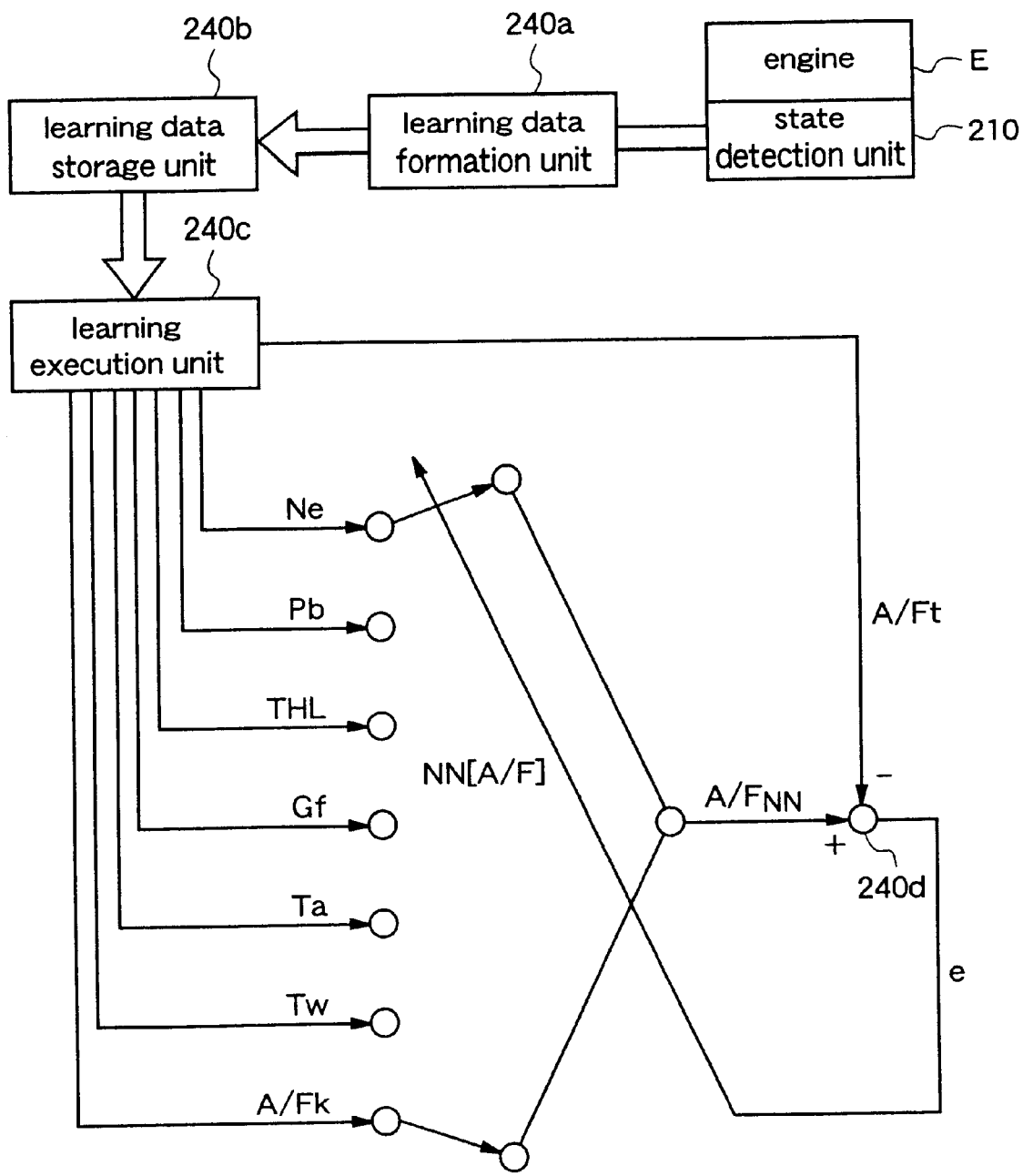
FIG. 62 is a schematic diagram illustrating a learning process of a conventional neural network.
Figure 63:
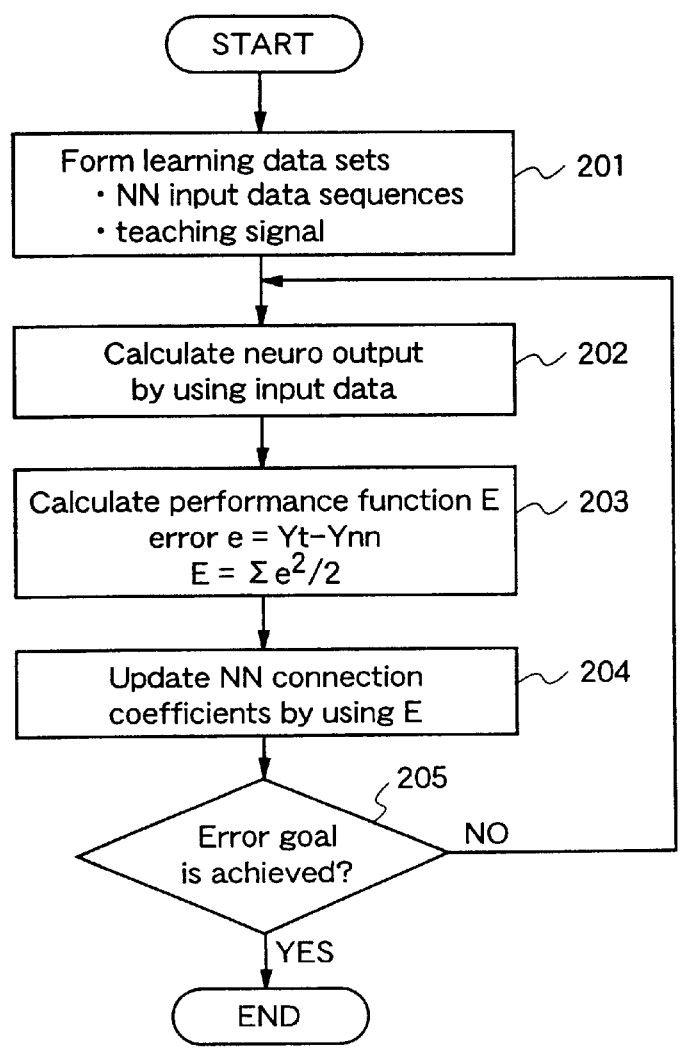
FIG. 63 is a flowchart of the conventional learning process.

In this tenth embodiment, the following assumptions are set in advance. The control object 101 (FIG. 38) can be stably controlled in a control system using a sensor (sensor 1) as shown in FIG. 59. A control object model 1301 as shown in FIG. 40 is already prepared in accordance with the control system shown in FIG. 59. In the model control system shown in FIG. 40, an optimum controller 302 for the control object model 1301 can be designed.

The control quantity operation means 1103 designs a virtual controller 1302 based on the control object model 1301, and executes a control object model adaptive operation by using the designed controller 1302, thereby generating a control quantity.

Hereinafter, learning of the NN2 will be described with reference to FIG. 39. The learning system for the neural network (NN2) shown in FIG. 39 comprises a control quantity generator 1200, a control object 1201, a neural network 1202 (NN2), and a sensor 1204 (sensor 1).

The control quantity generator 1200 generates a control quantity to be input to the control object 1201. The control object 1201 is identical to the control object 101 shown in FIG. 38, and this is an object to be controlled. The neural network 1202 (NN2) is subjected to learning in this learning system. The sensor 1204 has sufficient precision for appropriate control.

A description is given of the operation of the neural network learning system so constructed. Initially, the control quantity generator 1200 generates a control quantity U, and outputs it to the control object 1201 and the NN2. The control object 1201 performs predetermined operation and generates an output according to the control quantity U. The sensor 1204 detects the output of the control object 1201, and outputs a signal Y1 indicating the result of the detection, as a teaching signal for the NN2. On the other hand, the NN2 receives a state quantity Z indicating the state of the control object 1202, as well as the control quantity U, and outputs an estimate value Ynn. The estimate value Ynn is compared with the teaching signal Y1. According to the result of the comparison, connection coefficients of the NN2 are formed by learning so that the estimate value Ynn of the NN2 becomes the teaching signal Y1.

In this tenth embodiment, the neural network NN2 which has learned as described above is subjected to error detection in the error detection system shown in FIG. 41, and the result of the error detection is used for design of a controller shown in FIG. 40. As shown in FIG. 41, the error detection system comprises a control quantity generator 400, a control object 401, a neural network 402 (NN2), and a sensor 404 (sensor 1). These components 400–404 are identical to the components 200–204 shown in FIG. 39.

The error detecting operation of the error detection system is as follows. Initially, the control quantity generator 400 generates a control quantity U within an estimated operation domain, and outputs it to the control object 401 and the NN2. The control object 401 performs predetermined operation and generates an output according to the input control quantity U. The output from the control object 401 is input to the sensor 404, and the sensor 404 performs detection to output the result of the detection as a signal Y1. On the other hand, the NN2 receives a state quantity z indicating the state of the control object 401, as well as the control quantity U, and generates an estimate value Ynn to be output. The estimate value Ynn is compared with the signal Y1 output from the sensor 404, whereby an estimate value error dY is obtained. In this error detection system, the maximum value of the estimate error is obtained.

Hereinafter, a description is given of the operation of the parameter estimation control device shown in FIG. 38, based on the maximum estimate error obtained in the error detection system shown in FIG. 41, by using the NN2 which has learned in the learning system shown in FIG. 39. On receipt of the control quantity U, the control object 101 performs a predetermined operation to generate an output according to the input U. The NN2 which has learned in the learning system shown in FIG. 39 receives the control quantity U and the state quantity Z which indicates the state of the control object 101, generates an estimate value Ynn according to these inputs, and outputs the estimate value Ynn to the control quantity operation means 103. The control quantity operation means 103 subjects the estimate value Ynn to an arithmetic operation adapted to the virtually designed controller 302 shown in FIG. 40 (control object model adaptive operation) to generate a control quantity U.

The controller 1302 in the model control system shown in FIG. 40 is designed so that it can execute stable control for the maximum value of the estimate error obtained in the error detection system shown in FIG. 41. Accordingly, in the parameter estimation control device of this tenth embodiment shown in FIG. 38, it is possible to execute stable control for the control object 101 by using the control quantity generated by the control quantity operation means 103.

As described above, according to the tenth embodiment of the invention, the parameter estimation control device is provided with the neural network 102 (NN2) and the control quantity operation means 103, and the control quantity operation means 103 executes control adapted to the model control system shown in FIG. 40, by using an estimate value generated by the NN2 which has learned in the learning system shown in FIG. 39. Therefore, highly precise and stable control is realized by the neural network 102 (NN2) which functions as a software sensor.

[Embodiment 11]

A parameter estimation control device according to an eleventh embodiment of the invention realizes stable control by using both of a neural network functioning as a software sensor and a sensor which has relatively low precision but is inexpensive.

Figure 42:
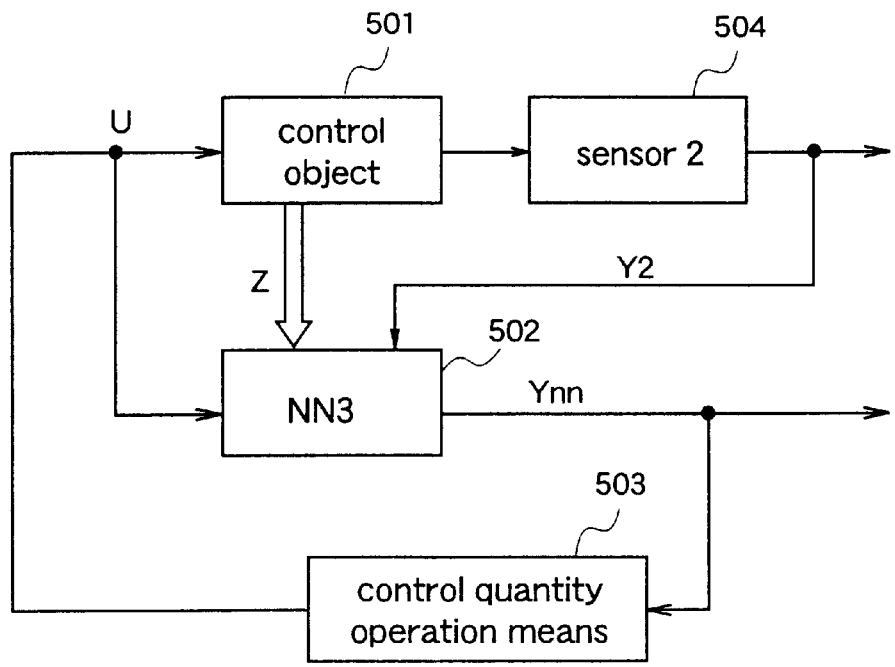
FIG. 42 is a block diagram illustrating a parameter estimation control device according to an eleventh embodiment of the invention.

FIG. 42 is a block diagram illustrating the structure of a parameter estimation control device according to the tenth embodiment. As shown in FIG. 42, the parameter estimation control device comprises a control object 501, a neural network 502 (NN3), a control quantity operation means 503, and a sensor 504 (sensor 2).

The control object 501 is an object to be controlled by the parameter estimation control device. The neural network 502 (NN3) is a neural network which has learned in a learning system which is described later. The control quantity operation means 503 generates a control quantity based on an estimate value output from the NN3 by performing a control object model adaptive operation which is described later. The sensor 504 is an inexpensive sensor which does not have sufficient precision for control.

Figure 43:
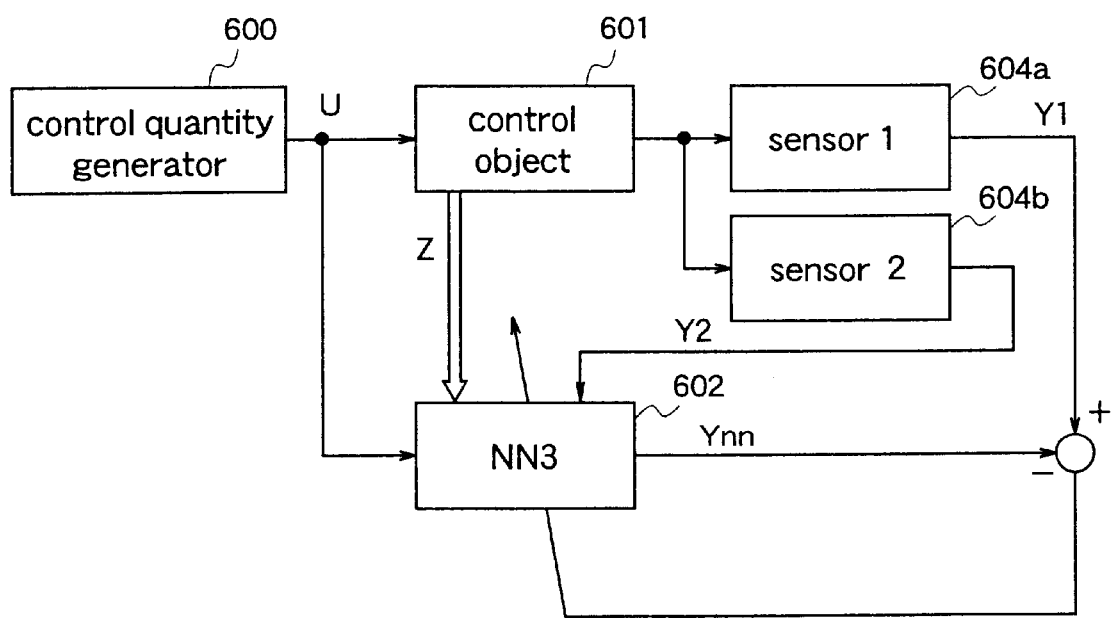
FIG. 43 is a diagram illustrating a learning system for a neural network according to the eleventh embodiment.
Figure 44:
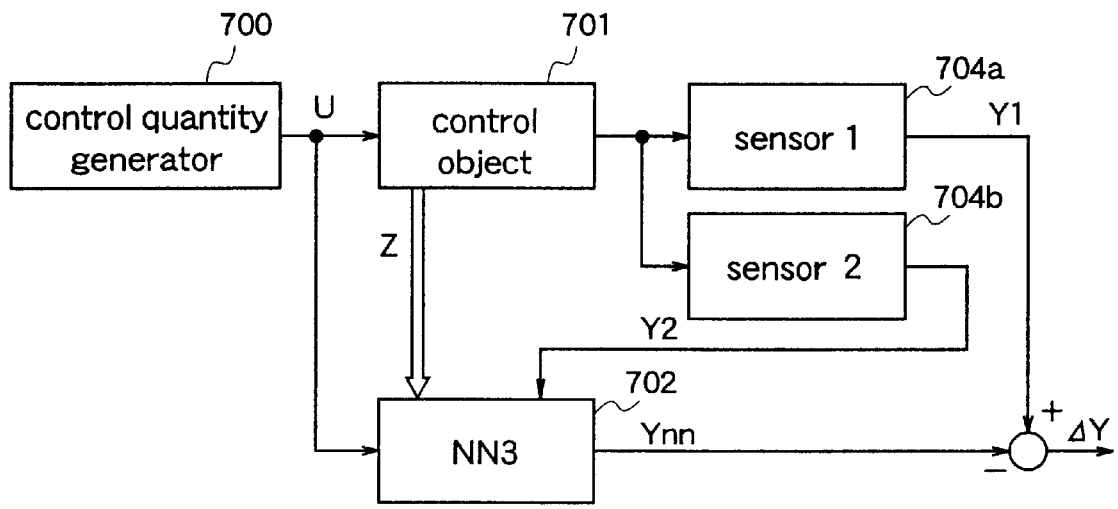
FIG. 44 is a diagram illustrating an error detection system for a neural network according to the eleventh embodiment.

FIG. 43 is a diagram illustrating a learning system for the neural network NN3. FIG. 44 is a diagram illustrating an error detection system for the neural network NN3. Also in this eleventh embodiment, as in the tenth embodiment, there already exists a control object model, and an optimum controller for the control object model is designed in a model control system. Since the model control system of this eleventh embodiment is identical to that described for the tenth embodiment and, therefore, it is described with reference to FIG. 40.

Hereinafter, learning of the neural network NN3 will be described with reference to FIG. 43. The learning system for the neural network NN3 comprises a control quantity generator 600, a control object 601, a neural network 602 (NN3), a sensor 604a (sensor 1), and a sensor 604b (sensor 2).

The control quantity generator 600 generates a control quantity to be input to the control object 601. The control object 601 is identical to the control object 501 shown in FIG. 42, and this is an object to be controlled. The neural network 602 (NN3) is subjected to learning in this learning system. The sensor 604a has sufficiently high precision for appropriate control while the sensor 604b has relatively low precision. The sensor 604b is identical to the sensor 504.

A description is given of the operation of the neural network learning system so constructed. Initially, the control quantity generator 600 generates a control quantity U and outputs it to the control object 601 and the NN3. The control object 601 performs predetermined operation and generates an output according to the control quantity U. The sensor 604a and the sensor 604b detect the output of the control object 601 and output signals Y1 and Y2 indicating the results of the detection, respectively. The signal Y1 output from the sensor 604a is used as a teaching signal for the NN3, while the signal Y2 output from the sensor 604b is input to the NN3.

On the other hand, the NN3 receives a state quantity Z indicating the state of the control object 602, as well as the control quantity U and the signal Y2 from the sensor 604b, and outputs an estimate value Ynn. The estimate value Ynn is compared with the teaching signal Y1. According to the result of the comparison, connection coefficients of the NN3 are constructed by learning so that the estimate value Ynn of the NN3 becomes the teaching signal Y1.

Also in this eleventh embodiment, as in the tenth embodiment, the maximum value of an estimate error is obtained, and this is used for the control object model adaptive process of the control quantity operation means 503. FIG. 44 illustrates an error detection system for the neural network NN3 according to the eleventh embodiment. This system comprises a control quantity generator 700, a control object 701, a neural network 702 (NN3), a sensor 704 (sensor 1), and a sensor 704b (sensor 2). The components 700–704 shown in FIG. 44 are identical to the components 600–604 shown in FIG. 43.

The error detecting operation of the error detection system is as follows. Initially, the control quantity generator 700 generates a control quantity U within an estimated operation domain, and outputs it to the control object 701 and the NN3. The control object 701 performs predetermined operation and generates an output according to the input control quantity U. The output from the control object 701 is input to the sensors 704a and 704b, and these sensors perform detection to output signals Y1 and Y2 as the results of the detection, respectively. The signal Y2 is input to the NN3. The NN3 receives a state quantity Z indicating the state of the control object 701, as well as the signal Y2 and the control quantity U, and outputs an estimate value Ynn according to these inputs. The estimate value Ynn is compared with the signal Y1 output from the sensor 704b, whereby an estimate error dY is obtained. In this error detection system, the maximum value of the estimate error is obtained, and this is used in the control quantity operation means 503 (FIG. 42) as in the tenth embodiment.

Hereinafter, a description is given of the operation of the parameter estimation control device shown in FIG. 42.

On receipt of the control quantity U, the control object 501 performs a predetermined operation to generate an output according to the input U. This output is detected by the sensor 504 (sensor 2), and a signal Y2 indicating the result of the detection is input to the neural network 502 (NN3) which has learned in the learning system shown in FIG. 43. The NN3 receives the signal Y2, the control quantity U, and the state quantity Z which indicates the state of the control object 101. On receipt of these inputs, the NN3 generates an estimate value Ynn to be output to the control quantity operation means 503. The control quantity operation means 503 subjects the estimate value Ynn to an arithmetic operation adapted to the virtually designed controller 302 shown in FIG. 40 (control object model adaptive operation) to generate a control quantity U.

Also in this eleventh embodiment, the controller 302 in the model control system shown in FIG. 40 is designed so that it can execute stable control for the maximum value of the estimate error obtained in the error detection system shown in FIG. 44. Accordingly, in the parameter estimation control device of this eleventh embodiment shown in FIG. 42, it is possible to execute stable control for the control object 501 by using the control quantity generated by the control quantity operation means 503.

As described above, according to the eleventh embodiment of the invention, the parameter estimation control device is provided with the neural network 502 (NN3), the sensor 504 (sensor 2), and the control quantity operation means 503, and the control quantity operation means 503 executes control adapted to the model control system shown in FIG. 40, by using an estimate value generated by the NN3 which has learned in the learning system shown in FIG. 43. Therefore, highly precise and stable control is realized by using the inexpensive sensor 504 (sensor 2) and the neural network 502 (NN3) which functions as a software sensor.

Since this eleventh embodiment requires a sensor (sensor 2) having relatively low precision, it is inferior to the tenth embodiment in respect of hardware cost. However, the processing speed in the NN learning is higher in this eleventh embodiment than in the tenth embodiment. Accordingly, which one is more suitable between these two embodiments is decided according to the characteristics of the control object, the characteristics of the available sensor, the cost, etc.

[Embodiment 12]

A parameter estimation control device according to a twelfth embodiment of the present invention realizes stable control by using only a neural network which functions as a software sensor, like the tenth embodiment of the invention.

The above-described tenth and eleventh embodiments are applicable only when a control object model has already been constructed as shown in FIG. 40 and thereby a model control system and an optimum controller can be designed. However, for example, when an object to be controlled is very complicated, it is very difficult or impossible to construct a control object model because of limitations on the precision of a practicable sensor or simulation performance of a computer system or the like. To be specific, when a control object model has already been constructed and so a model control system as shown in FIG. 40 can be designed, the control object model can be represented by a linear function which is easily handled. However, when employing a complicated control object, such as an engine as described for the section of BACKGROUND OF THE INVENTION, it is usually difficult to construct a control model using a linear function. A parameter estimation control device according to this twelfth embodiment is applicable to the case where a control object model has not been constructed yet, or it is hard to construct a control object model.

Figure 45:
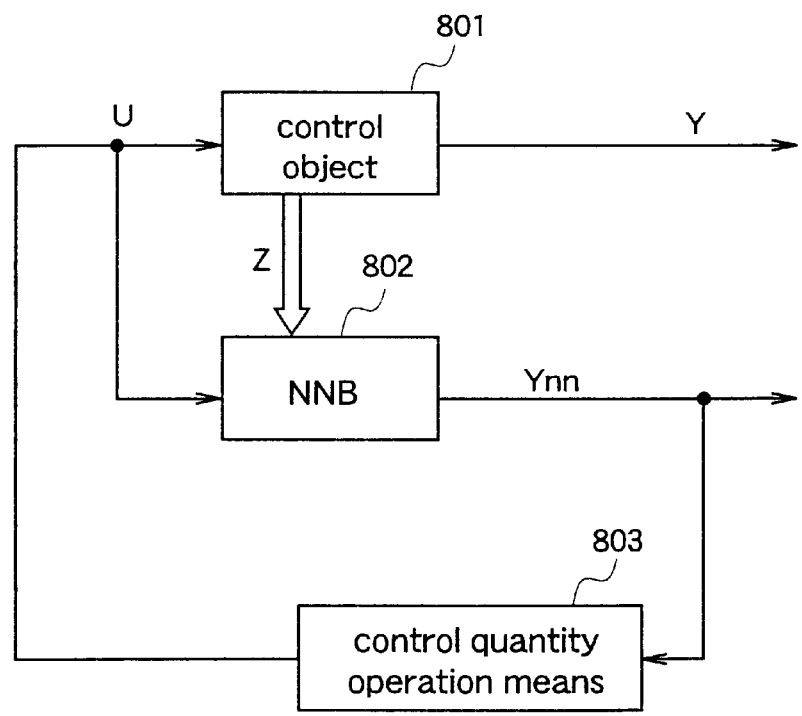
FIG. 45 is a block diagram illustrating a parameter estimation control device according to a twelfth embodiment of the invention.

FIG. 45 is a block diagram illustrating the structure of the parameter estimation control device according to the twelfth embodiment. As shown in the figure, the parameter estimation control device comprises a control object 801, a neural network 802 (NNB), and a control quantity operation means 803.

The control object 801 is an object to be controlled by the parameter estimation control device. The neural network 802 (NNB) is a neural network which has learned in a learning system which is described later. The control quantity operation means 803 generates a control quantity based on an estimate value output from the NNB, by performing a control object model adaptive operation which is described later.

The control object model adaptive operation according to the tenth or eleventh embodiment is adapted to the model control system shown in FIG. 40 based on the existing control object model. On the other hand, the control object model adaptive operation of this twelfth embodiment is adapted to a model control system shown in FIG. 46. The mode control system shown in FIG. 46 employs, as a control object model, a neural network 901 (NNA) which has been subjected to learning as described later, and performs optimum design of a virtual controller 902 as in the case of FIG. 40. Hereinafter, this neural network 901 (NNA) is called "a model substitute neural network".

Figure 47:
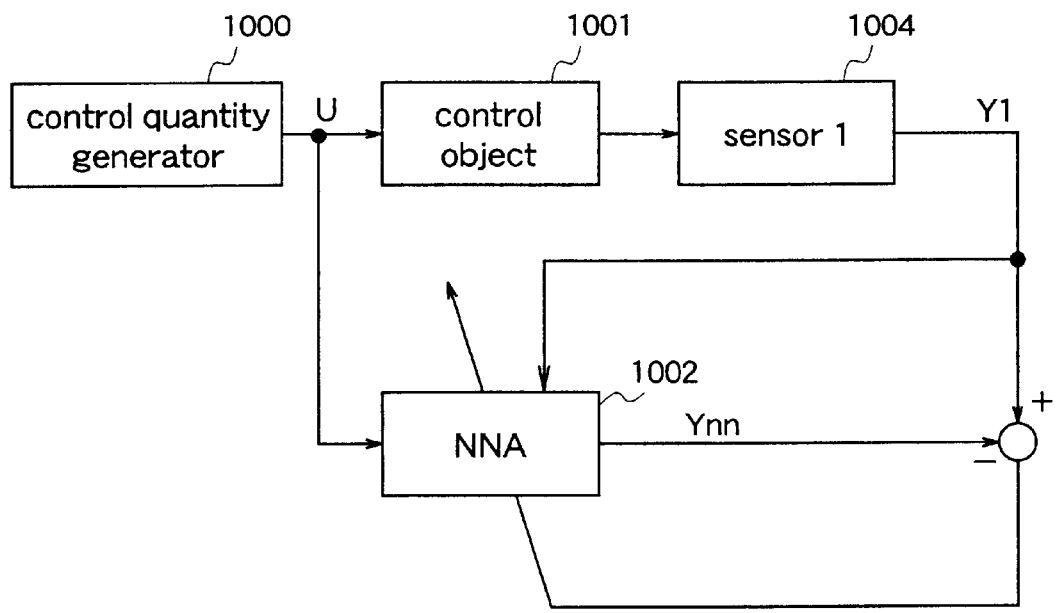
FIG. 47 is a diagram illustrating a learning system for a control model substitute neural network according to the twelfth embodiment.

FIG. 47 is a diagram illustrating a learning system for the model substitute neural network NNA. As shown in FIG. 47, this system comprises a control quantity generator 1000, a control object 1001, a model substitute neural network 1002 (NNA), and a sensor 1104 (sensor 1).

The control quantity generator 1000 generates a control quantity to be input to the control object 1001. The control object 1001 is identical to the control object 801 shown in FIG. 45, and this is an object to be controlled. The model substitute neural network 1002 (NNA) is subjected to learning in this learning system. The sensor 1004 detects the output of the control object 1001 and outputs the result of the detection.

A description is given of the operation of the neural network learning system so constructed. Initially, the control quantity generator 1000 generates a control quantity U, and outputs it to the control object 1001 and the NNA. The control object 1001 performs predetermined operation and generates an output according to the control quantity U. The sensor 1004 detects the output of the control object 1001 and outputs a signal Y1 indicating the result of the detection to the NNA. This signal Y1 is also output as a teaching signal for the NNA. On the other hand, the NNA receives time series data of the control quantity u and the signal Y1, and outputs an estimate value Ynn in response to these inputs. The estimate value Ynn is compared with the teaching signal Y1. According to the result of the comparison, connection coefficients of the NNA are formed by learning so that the estimate value Ynn of the NNA becomes the teaching signal Y1.

Figure 46:
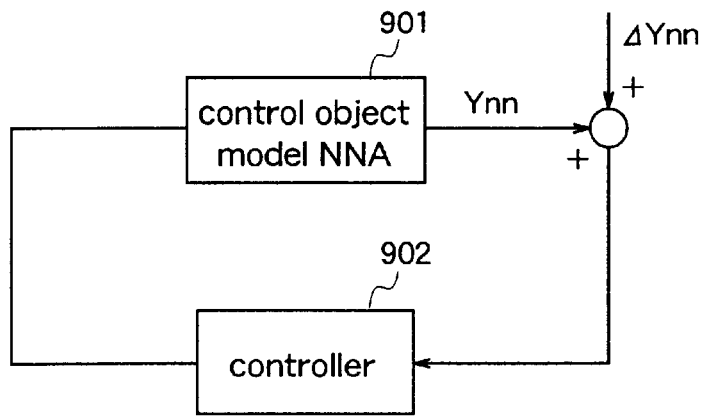
FIG. 46 is a diagram for explaining a model control system for control object model adaptive operation performed by a control quantity operation means of the twelfth embodiment.

The neural network NNA which has learned in the learning system shown in FIG. 47 can be uses as a substitute of a control target model in the model control system shown in FIG. 46. Hereinafter, a detailed description will be given on this point.

In the model control system shown in FIG. 46, the control quantity U generated by the controller 902 is obtained by operation according to the following formula (33).

$$U = Kp \times e + Ki \times \Sigma e + Kd \times \Delta e \qquad (33)$$

where e is an error from a target value, and $\Delta e = e(k) - e(k-1)$.

In formula (33), Kp, Ki and Kd are control gains in the model control system as a feed-back control system, and optimum design of the controller 902 is equivalent to obtain these control gains in formula (33) which realize a stable feed-back control system. Hereinafter, a method of obtaining stable control gains will be described.

Figure 48:
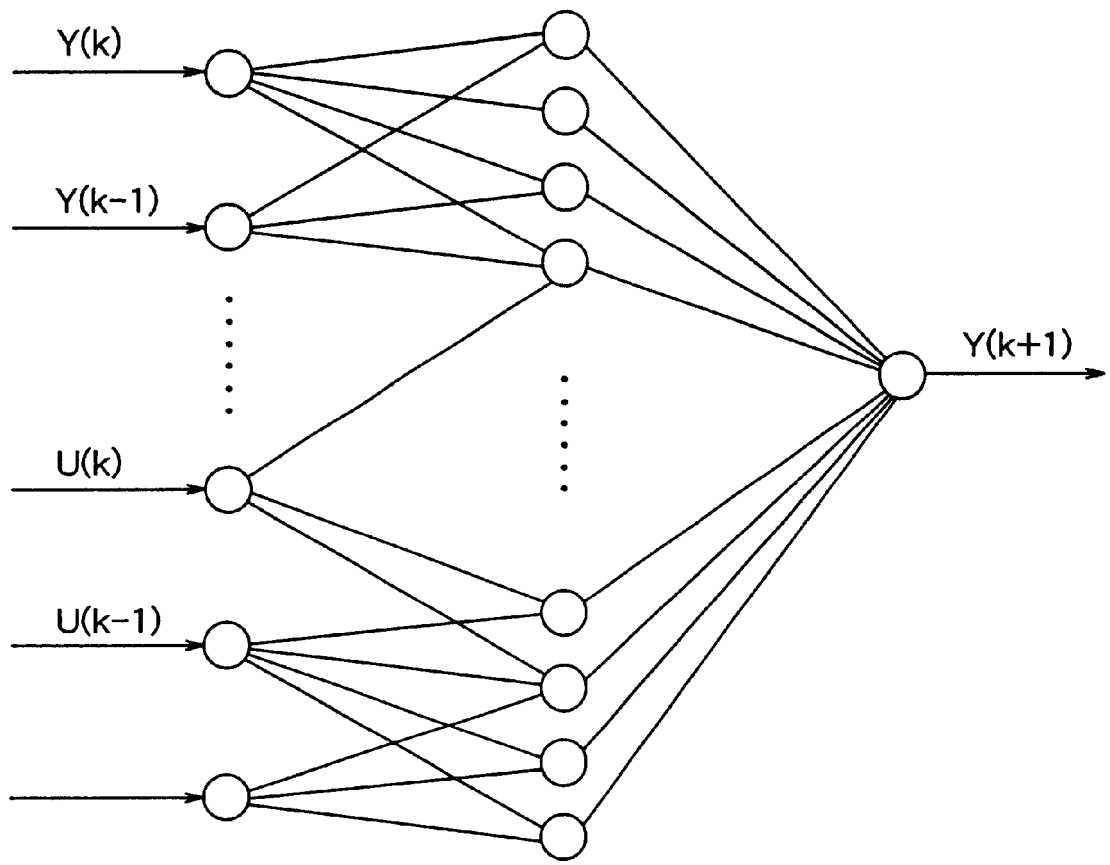
FIGS. 48(*a*) and 48(*b*) are diagrams illustrating diagram a neuro control system for explaining the effectiveness of the control model substitute neural network, according to the twelfth embodiment.
Figure 48:
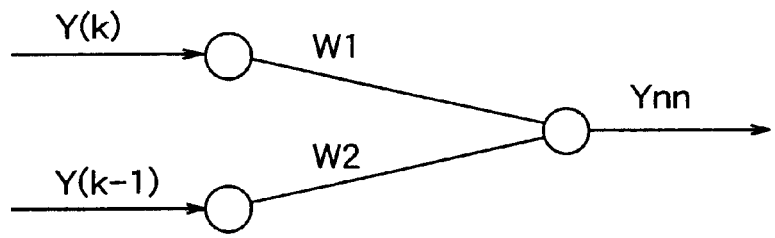

FIG. 48(a) shows an example of a neural network having a hierarchical network construction. Input parameters to the neural network are composed of only time series data of input and output to/from the control object of the neural network, and an output Ynn(k) at a specific time k is represented as a function of the input, as follows.

$$Ynn(k) = \qquad (34)$$
$$Y(k+1) = fnn(Y(k), Y(k-1), \ldots, U(k), U(k-1), \ldots) =$$
$$f\left(\sum_{i=1}^{Ni} Vi \times f\left(\sum_{j=1}^{Nj} Wji \times Ij\right)\right)$$

In formula (34), the function f(x) is a tangent sigmoid function represented by f(x)=tanh(x). The input Ij is time series data represented by $$Ij=[Y(k),Y(k-1),\ldots,Y(k-m+1),U(k),U(k-1)\ldots,U(k-n+1)]$$
where $1 \leq j \leq N(Nj=m+n)$.

Further, Wji is connection coefficients from the input to the intermediate layer, and $1 \leq i \leq Ni$ (Ni: number of elements in intermediate layer). Further, Vi is connection coefficients from the intermediate layer to the output.

For simplification, let us consider a neuro control system shown in FIG. 48(b) wherein m=n=1 and so j=2, and i=0, that is, having two inputs and one output, and no intermediate layer. In this control system, the estimate value Ynn is represented as follows.

$$Ynn=f(w1*Y(k)+w2*U(k))$$

Figure 49A:
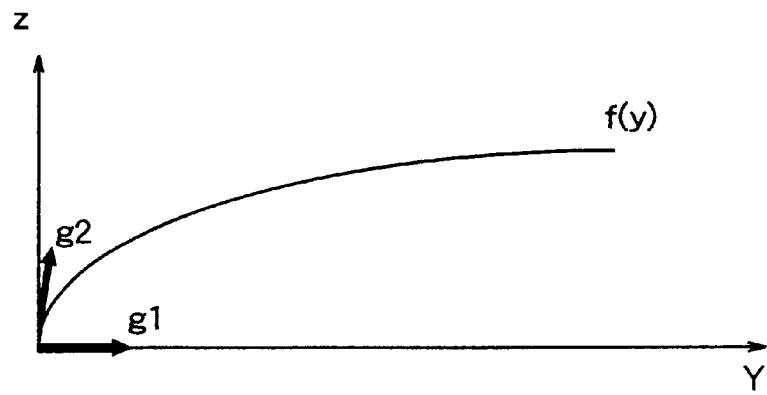
FIGS. 49(*a*) and 49(*b*) are diagrams illustrating a function graph and a neuro control system, respectively, for explaining the effectiveness of the control model substitute neural network, according to the twelfth embodiment.

The non-linear function f(y) is represented by $$f(y)=(2/(1+\exp(-y/T))-1 \qquad (35)$$

and this is shown in FIG. 49(a). As shown in FIG. 49(a), this function is put between two straight lines g1 and g2.

That is, $g1*y \leq f(y) \leq g2*y$. In this relation, g1 and g2 are the minimum and maximum differential coefficients of the function f, and these coefficients are given by the following formula.

$$g1=\min df(y)/dy=0, g2=\max df(y)/dy=1(2T)$$

Accordingly, the non-linear function f is represented by the following formula (36).

$$f(y)=h1*g1*y+h2*g2*y \qquad (36)$$

where h1+h2=1. This means that the non-linear function f(y) represented by formula (35) can be reduced to a linear formula as shown by formula (36).

Accordingly, with respect to the output from the neuro control system shown in FIG. 48(b), the following formula (37) is obtained.

$$Ynn(k)Y(k+1) = f(w2 \times Y(k) + w2 \times U(k)) \qquad (37)$$
$$= (h1 \times g1 + h2 \times g2) \times (w1 \times Y(k) + w2 \times U(k))$$
$$= \sum_{i=1}^{2} hi(k)gi(wi \times Y(k) + w2 \times U(k))$$
$$= \sum_{i=1}^{2} hi(k)gi(Ai \times Y(k) + Bi \times U(k))$$

This formula (37) also represents a linear function and thereby a control system can be easily constructed, like the control object model used for the tenth and eleventh embodiments.

Here, the coefficients of the linear model represented by formula (37) are as follows.

$$A1=g1*w1=0, A2=g2*w1=w1/(2T)$$
$$B1=g1*w2=0, B2=g2*w2=w2/(2T)$$

Therefore, when considering the regulator problem of Ytarget=0, the control input operation is performed as follows.

$$U(k) = -\sum_{i=1}^{2} hi(k)FiY(k) \qquad (38)$$

This is to reduce design of a neuro control system to the problem of obtaining Fi in formula (38).

According to formulae (37) and (38), the model of the while neuro control system is represented as follows.

$$Y(k+1) = \sum_{i=1}^{2}\sum_{j=1}^{2} hi(k)hj(k)(Ai-BiFj)Y(k) \qquad (39)$$
$$= \sum_{i=1}^{2} hi^{-2}(k)(Ai-BiFj)Y(k) +$$
$$2\sum_{i<j}^{2} hi(k)hj(k)((Ai-BiFj)+(Aj-BjFi)/2)Y(k)$$

A stability condition for ensuring stability of formula (39) can be derived from the Liapunov stability theorem relating to asymptotic stability of linear systems. Accordingly, it may safely be said that, the neuro control system represented by formula (39) is asymptotically stable in the large if there exists a common positive definite matrix P (P>0) which satisfies the following formulae (40) and (41).

$$(Ai-BiFi)^{T}P(Ai-BiFi)-P<0 \qquad (40)$$
$$[(Ai-BiFj+Aj-BjFi)/2]^{T}P[(Ai-BiFj+Aj-BjFi)/2]-P<0 \qquad (41)$$

For example, it is possible to obtain F1 which satisfies both of the formulae (40) and (41) by a solution based on linear matrix inequalities (LMI).

As described above, for the neuro control system shown in FIG. 48(b), stable analysis is realized.

Figure 49B:
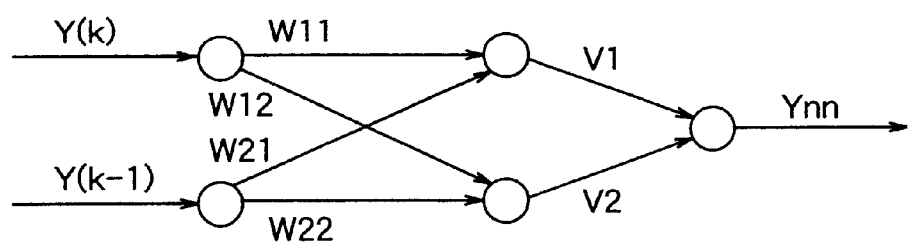

Let us consider a neuro control system shown in FIG. 49(b). This neuro control system has two inputs, two elements in an intermediate layer, and one output. This neuro control system can be represented by the following formula. It is assumed that all the functions f differ from each other.

$$Y(k+1)=\Sigma\Sigma\Sigma hi(k)hj(k)hs(k)(Aijs*Y(k)+Bijs*U(k))$$

By expanding m and n in this way, the dynamics of the neuro control system shown in FIG. 48(a) can be represented as follows.

$$Ynn(k)Y(k+1) = \sum_{i=1}^{m+n} hi(k)(AiY(k)+BiU(k)) \qquad (42)$$

Although hi(k) is an unknown parameter, this parameter can be decided uniquely if the intermediate layer is linear and only the output can be represented by the non-linear function. Accordingly, formula (42) can be reduced to a linear function like formula (37), and analysis is realized in like manner as verifying the stability with respect to formula (39) according to formulae (40) and (41).

In this twelfth embodiment, the neural network NNA which has learned in the learning system shown in FIG. 47 can be handled as a linear model. Therefore, this NNA can be used as the control object model NNA 901 shown in FIG. 46 in the same manner as the existing control object model 301 shown in FIG. 40.

Figure 50:
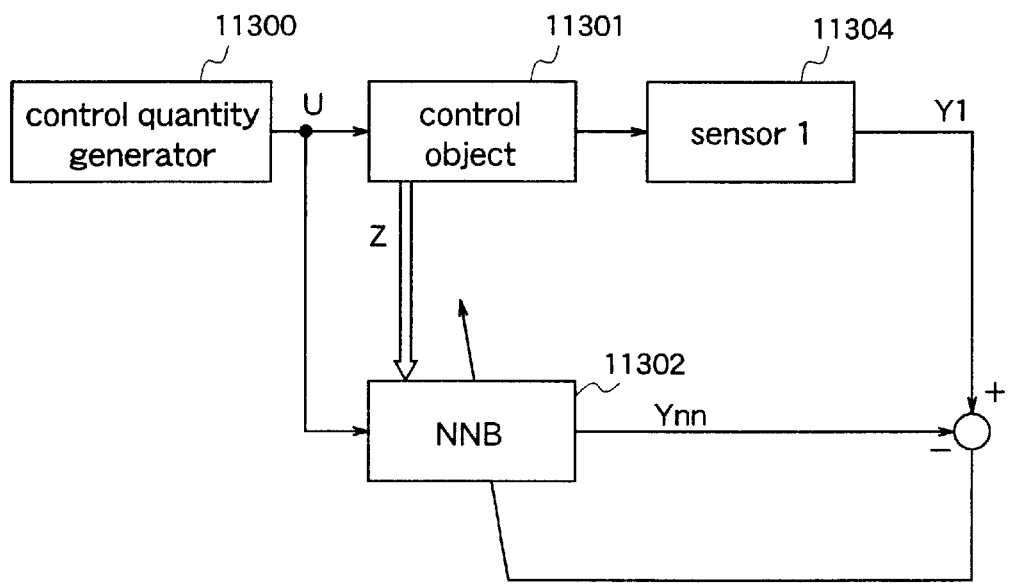
FIG. 50 is a diagram illustrating a learning system for a control neural network according to the twelfth embodiment.

Hereinafter, a description is given of learning of the neural network NNB used in the parameter estimation control device of this twelfth embodiment. FIG. 50 is a diagram illustrating a learning system for the neural network NNB. As shown in FIG. 50, this system comprises a control quantity generator 11300, a control object 11301, a neural network 11302 (NNB), and a sensor 11304 (sensor 1).

The control quantity generator 11300 generates a control quantity to be input to the control object 11301. The control object 11301 is identical to the control object 801 shown in FIG. 45, and this is an object to be controlled. The neural network 11302 (NNB) is subjected to learning in this learning system. The sensor 11304 is identical to the sensor used in the system shown in FIG. 47.

The learning system shown in FIG. 50 is identical to the learning system for the NN2 according to the tenth embodiment shown in FIG. 41. In this twelfth embodiment, the NNB performs learning in the same way as described for the tenth embodiment.

Figure 51:
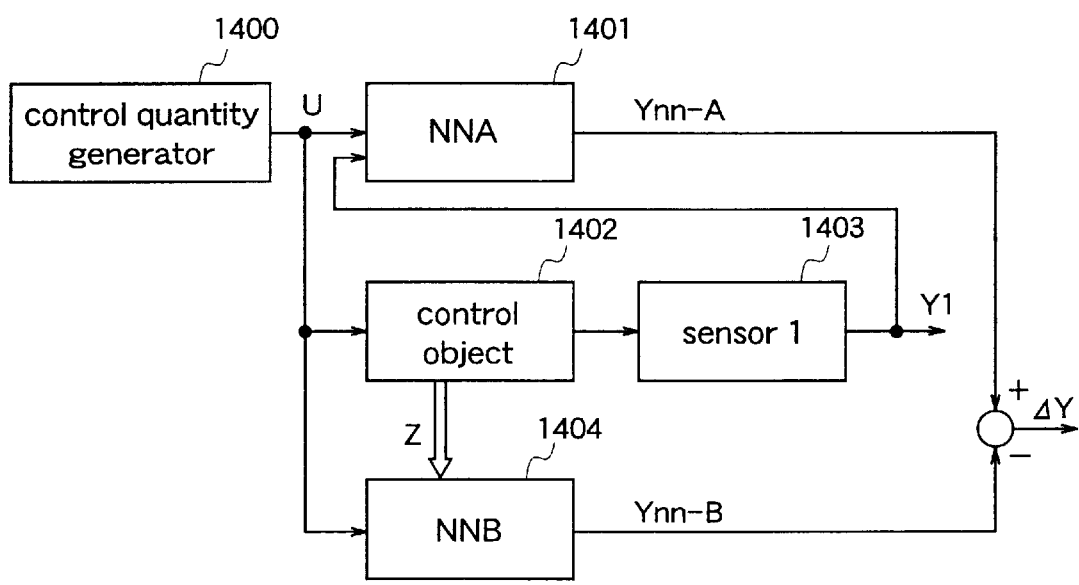
FIG. 51 is a diagram illustrating an error detection system for a neural network according to the twelfth embodiment.
Figure 52:
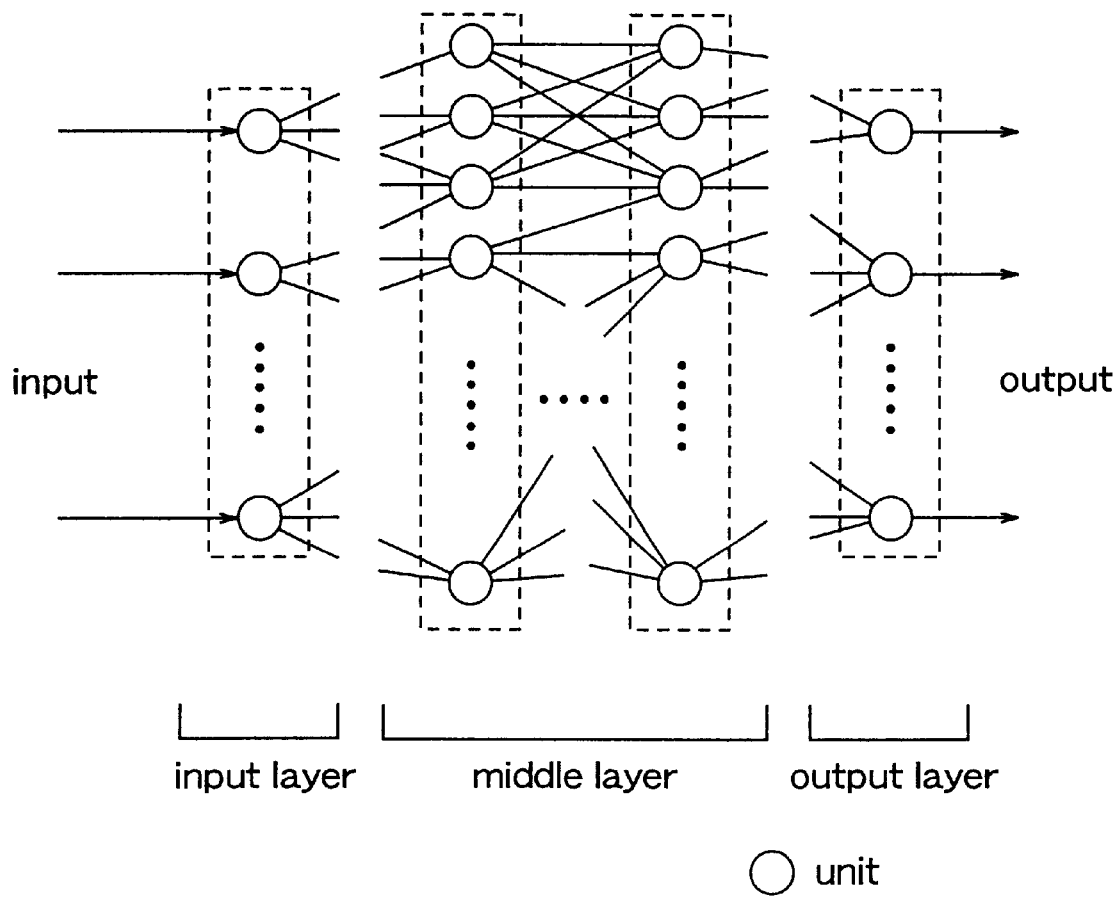
FIG. 52 is a diagram for explaining a hierarchical neural network.
Figure 53:
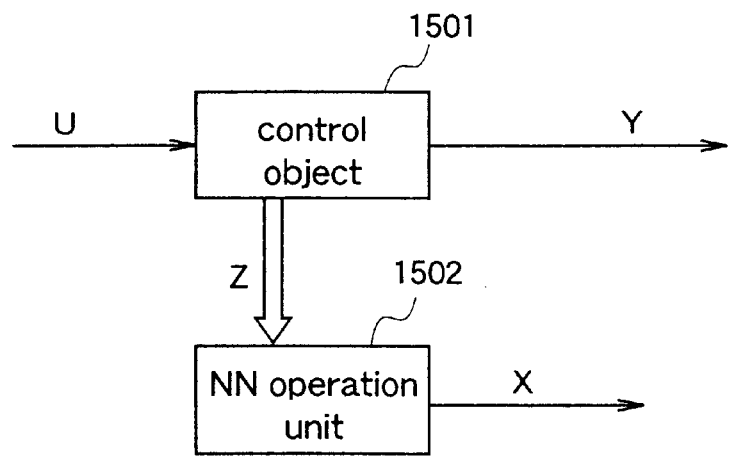
FIG. 53 is a diagram illustrating a neuro control system according to the prior art.
Figure 54:
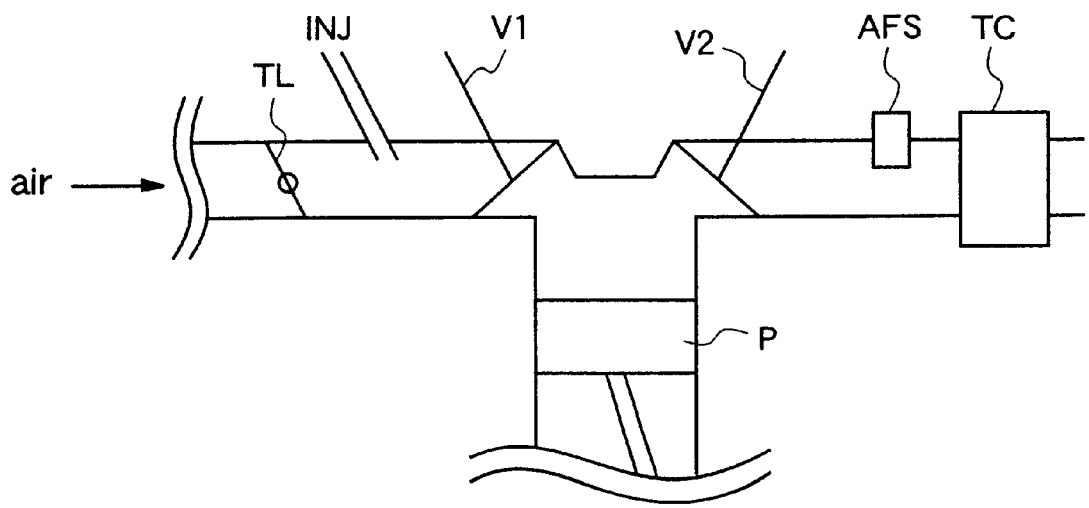
FIG. 54 is a diagram illustrating an outline of an air-to-fuel ratio controller.
Figure 55:
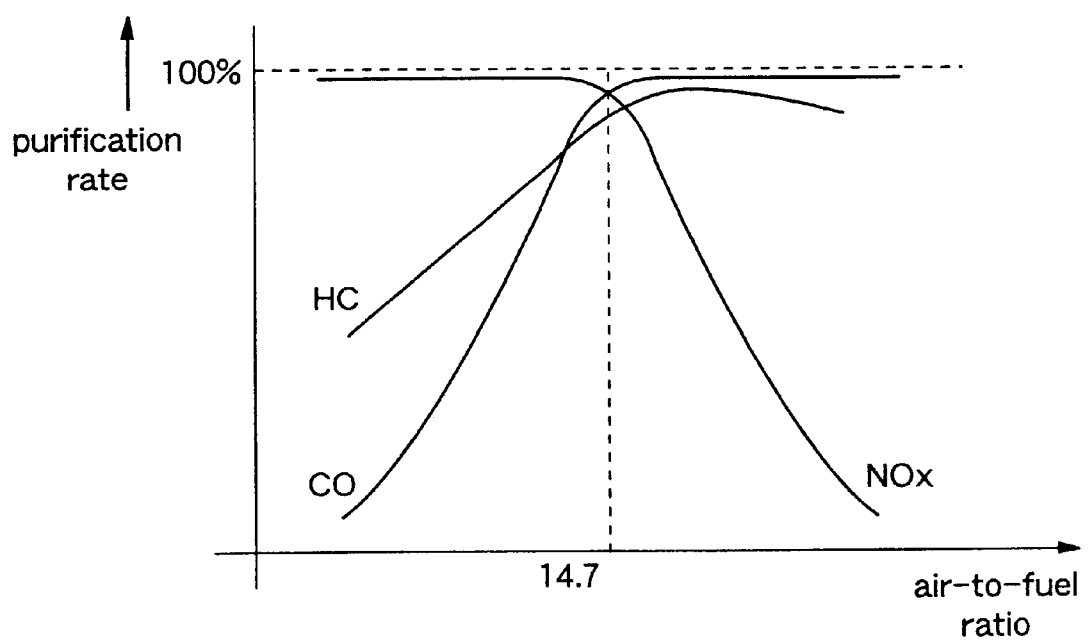
FIG. 55 is a diagram illustrating the relationship between the air-to-fuel ratio of engine and the purification rate of exhaust gas.
Figure 56:
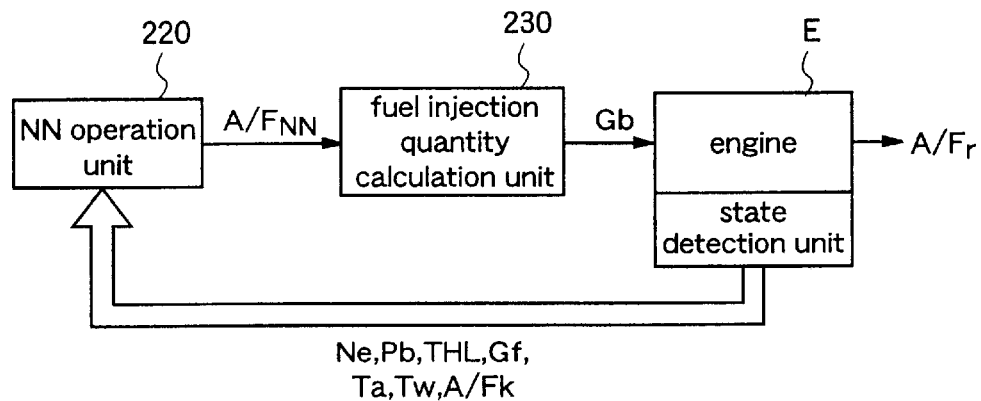
FIG. 56 is a functional block diagram illustrating an air-to-fuel controller using a neural network, according to the prior art.
Figure 57:
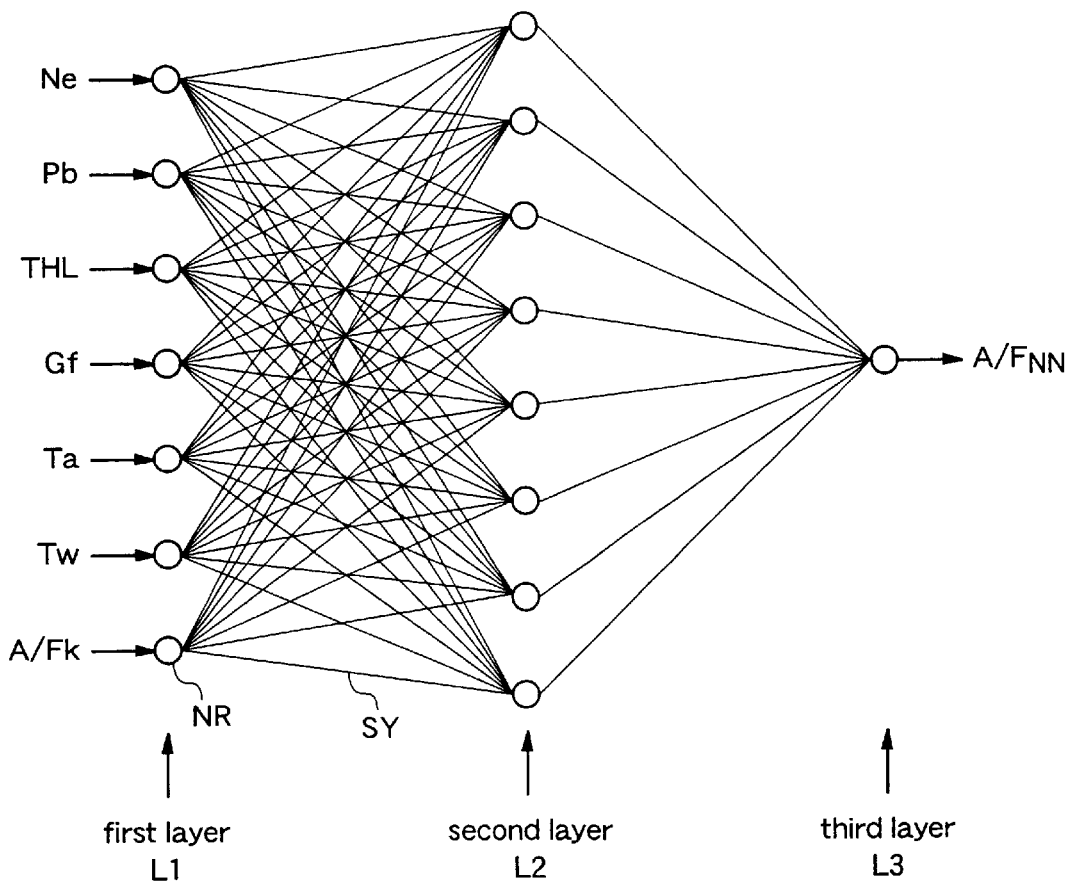
FIG. 57 is a diagram for explaining the conception of the neural network used in the air-to-fuel ratio controller shown in FIG. 56.
Figure 58:
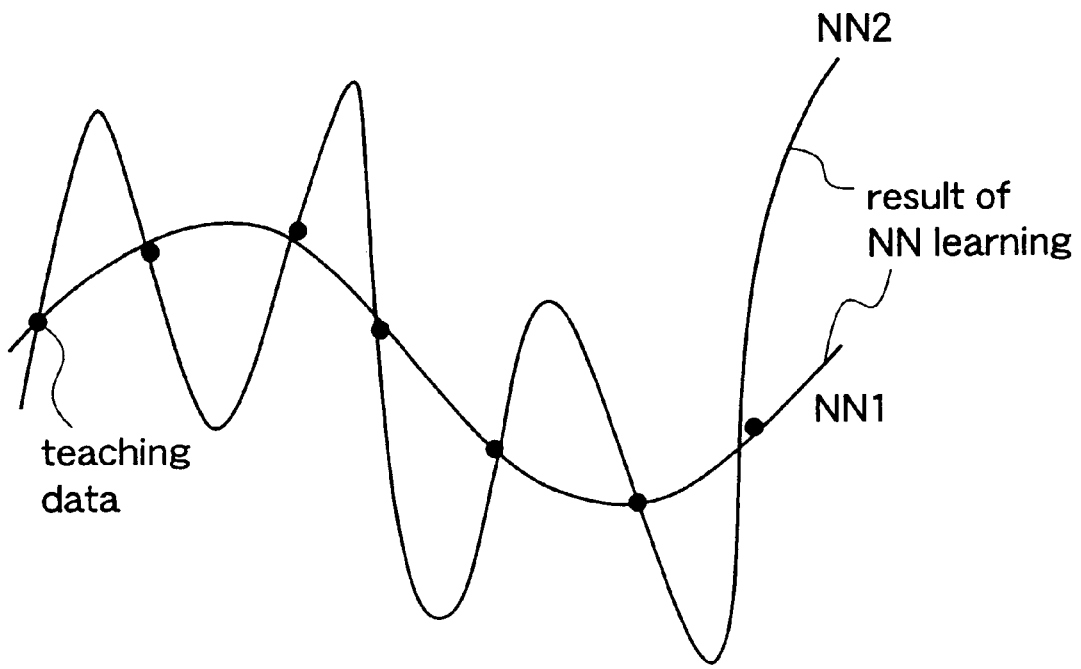
FIG. 58 is a diagram for explaining a problem of a parameter control device using a neural network, according to the prior art.

The neural network NNB which has learned in the learning system is subjected to error detection in an error detection system shown in FIG. 51, and the result of the detection is used for design of the controller shown in FIG. 46. With reference to FIG. 51, the error detection system comprises a control quantity generator 1400, a control object 1402, a neural network 1401 (NNA), a neural network 1404 (NNB), and a sensor 1403 (sensor 1).

In FIG. 51, the control quantity generator 1400, the control object 1402, the neural network 1404 (NNB), and the sensor 1403 are identical to those (11300, 11301, 11302, and 11304) shown in FIG. 50, respectively. Further, the neural network 1401 (NNA) is a model substitute neural network identical to that (1002) shown in FIG. 47, and this NNA has learned in the learning system shown in FIG. 47.

The error detecting operation of the error detection system is as follows. Initially, the control quantity generator 1400 generates a control quantity U within an estimated operation domain, and outputs it to the control object 1402 and the NNA. The control object 1402 performs predetermined operation and generates an output according to the input control quantity U. The output from the control object 1402 is input to the sensor 1403, and the sensor 1403 performs detection to output the result of the detection as a signal Y1. On the other hand, the NNA receives the control quantity U and the signal Y1 from the sensor 1403, and generates an estimate value Ynn-A to be output.

On the other hand, the NNB receives a state quantity Z indicating the state of the control object 1402, and generates an estimate value Ynn-B to be output. This estimate value Ynn-B is compared with the signal Ynn-A output from the NNA to obtain an estimate error dY. In this error detection system, the maximum value of the estimate error is obtained.

Hereinafter, a description is given of the operation of the parameter estimation control device shown in FIG. 45, based on the maximum estimate error obtained in the error detection system shown in FIG. 51, by using the NN2 which has learned in the learning system shown in FIG. 50. On receipt of the control quantity U, the control object 801 performs a predetermined operation to generate an output according to the input U. The NNB 802 which has learned in the learning system shown in FIG. 50 receives the control quantity U and the state quantity Z which indicates the state of the control object 801, generates an estimate value Ynn according to these inputs, and outputs the estimate value Ynn to the control quantity operation means 803. The control quantity operation means 803 subjects the estimate value Ynn to an arithmetic operation adapted to the virtually designed controller 902 shown in FIG. 46 (control object model adaptive operation) to generate a control quantity U.

The controller 902 in the model control system shown in FIG. 46 is designed so that it can execute stable control for the maximum value of the estimate error obtained in the error detection system shown in FIG. 51. Accordingly, in the parameter estimation control device of this twelfth embodiment shown in FIG. 45, it is possible to execute stable control for the control object 801 by using the control quantity generated by the control quantity operation means 803.

As described above, according to the twelfth embodiment of the invention, the parameter estimation control device is provided with the neural network (NNB) 802 and the control quantity operation means 803, and the control quantity operation means 803 performs control adapted to the model control system using the control model substitute neural network NNA shown in FIG. 46, by using an estimate value generated by the NNB 11302 (802 in FIG. 45) which has learned in the learning system shown in FIG. 50. Therefore, highly precise and stable control is realized by the neural network (NNB) 802 which functions as a software sensor.

In this twelfth embodiment, even when a control object model has not been constructed yet or it is difficult to construct such model, since the neural network NNA which has learned in the learning system shown in FIG. 47 is used as a control model substitute neural network, the control quantity operation means 803 can perform the control object model adaptive operation by using this neural network NNA.

What is claimed is:

1. A parameter estimation device for estimating parameters relating to input and output of a control object by using a neural network, comprising:
   a control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on a parameter of the premise part; and
   an estimation unit for estimating dynamic behavior of a control object by using, as a consequent part of the fuzzy operation, a neural network for receiving a parameter indicating the operational state of each of the small domains into which the control domain is divided.

2. A parameter estimation method for estimating parameters relating to input and output of a control object by using a neural network, comprising:
   selecting at least one parameter having strong correlation with non-linearity among input-output characteristics of a control object, as a parameter of a premise part of fuzzy operation, and dividing a control domain of a control object into a plurality of small domains by fuzzy estimation based on a parameter of the premise part; and
   estimating dynamic behavior of a control object by using, as a consequent part of the fuzzy operation, a neural network for receiving a parameter indicating the operational state of each of the small domains into which the control domain is divided.

3. A parameter estimation device for estimating parameters relating to input and output of a control object by using neural networks, comprising:

control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on the parameter of the premise part; and an estimation unit comprising a map formation unit and a map composition unit, said estimation unit for estimating dynamic behavior of a control object by using map values output from a map combination unit, wherein said map formation unit is for combining a plurality of neural networks and includes:

a unit for dividing plural parameters indicating the operation states of respective small control domains into a predetermined number of input parameter groups to be input to each neural network among the plurality of neural networks;

a unit for dividing output parameters from each neural network among the plurality of neural networks into a predetermined number of parameter groups;

a unit for constructing, as a consequent part of the fuzzy operation, neural networks receiving said predetermined number of input parameter groups;

a unit for training a neural network construction obtained by combining said plurality of neural networks by repeating said dividing plural parameters, said dividing output parameters, and said constructing neural networks, until the output from each neural network among said plurality of neural networks becomes single; and a unit for forming maps by using the outputs from the respective neural networks corresponding to the respective predetermined number of input parameter groups, and said map combination unit is for combining the formed maps.

4. The parameter estimation device of claim 3, wherein said neural network construction comprises a structure combining a plurality of three-layer networks, each having two inputs and one output.

5. The parameter estimation device of claim 3, further comprising determining dots of maps when mapping the neural network construction used for the operation in the consequent part, said dots of maps determined by calculating dot pitch in accordance with maximum differential coefficients of the neural network and an allowable estimate error.

6. A parameter estimation device for estimating parameters relating to input and output of a control object, comprising:

a neural network for learning and generating an output based on said learning; and a filtering module connected to said neural network for generating from said output a filtered output signal used as an estimate value;

wherein said filtering module also is for adjusting phase and gain of said filtered output signal relative to filter characteristics of said filtering output signal to output a first teaching signal, and using the first teaching signal for training the neural network.

7. The parameter estimation device of claim 6, wherein said filtering module also is for output of a second teaching signal by adjusting the phase and gain of the first teaching signal by filtering the first teaching signal with an inverse model of an output filter.

8. A parameter estimation device for estimating parameters relating to input and output of a control object by using a neural network, comprising:

a control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on the parameter of the premise part; and an estimation unit for estimating dynamic behavior of a control object by using, as a consequent part of the fuzzy operation, the neural network for receiving time series data of the input and output of a control object for each of the small domains into which the control domain is divided.

9. The parameter estimation device of claim 8, further comprising a neuro element for calculating a non-linear function f(x) comprising two linear functions used for a middle layer and an output layer of the neural network, respectively, wherein f(x) is a function for converting a sum of all input values entering the neuro element, and a model for defining the dynamic behavior of the neural network, the model represented by parameters of said two linear functions and coefficients obtained by product-sum operation of connection coefficients of the neural network.

10. The parameter estimation device of claim 9, wherein one of the two linear functions defines a straight line passing through an origin and has a gradient of maximum differential coefficients $\alpha$ of the non-linear function, while the other of the two linear functions defines a straight line passing through the origin and has a gradient of $\beta$.

11. The parameter estimation device of claim 10, wherein the gradient $\beta$ of the straight line passes the origin satisfies $0 \leq \beta \leq \alpha$ and is defined as $\beta=(f(x1))/x1$, wherein x1 is set to a value exceeding a maximum value equal to a sum of all input values inputted to the target neuro element.

12. A parameter estimation device for estimating parameters relating to input and output of a control object by using a neural network, comprising:

a control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on the parameter of the premise part; and an estimation unit for estimating dynamic behavior of the control object by using, as a consequent part of the fuzzy operation, the neural network for receiving time series data of the input of a control object and time series data of the neural network output for each of the small domains into which the control domain is divided.

13. A parameter estimation device for estimating parameters relating to input and output of a control object by using a neural network, comprising:

a control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on the parameter of the premise part; and an estimation unit for estimating dynamic behavior of a control object by using, as a consequent part of the fuzzy operation, the neural network for receiving time series data of the input of the control object and time series data of an estimate value of the output of the control object, which is obtained by an estimator, for each of the small domains into which the control domain is divided.

14. A parameter estimation device for estimating parameters relating to input and output of a control object by using a neural network, comprising:

a control domain division unit for selecting at least one parameter having strong correlation with non-linearity among input-output characteristics of a control object, as a parameter of a premise part of fuzzy operation, and for dividing a control domain of a control object into a plurality of small domains by fuzzy estimation based on said at least one parameter of the premise part; and an estimation unit for estimating dynamic behavior of a control object by using, as a consequent part of the fuzzy operation, the neural network for receiving operation state parameters including at least one of time series data of the input and output of a control object and time series data of an estimate value of the output of a control object, for each of the small domains into which the control domain is divided.

15. A learning control device comprising:

a neural network comprising a first plurality of neuro elements for receiving a plurality of input parameter values relating to a parameter as an object of estimation, and estimating estimation object parameter values used for target follow-up control quantity operation from these input parameter values;

said neural network further comprising a second plurality of neural elements that have completed learning, said second plurality of neural elements for calculating a learning result as a basis for calculating a neuro estimate value comprising an output value estimated from input signals;

an error coefficient change unit for changing values of weight coefficients by which a square error between said neuro estimate value and a teaching signal is to be multiplied, according to relationships among the neuro estimate value, the teaching signal, and a target value; and a performance function operation unit for operating a performance function for learning by using the values of the weight coefficients;

wherein training the neural network is based on the performance function.

16. A learning control method for receiving a plurality of input parameter values relating to a parameter as an object of estimation, and performing learning control of a neural network which estimates estimation object parameter values used for target follow-up control quantity operation from received input parameter values, said method comprising:

calculating a learning result as a basis for calculating a neuro estimate value comprising an output value estimated from input signals;

changing values of weight coefficients by which a square error between said neuro estimate value output from the neural network and a teaching signal is to be multiplied, according to relationships among the neuro estimate value, the teaching signal, and a target value;

operating a performance function for learning by using the values of the weight coefficients; and training the neural network based on the performance function.

17. A learning control device comprising:

a neural network for receiving a plurality of input parameter values relating to a parameter as an object of estimation, and estimating estimation object parameter values used for target follow-up control quantity operation from these input parameter values;

a unit for calculating a learning result as a basis for calculating a neuro estimate value comprising an output value estimated from input signals;

an estimation error sign decision unit for deciding the kind of a sign of an error between said neuro estimate value output from the neural network and a target value;

a teaching error sign decision unit for deciding the kind of a sign of an error between a teaching signal and the target value;

a sign comparison unit for comparing the kinds of the respective signs decided by the estimation error sign decision means and the teaching error sign decision unit;

a square error coefficient change unit for increasing values of weight coefficients by which a square error between the neuro estimate value and the teaching signal is to be multiplied, when the sign comparison unit decides that the signs are different from each other; and a performance function operation unit for operating a performance function for learning by using the values of the weight coefficients;

wherein training the neural network is based on the performance function.

18. A learning control device comprising:

a neural network for receiving a plurality of input parameter values relating to a parameter as an object of estimation, and estimating estimation object parameter values used for target follow-up control quantity operation from these input parameter values;

a unit for calculating a learning result as a basis for calculating a neuro estimate value comprising an output value estimated from input signals;

an estimation error sign decision unit for deciding the kind of a sign of an error between said neuro estimate value output from the neural network and a target value;

an estimation error absolute value calculation unit for calculating an absolute value of the error between the neuro estimate value output and the target value;

a teaching error sign decision unit for deciding the kind of a sign of an error between a teaching signal and the target value;

a teaching signal error absolute value calculation unit for calculating an absolute value of the error between the teaching signal and the target value;

a sign comparison unit for comparing the kinds of the respective signs decided by the estimation error sign decision unit and the teaching error sign decision unit;

an absolute value comparison unit for comparing the absolute values calculated by the estimation error absolute value calculation unit and the teaching signal error absolute value calculation unit;

a square error coefficient change unit for increasing values of weight coefficients by which a square error between the neuro estimate value and the teaching signal is to be multiplied, when the sign comparison unit decides that the kinds of the signs are identical, and the absolute value comparison unit decides that the absolute value of the error between the neuro estimate value and the target value is smaller than the absolute value of the error between the teaching signal and the target value; and a performance function operation unit for operating a performance function for learning by using the values of the weight coefficients;

wherein training the neural network is based on the performance function.

19. A learning control device comprising:

a neural network comprising a plurality of neuro constructions each comprising at least one neural element, said neuro constructions having respective learning conditions, said plurality of neuro constructions for receiving a plurality of input parameter values relating to a parameter as an object of estimation, and estimate estimation object parameter values used for target follow-up control quantity operation from these input parameter values;

a state quantity detection unit for detecting a state quantity relating to dynamic behavior of a control object;

a learning condition decision unit for deciding the learning condition of the neural network in accordance with the detected state quantity; and a neuro selection unit for selecting only a neuro output value corresponding to the present condition among the neuro constructions of the neural network in accordance with the detected state quantity, wherein when the detected state quantity further comprises satisfying a specific learning condition, then said neuro selection unit is for selecting the neuro output by multiplying a neuro output corresponding to a specific learning condition by a step function "1", and multiplying neuro outputs other than said neuro output corresponding to a specific learning condition by a step function "0", thereby selecting the neuro output.

20. A learning control device comprising:

a neural network comprising a plurality of neuro constructions each comprising at least one neural element, said neuro constructions having their respective learning conditions, said neural network for receiving a plurality of input parameter values relating to a parameter as an object of estimation, and estimate estimation object parameter values used for target follow-up control quantity operation from these input parameter values;

a state quantity detection unit for detecting at least one state quantity relating to dynamic behavior of a control object;

a learning condition decision unit for deciding the learning condition of the neural network in accordance with the at least one detected state quantity;

a learning data storage unit for storing learning data sets for learning connection coefficients of the respective neuro constructions each comprising at least one neural element;

a learning data formation unit for forming learning data for each of the learning conditions in accordance with the at least one detected state quantity;

a learning unit for performing learning of neuro connection coefficients, by using the learning data set corresponding to a learning condition stored in the learning data storage means, and the learning data newly formed by the learning data formation unit; and a coefficient update/neuro selecting unit for selecting a neuro construction corresponding to the condition and updating the neuro construction to the connection coefficients which are the learning result.

21. The learning control device of claim 20, wherein the number of learning data sets used for actual learning by the learning unit is constant and excludes deleted old learning data sets.

22. The learning control device of claim 20, wherein the learning data sets stored in the learning data storage unit comprise learning data sets which are always updated in the online state where the neural network itself performing at least one neuro operation is an object of learning.

23. A learning control device comprising:

a neural network having a plurality of neuro constructions each comprising at least one neural element, said neuro constructions having their respective learning conditions, said neural network for receiving a plurality of input parameter values relating to a parameter as an object of estimation, and estimating estimation object parameter values used for target follow-up control quantity operation from these input parameter values;

a state quantity detection unit for detecting at least one state quantity relating to dynamic behavior of a control object;

a learning condition decision unit for deciding the learning condition of the neural network in accordance with the at least one detected state quantity;

a learning data storage unit for storing learning data sets which have learned connection coefficients of the respective neuro constructions;

a learning data formation unit for forming new learning data for each of the learning conditions in accordance with the at least one detected state quantity;

a learning data set formation unit for forming learning data sets for the respective neuro constructions, by using the learning data sets of all the neuro constructions each comprising at least one neural element, said neuro constructions corresponding to the learned connection coefficients stored in the learning data storage unit, and the learning data newly formed by the learning data formation unit;

a learning data update unit for updating the corresponding data in the learning data storage unit to the newly formed learning data sets;

a learning unit for performing learning of all the neuro connection coefficients corresponding to the learning condition by using the newly formed learning data sets;

a coefficient update/neuro selection unit for selecting all the neuro constructions and updating them to the connection coefficients which are the learning result;

a neuro construction selection unit for selecting all the neuro constructions corresponding to the learning condition; and an estimate calculation unit for calculating a neuro estimate value to be used for control, from all the corresponding neuro output values;

wherein said estimate value is used for control quantity operation.

24. The learning control device of claim 23, wherein, the neural network further comprises neuro constructions each comprising at least one neural element, said neuro constructions under adjacent conditions having a common part of representation of control object dynamic behavior.

25. The learning control device of claim 23, wherein said estimate calculation unit is for calculating the average of all the corresponding neuro output values, said average being the neuro estimate value for control.

* * * * *

UNITED STATES PATENT AND TRADEMARK OFFICE
CERTIFICATE OF CORRECTION

PATENT NO. : 6,678,640 B2
DATED : January 13, 2004
INVENTOR(S) : Akira Ishida et al.

It is certified that error appears in the above-identified patent and that said Letters Patent is hereby corrected as shown below:

Title page,
Item [57], ABSTRACT,
Line 13, change "domain" to -- domains --.

Column 51,
Line 4, before "control" insert -- a --.

Column 52,
Line 38, change "$0 \leqq \beta \leqq \alpha$" to -- $0 \leq \beta \leq \alpha$ --.

Signed and Sealed this

Eleventh Day of May, 2004

JON W. DUDAS
*Acting Director of the United States Patent and Trademark Office*